(12) United States Patent
Suzuki et al.

(10) Patent No.: US 7,523,148 B2
(45) Date of Patent: Apr. 21, 2009

(54) STORAGE SYSTEM

(75) Inventors: Susumu Suzuki, Ooiso (JP); Kenji Yamagami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 220 days.

(21) Appl. No.: 11/134,421

(22) Filed: May 23, 2005

(65) Prior Publication Data

US 2006/0020754 A1    Jan. 26, 2006

Related U.S. Application Data

(63) Continuation of application No. 10/946,034, filed on Sep. 22, 2004, now Pat. No. 7,243,116.

(30) Foreign Application Priority Data

Jul. 21, 2004    (JP)    ............................. 2004-212501

(51) Int. Cl.
*G06F 12/00*    (2006.01)
*G06F 17/30*    (2006.01)
(52) U.S. Cl. ........................... 707/204; 707/205
(58) Field of Classification Search ................ 707/202, 707/204, 1, 3, 100, 200, 205; 711/153, 162, 711/167; 714/7, 13
See application file for complete search history.

(56) References Cited

U.S. PATENT DOCUMENTS

| 5,555,371 | A | * | 9/1996 | Duyanovich et al. ........... 714/13 |
| 5,692,155 | A | | 11/1997 | Iskiyan et al. |
| 6,052,797 | A | * | 4/2000 | Ofek et al. ..................... 714/6 |
| 6,185,601 | B1 | | 2/2001 | Wolff |

(Continued)

FOREIGN PATENT DOCUMENTS

JP    8-305500    11/1996

(Continued)

OTHER PUBLICATIONS

Burkes, D.L., et al—"Design Approaches For Real-Time Transaction Processing Remote Site Recovery", *1990 IEEE*, Data Base Technology Institute, pp. 568-572.

(Continued)

*Primary Examiner*—Don Wong
*Assistant Examiner*—Merilyn P Nguyen
(74) *Attorney, Agent, or Firm*—Antonelli, Terry Stout & Kraus, LLP.

(57) ABSTRACT

In creating replicas to data of a storage volume in a storage system, a technique in which labor for issuing instructions from a processor can be reduced and then data consistency of related volumes can be secured is provided. A single replication instruction including designated information is issued for data of a logical unit serving as a copy source and a copy destination from a replication-control program of the processor. A control unit of the storage system possesses a multiple-replica creation program which enables a processing for creating replicas while securing the data consistency when an access such as a update or reference occurs for a group including a plurality of pairs of copy-source volume and copy-destination volume based on reception of the instruction. A save volume is provided to identify and control data save and update state by copy-source save information and copy-destination update information at the shared memory.

23 Claims, 24 Drawing Sheets

U.S. PATENT DOCUMENTS

| | | | |
|---|---|---|---|
| 6,199,074 B1 | 3/2001 | Kern et al. | |
| 6,308,284 B1 | 10/2001 | LeCrone et al. | |
| 6,370,626 B1 | 4/2002 | Gagne et al. | |
| 6,539,462 B1 | 3/2003 | Mikkelsen et al. | |
| 6,581,143 B2 | 6/2003 | Gagne et al. | |
| 6,647,474 B2 | 11/2003 | Yanai et al. | |
| 6,651,075 B1 | 11/2003 | Kusters et al. | |
| 6,681,303 B1 | 1/2004 | Watanabe et al. | |
| 6,697,881 B2 | 2/2004 | Cochran | |
| 6,708,227 B1 | 3/2004 | Cabrera et al. | |
| 6,708,285 B2 | 3/2004 | Oldfield et al. | |
| 6,721,851 B2 | 4/2004 | Ohr | |
| 6,754,682 B1 | 6/2004 | LeCrone et al. | |
| 6,789,178 B2 | 9/2004 | Mikkelsen et al. | |
| 6,799,258 B1 | 9/2004 | Linde | |
| 6,886,086 B2 | 4/2005 | Kobayashi et al. | |
| 7,031,966 B2 | 4/2006 | Kedem et al. | |
| 7,094,087 B2 | 8/2006 | Suzuki et al. | |
| 7,155,463 B1 * | 12/2006 | Wang et al. | 707/204 |
| 7,290,017 B1 * | 10/2007 | Wang et al. | 707/204 |
| 7,302,536 B2 * | 11/2007 | Watanabe | 711/162 |
| 7,318,133 B2 * | 1/2008 | Yagawa et al. | 711/162 |
| 2002/0095489 A1 | 7/2002 | Yamagami | |
| 2002/0129203 A1 | 9/2002 | Gagne et al. | |
| 2003/0014432 A1 | 1/2003 | Teloh et al. | |
| 2003/0163655 A1 | 8/2003 | McKean et al. | |
| 2003/0172149 A1 | 9/2003 | Edsall et al. | |
| 2004/0103261 A1 | 5/2004 | Honda et al. | |
| 2004/0133752 A1 | 7/2004 | Suzuki et al. | |
| 2004/0250021 A1 | 12/2004 | Honda et al. | |
| 2004/0260901 A1 * | 12/2004 | Yamagami et al. | 711/162 |

FOREIGN PATENT DOCUMENTS

| | | |
|---|---|---|
| JP | 11-327803 | 11/1999 |
| JP | 2000-132343 | 5/2000 |
| JP | 2001-318833 | 11/2001 |

OTHER PUBLICATIONS

Burkes et al. "Design Approaches for Real-Time Transaction Processing Remote Site Recovery," Proceedings of the IEEE spring CompCon Conference, pp. 568-572 (1990).

* cited by examiner

⟨Pair-Control Table⟩                                31

| Pair # | Primary Volume # | Secondary Volume # | Pair-Control State | Group # |
|---|---|---|---|---|
| 1 | 1 | 1 | "Split" | 1 |
| 2 | 1 | 2 | "Transition" | 1 |
| . | . | . | . | . |
| n | 1 | n | "Transition" | 1 |

⟨Group-Control Table⟩   32

| Group # | Instruction-Reception Flag |
|---|---|
| 1 | ON |
| 2 | OFF |
| . | . |

FIG. 7

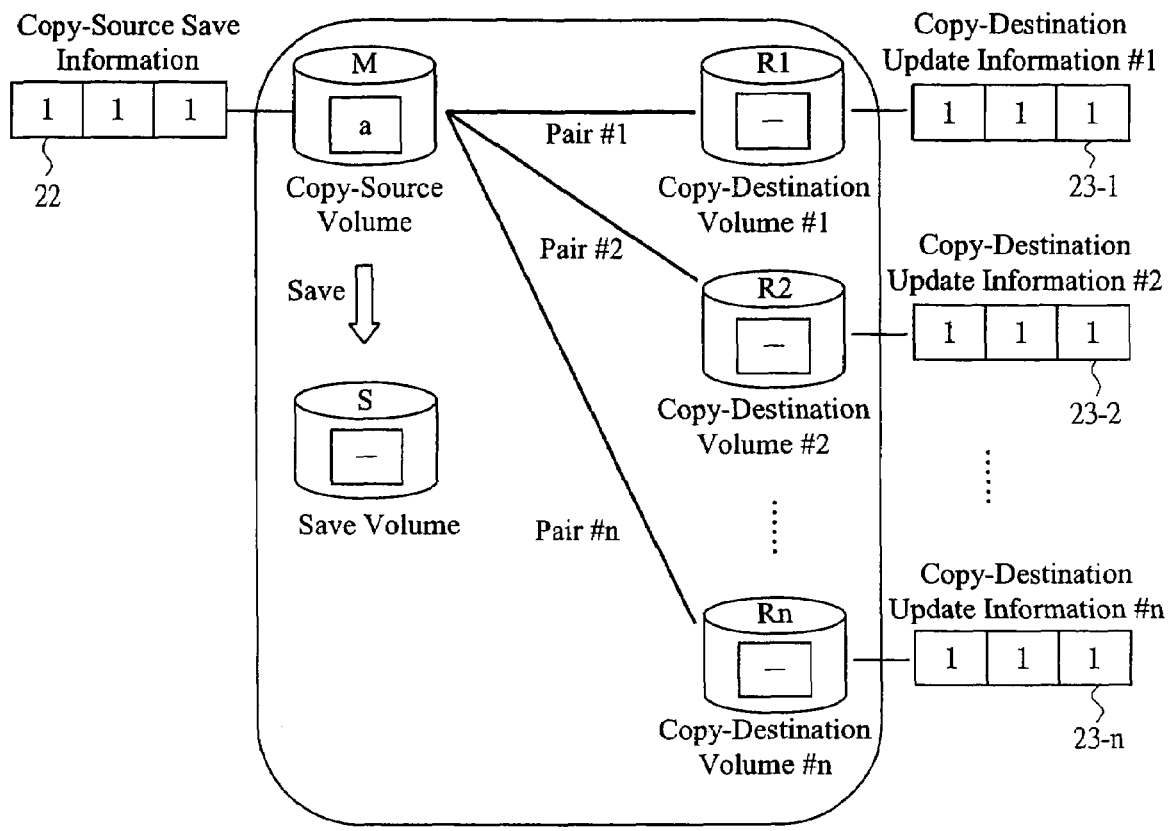

FIG. 8

(Update States of Copy-Source Save Information / Copy-Destination Update Information)

|  | Creation Unit | ON Condition | OFF Condition |
|---|---|---|---|
| Copy-Source Save Information | Copy-Source Volume | At Reception of Multiple-Replica Creation Instruction | At Save of Copy-Source Volume |
| Copy-Destination Update Information | Copy-Destination Volume | At Reception of Multiple-Replica Creation Instruction | At Update of Copy-Destination Volume |

FIG. 10A

Update Copy-Source Volume

| Copy-Source Save Information | Copy-Destination Update Information | Processing |
|---|---|---|
| ON | ON | Save Copy-Source Volume<br>Change Copy-Source Save Information from ON to OFF<br>Update Copy-Source Volume |
| | OFF | Save Copy-Source Volume<br>Change Copy-Source Save Information from ON to OFF<br>Update Copy-Source Volume |
| OFF | ON | Update Copy-Source Volume |
| | OFF | Update Copy-Source Volume |

FIG. 10B

Update Copy-Destination Volume

| Copy-Source Save Information | Copy-Destination Update Information | Processing |
|---|---|---|
| ON | ON | Save Copy-Source Volume<br>Change Copy-Source Save Information from ON to OFF<br>Update Copy-Destination Volume<br>Change Copy-Destination Update Information from ON to Off |
| | OFF | Update Copy-Destination Volume |
| OFF | ON | Update Copy-Destination Volume<br>Change Copy-Destination Update Information from ON to OFF |
| | OFF | Update Copy-Destination Volume |

FIG. 10C

Refer to Copy-Source Volume

| Copy-Source Save Information | Copy-Destination Update Information | Processing |
|---|---|---|
| ON | ON | Return Data of copy-Source Volume |
| | OFF | Return Data of copy-Source Volume |
| OFF | ON | Return Data of copy-Source Volume |
| | OFF | Return Data of copy-Source Volume |

FIG. 10D

Refer to Copy-Destination Volume

| Copy-Source Save Information | Copy-Destination Update Information | Processing |
|---|---|---|
| ON | ON | Save Copy-Source Volume<br>Change Copy-Source Save Information from ON to OFF<br>Return Save Data |
| | OFF | Data of copy-Destination Volume returned |
| OFF | ON | Return Save Data |
| | OFF | Return Data of copy-Source Volume |

(Update States of Copy Information)

|  | Creation Unit | ON Conditions | OFF Conditions |
|---|---|---|---|
| Copy Information | Copy-Source Volume | At Reception of Multiple-Replica Creation Instruction | At Data Copy from Copy-Source Volume to Copy-Destination Volume |

FIG. 22A

Update Copy-Source Volume

| Copy Information | Processing |
|---|---|
| ON | Copy Data from Copy-Source to Copy-Destination Volume<br>Change Copy Information from ON to OFF<br>Update Copy-Source Volume |
| OFF | Update Copy-Source Volume |

FIG. 22B

Update Copy-Destination Volume

| Copy Information | Processing |
|---|---|
| ON | Copy Data from Copy-Source to Copy-Destination Volume<br>Change Copy Information from ON to OFF<br>Update Copy-Destination Volume |
| OFF | Update Copy-Destination Volume |

FIG. 22C

Refer to Copy-Source Volume

| Copy Information | Processing |
|---|---|
| ON | Return Data of Copy-Source Volume |
| OFF | Return Data of Copy-Source Volume |

FIG. 22D

Refer to Copy-Destination Volume

| Copy Information | Processing |
|---|---|
| ON | Copy Data from Copy-Source to Copy-Destination Volume<br>Change Copy Information from ON to OFF<br>Return Data of Copy-Destination Volume |
| OFF | Return Data of Copy-Destination Volume |

FIG. 28A

Under Save Volume Pattern

|  | Copy-Source Volume | Copy-Destination Volume | Save Volume |
|---|---|---|---|
| Pattern A | Housing 1 | Housing 1 | Housing 1 |
| Pattern B | Housing 1 | Housing 1 | Housing 2 |
| Pattern C | Housing 1 | Housing 2 | Housing 1 |
| Pattern D | Housing 1 | Housing 2 | Housing 2 |

FIG. 28B

Under no Save Volume Pattern

|  | Copy-Source Volume | Copy-Destination Volume |
|---|---|---|
| Pattern E | Housing 1 | Housing 1 |
| Pattern F | Housing 1 | Housing 2 |

① C1 : Pair Creation (M-R1)
② C2 : Pair Creation (M-R2)
③ C3 : Pair Split (Pair #1,#2)
④     Processing1 : Copy (M→R1)
⇒⑤ C4 : Update (M,b)
⑥     Processing2 : Write (M,b)
⑦     Processing3 : Copy (M→R2)
            ·
            ·
            ·

STORAGE SYSTEM

CROSS-REFERENCE TO RELATED APPLICATIONS

This application is a Continuation of U.S. application Ser. No. 10/946,034, filed Sep. 22, 2004 now U.S. Pat. No. 7,243,116; which application claims priority from Japanese patent application No. JP 21004-212501 filed on Jul. 21, 2004, the contents of which are hereby incorporated by reference into this application.

BACKGROUND OF THE INVENTION

The present invention relates to a storage system (also called a disk-array unit) for controlling storing of data into a storage unit and, in particular, to a technique for creating a replica of data in storage volume.

Conventionally, there has been a computer system comprising: a storage system (storage sub-system) for controlling the storing of the data in the storage unit; and a processor which serves as a host to conduct a read/write access to the data connected to the storage system through a communication means. In the said computer system, there is a replication function for creating replicas (replicated volumes) by a copying processing inside the storage system for the data of the storage volume installed in the storage area of the storage system.

In the storage system and the computer system equipped with the replication functions, there is the case where it is desired to create a plurality of replicas for the data on a storage volume. For example, the above-mentioned case is at the time when a plurality of replica volumes are created for the data of the storage volume which the processor uses for an on-line application and a plurality of created replica storage volumes are properly used for each processing such as a backup, a test, and a batch processing independently of the on-line application.

In the case where it is desired to create a plurality of replicas for the data of a storage volume using the conventional replication function, multiple instructions required for creating a plurality of replicas must be issued in time series to the storage system in accordance with instructions having been inputted by an operator (user) of the processor. That is, a procedure for: first issuing multiple pair-creation instructions to establish a plurality of pairs of a primary volume which serves as a copy source and a secondary-volume which serves as a copy destination; and establishing a plurality of pairs in the storage system is required.

For example, Japanese Patent Laid-Open No. 2000-132343 discloses a technique for creating the replicas by a copying processing inside the storage system, without interposing the processor for the data of the storage volume in the storage system. Also in this technique, the multiple instructions must be issued in the case where it is desirable that the plurality of replicas are created for the data of the storage volume.

SUMMARY OF THE INVENTION

When the plurality of replicas are created for the data of the storage volume in the storage system on the basis of the instruction issued from the processor using the conventional replication function, issuance of multiple instructions is required and therefore it takes time and labor to do that. In particular, as the number of replicas increase, that is, as the number of pairs of the copy source and the copy destination increases, there is the problem that burdens of the operator (user) and the processor to create the replicas increase. When the number of replicas is small, the trouble does not cause any problems. However, for example, when it is desired to create one hundred replicas for the data of a certain storage volume, a procedure for issuing one hundred pair-creation instructions sequentially in time series and for establishing the pairs of copy source and copy destination is needed.

In addition, at the time of processing for creating the multiple replicas, time lag is generated in receiving the multiple instructions in a control unit of the storage system. Consequently, during this processing, if updates of data and accesses of references from the processor to the storage volumes at the copy source and copy destination occur, there is the problem that it is difficult to ensure the data consistency in the plurality of related storage volumes including the storage volumes of the copy source and the copy destination. Therefore, there is also required a mechanism for ensuring the data consistency of the plurality of related storage volumes in creating the plurality of replicas.

The present invention is made in view of the above-mentioned problems, and an object of the present invention is to provide a technique in which, in creating a plurality of replicas (replicated volumes) for the data of the storage volume by the processing at the storage system in accordance with the instructions from the processor, time and labor required to issue multiple instructions from the processor and establish a plurality of pairs can be reduced and further, in creating the plurality of replicas, the data consistency of the plurality of related storage volumes including the plurality of pairs of copy source and copy destination can be ensured.

Outlines of representative ones of the inventions disclosed in the present application will be briefly described as follows. In order to achieve the above-mentioned objects, a storage system according to the present invention comprises one or more storage devices and control units which carry out control to store the data on the storage area provided by the storage device as a storage volume, and processes I/O such as read/write of the data in conformity to instructions from the processor, which serves as a host connected through a communication means, and is characterized by technical means (1) and (2) as shown below.

(1) The storage system according to the present invention is equipped with a multiple-replica creation function for conducting the multiple-replica creation processing for creating replicas for the data of the specified storage volume to a plurality of varying storage volumes by the processing in the storage system in accordance with the reception of a single instruction (hereinafter called "multiple-replica creation instruction", or simply called "replica instruction" too) issued in accordance with the direction entry for a copy source and a copy destination by the operator from the replica-control program on the processor. In addition, in the case of the multiple-replica creation processing, the replicas are created with the data consistency of a plurality of related storage volumes including the copy source and the copy destination secured even when an update or reference access to the data of the copy source or copy destination occurs from the processor.

Based on the direction entry for the copy source and copy destination by the operator, a single replication instruction containing the information designating the data to become a copy source and the copy destination is issued from the replication-control program of the processor. The issued replication instruction is transmitted to the control unit of the storage system through a communication means. The designated information contains, for example, storage volume identification information such as storage volume number and address as well as identification information etc. about the data included in the storage volume. The relation between the copy source and the copy destination is the relation of one-to-many pairs, or the relation in which a plurality of one-to-one pairs are arranged in a line. For example, the designated information includes one copy-source storage volume-number and a plurality of copy-destination storage volume numbers.

In the multiple-replica creation functions, the control unit receives the replication instruction via the communication means, and identifies a plurality of pairs of copy-source storage volume and copy-destination storage volume in correspondence to the designated information contained in the replication instruction, and conducts a processing (replication processing) for creating replicas by carrying out the required data-copy processing from replication target data inside the copy-source storage volume to the copy-destination storage volume for each pair in a group (consistency group) including these plurality of pairs. When creation of replicas for all the pairs, that is, data-copy processing for bringing the data content of the secondary volume (copy-destination storage volume) in line with the primary volume (copy-source storage volume) is completed, the multiple-replica creation processing is completed.

In addition, because the multiple-replica creation function creates a replica while the data consistency of the group is ensured for updating or referring from the processor to the data of the storage volume included in the group, a storage area that serves as a save-destination area for the data of the copy-source storage volume (save volume) is provided, and conducts a processing for controlling the first control information (copy-source save information) for identifying the data-save state from the copy-source storage volume to the copy-destination storage area and the second control information (copy-destination update information) for identifying the update state for the data of the copy-destination storage volume data, and carries out the processing for updating the values in accordance with the occurrence of the save or the update, respectively. However, updating the data of the copy-destination storage volume is not the updating by the data-copy processing from the copy-source storage volume to the copy-destination storage volume but means the updating by the access such as a write instruction from the processor. The save processing means the processing for copying and saving the pre-updating data to the copy-destination area before writing the post-updating data when updating to the data of the copy-source storage volume occurs from the processor. Whether a saving processing is conducted is decided, for example, in compliance with the policy of the user who uses the processor.

The multiple-replica creation function refers to the first and the second control information, judges the state of each related data including the data of the storage volume data to be an access target of a pair of storage volumes, conducts a processing for saving the corresponding data from the copy-source storage volume to the save-destination storage area as required in conformity to the judgment, or conducts the processing for update or reference for the access target data (update/reference processing) while using the data saved as required, too, in the case where any access of update or reference, that is, a write instruction or read instruction occurs from the processor to the data of the storage volume included in the group.

In addition, the multiple-replica creation function receives replication instructions from a processor through a communication means, and conducts a processing for storing the information that expresses the reception of the replication instruction and the instruction-reception information including the identification information for the copy source and the copy destination that correspond to the designated information (instruction-reception processing) in a memory inside the storage system. The identification information for the copy source and the copy destination that correspond to the designated information is the designated information itself, or the information concerning a plurality of pairs of the copy-source storage volume and the copy-destination storage volume created by interpreting the designated information itself on a side of the storage system. The memory in the storage system includes, for example, the shared memory accessible from each section composing the control unit or the system information storage area installed on the storage device. And, the multiple-replica creation function transmits a response to the processor at the place where the replica instruction is issued. In the storage system, a processing for creating a plurality of designated replicas begins on the basis of the reference to the instruction-reception information. In the processing for creating a plurality of replicas, a processing for actually creating the entity of the replicated data, that is, a processing for copying the replication target data from the primary volume to the secondary volume, and others can be started even later time wise after the reception of the replication instruction. That is, it is possible to conduct the processing for creating the entity of the replicated data when an access to a copy-destination storage volume from a processor occurs, etc.

In addition, the multiple-replica creation function conducts a processing for creating replicas of the data of the storage volume in a "simplex" state which serves as the copy-source in the copy-destination storage volume by carrying out a necessary data-copying processing and transferring a control state for the pair of the copy-source storage volume, that is, primary volume, and the copy-destination storage volume, that is, secondary-volume into a "split" state, with respect to the group (consistency group) that contains a plurality of pairs of copy-source storage volume and copy-destination storage volume, which corresponds to the designated information.

In addition, the multiple-replica creation function conducts a processing related to creation of the plurality of replicas between a plurality of storage systems, that is, a data-copying processing and a data-transfer processing related to a processing for updating and reference from the processor in the case where the group containing the copy-source storage volume and the copy-destination storage volume and the layout of data in the to-be-a-save-destination storage area cover a plurality of storage systems. In the storage system, based on the recognition by the copy-source storage volume and the copy-destination storage volume based on the replication instruction, communication is carried out between its own storage system and other storage systems via a communication means to conduct the necessary data-transferring processing.

In addition, the multiple-replica creation function conducts a processing for creating replicas (replication processing) by carrying out a processing for copying necessary data from the replica target data in the copy-source storage volume to the copy-destination storage volume sequentially by selecting pairs to be processing targets one by one with respect to a plurality of pairs of copy-source storage volume and copy-destination storage volume on the basis of the receipt of the replication instructions. For example, the multiple-replica creation function controls such as a processing for updating or reference after conducting the processing for creating replica in advance for a pair of storage volumes in which an update or reference access occurred from the processor.

In addition, the multiple-replica creation function turns ON the instruction-reception flag corresponding to the group which includes a plurality of pairs of copy-source storage volume and copy-destination storage volume that corresponds to the designated information on the basis of the reception of the replication instruction, conducts a processing for updating or reference of the access target data while judging the order of the replication instruction and updating or reference access from the processor on the basis of the reference of the instruction-reception flag, and carried out the processing for turning OFF the instruction-reception flag after the completion of creation of multiple replicas.

Furthermore, the multiple-replica creation function configures the first and the second control information with a bitmap in units of the copy-source or copy-destination storage volume for identifying the data state in compliance with a unit of sub data in the storage volume, for example, logical track units of a specified size, and updates the corresponding bits in the bitmap as the data save or update occurs. For example, the multiple-replica creation function creates the first and the second control information as the replication instruction is received, turns ON all the bits, and turns OFF the bits corresponding to the corresponding sub data as data of save or update occurs in the sub data units.

In addition, the multiple-replica creation function conducts the following processing as the update/reference processing when a update or reference access occurs from the processor to the data of the storage volume included in the above-mentioned group after reception of the replication instruction.

The multiple-replica creation function confirms the first control information when an update access occurs from the processor to the data of the copy-source storage volume, and if the corresponding data (access target data) of the copy-source storage volume is in a unsaved state, saves the pre-updating data in the copy-source storage volume to the save-destination storage area to update the first control information, conducts the write-processing by the post-updating data (write data) after saving, and if the corresponding data of the copy-source storage volume is in a saved state, the multiple-replica creation function does not save the pre-updating data in the copy-source storage volume but writes the data by the post-updating data. After executing the save-processing in response to the access of updating, the multiple-replica creation function conducts the processing for creating replicas for the pair using the data saved, that is, the data of the copy-source storage volume in the state when the multiple-replica creation processing is started.

The multiple-replica creation function confirms the first control information and the second control information when an update access occurs from the processor to the data of the copy-source storage volume, and if the corresponding data of the copy-source storage volume is in the unsaved state and the corresponding data (access target data) of the copy-destination storage volume is in the un-updated state, the multiple-replica creation function saves the corresponding data of the copy-source storage volume to the save-destination storage area to update the first control information, writes the corresponding data of the copy-destination storage volume by the post-updating data to update the second control information, and if the corresponding data of the copy-source storage volume is in the saved state and the corresponding data of the copy-destination storage volume is in the un-updated state, the multiple-replica creation function writes the corresponding data of the copy-destination volume by the post-updating data to update the second control information, and if the corresponding data of the copy-destination storage volume is in the post-updating state, the multiple-replica creation function writes the corresponding data of the copy-destination volume by the post-updating data.

The multiple-replica creation function conducts the processing for reading and returning the corresponding data (access target data) of the copy-source storage volume when a reference access occurs from the processor to the data of the copy-source storage volume.

The multiple-replica creation function confirms the first control information and the second control information when a reference access occurs from the processor to the data of the copy-source storage volume, and if the corresponding data of the copy-source storage volume is in the unsaved state and the corresponding data (access target data) of the copy-destination storage volume is in the un-updated state, the multiple-replica creation function saves the corresponding data of the copy-source storage volume to the save-destination storage area to update the first control information, the multiple-replica creation function reads and returns the data saved in the save-destination storage area, and if the corresponding data of the copy-source storage volume is in the saved state and the corresponding data of the copy-destination storage volume is in the un-updated state, the multiple-replica creation function reads and returns the data saved in the save-destination storage area, and if the corresponding data of the copy-destination storage volume is in the post-updating state, the multiple-replica creation function reads and returns the corresponding data of the copy-destination volume.

(2) In addition, the storage system according to the present invention is equipped with a control unit for controlling to store the data as storage volume in a storage area of the storage system and when a single replication instruction including the information designating the copy-source data and copy-destination data is issued from a replication-control program of the processor, the control unit possesses a multiple-replica creation functions for creating a plurality of replicas of the copy-source data by creating replicas of replicated data in the copy-source storage volume to the copy-destination storage volume, with respect to a plurality of pairs of copy-source storage volume and copy-destination storage volume corresponding to the designated information, on the basis of the reception of the single replication instruction. The multiple-replica creation function performs processing for creating replicas by carrying out a data-copy processing from the copy-source storage volume to the copy-destination storage volume for the group including a plurality of pairs of the copy-source storage volume and copy-destination storage volume corresponding to the designated information, processing for controlling the third control information (copy information) for identifying the copied state of the data from the copy-source storage volume to the copy-destination storage volume and updating the value in accordance with the occurrence of the copy without providing a storage area (storage volume) which serves as the to-be-a-save-destination data of the copy-source volume, a processing for judging the conditions of each data including the data of storage volume which can be an access target and the data of storage volume of corresponding pairs by saving the data from the copy-source storage volume to the to-be-a-save-destination storage area on the basis of the judgment, a processing for copying the corresponding data from the copy-source storage volume to the copy-destination storage volume as required on the basis of the judgment, and processing for updating or referring for the access target data.

The multiple-replica creation function receives the replication instruction from the processor through the communication means, stores in a memory within the storage system the instruction-reception information containing information that expresses the reception of the replication instruction and copy-source and copy-destination information that correspond to the designated information in the instruction, transmits a response to the instruction-source processor, and starts a processing for creating a plurality of replicas on the basis of the reference of the instruction-reception information.

In addition, the multiple-replica creation function creates replica for the data of storage volume in the "simplex" state which serves as the copy-source with respect to a group containing a plurality of pairs of copy-source storage volume and copy-destination storage volume corresponding to the designated information in the copy-destination storage volume by carrying out the necessary data-copy processing, and transits the control state to the "split" state for the pair of the copy-source and copy-destination storage volume.

In addition, the multiple-replica creation function conducts data transfer a processing related to processing for creating a plurality of the replicas between a plurality of storage systems in the case where data layout covers a plurality of storage systems in the group including the copy-source storage volume and the copy-destination storage volume.

In addition, the multiple-replica creation function carries out a processing for creating replicas (replication processing) by performing a data-copy processing sequentially from the copy-source storage volume to the copy-destination storage volume by selecting pairs to be processing targets with respect to a plurality of pairs of the copy-source storage volume and the copy-destination storage volume.

In addition, the multiple-replica creation function carries out a processing for turning ON an instruction-reception flag corresponding to a group including a plurality of pairs of the copy-source storage volume and the copy-destination storage volume on the basis of the reception of a plurality of replication instructions, updating and referring to data to be a target for the access while judging the replication instruction and the order of an update or reference access from the processor on the basis of the reference of the instruction-reception flag, and for turning OFF the instruction-reception flag after completion of creation of a plurality of replicas.

In addition, the multiple-replica creation function configures the third control information in units of the copy-source storage volume with a bitmap for identifying the data state corresponding to a unit of the sub data in the storage volume, and updates the corresponding bits as the copy of the data occurs.

In addition, the multiple-replica creation function carries out the following processing as the update/reference processing in the case where an update or reference access occurs from the processor for the data of storage volume included in the group after the reception of the replication instructions.

The multiple-replica creation function carries out a processing for confirming the third control information in the case where any update access to the data of the copy-source storage volume occurs from the processor, and if the corresponding data (access target data) of the copy-source storage volume is in the non-copied state, the multiple-replica creation function carrying out the processing for copying the corresponding data of the copy-source storage volume to copy-destination storage volume (a plurality of copy-destination storage volume where there are a plurality of volumes) to update the third control information data, and writing the corresponding data in the copy-source storage volume by the post-updating data (write data), and if the corresponding data of the copy-source storage volume is in the copied state, writing the corresponding data in the copy-source storage volume by the post-updating data.

The multiple-replica creation function carries out a processing of confirming the third control information in the case where an update access to the data of the copy-source storage volume occurs from the processor, copying the corresponding data of the copy-source storage volume to the copy-destination storage area (a plurality of copy-destination storage volumes where there are a plurality of volumes) and updating the third control information and writing the corresponding data (access target data) of the copy-destination storage volume in the copy-destination storage volume by the post-updating data (write data) in the case where the corresponding data of the copy-source storage volume is in the no-copied state, and writing the corresponding data of the copy-destination volume by the post-updating data in the case where the corresponding data of the copy-source storage volume is in the non-copied state.

The multiple-replica creation function conducts a processing of reading and returning the corresponding data (access target data) in the copy-destination volume in the case where the corresponding data of the copy-source storage volume is in the copied state.

The multiple-replica creation function conducts a processing of confirming the third control information in the case where the reference access occurs from the processor to the data of the copy-destination storage volume, copying the corresponding data of the copy-source storage volume to the copy-destination storage area (a plurality of copy-destination storage volumes where there are a plurality of volumes) and updating the third control information, and reading and returning the corresponding data in the copy-destination storage area in the case where the corresponding data (access target data) in the copy-source storage volume is in the non-copied sate, and reading and returning the corresponding data in the copy-destination volume in the case where the corresponding data of the copy-source storage volume is in the copied state.

In addition to the means shown in Paragraphs (1) and (2), the storage system according to the present invention has a one-to-many tree-form relation or a relation to arrange a plurality of one-to-one pairs in a line for the relation of a plurality of pairs of copy-source storage volume and the copy-destination storage volume in multiple-replica creation processing.

In addition, the copy-source data and its copy-destination designation in the replication instruction are made in, for example, in units of the storage volume. In addition, the designation of the copy-source in the replication instruction is in, for example, units of sub data included in the storage volume and the copy-destination storage volume containing a replica of the sub data is created by the multiple-replica creation function. In addition, the copy-destination in the replication instruction is designated by, for example, the number of replicas, and the copy-destination storage volume is chosen or created in conformity to the designation of the number of replicas. In addition, the copy-destination in the replication instruction is designated by, for example, the range of storage area, and the copy-destination storage volume is chosen or created in conformity to the designation of the storage area range by the multiple-replica creation function. In addition, the copy-source and the copy-destination in the replication instruction are designated in, for example, units of the consistency group.

Of the inventions disclosed in the application concerned, the effects which can be obtained from typical ones can be briefly described as follows.

According to the present invention, when a plurality of replicas are created by the storage system, it is not necessary to establish a plurality of pairs of copy-source volume and copy-destination volume when the operator issues the instruction from the processor, and the function which can create a plurality of replicas by one instruction from this state and which has not been available can be achieved. By this, it is possible to reduce the labor and time required for the procedure to issue a plurality of instructions and establish pairs, which used to be conventionally required, and to reduce burdens to the operator and the processor. This is particularly effective where a large number of replicas are created. In addition, the data inconsistency when a plurality of replicas is created can be ensured. This function can be utilized for useful processing such as backup processing because a plurality of replicas can be created with less labor and time.

In addition, in particular, according to the configuration of Paragraph (1) in the above means for solving the problem, speed of responses to reference/updating requests from the processor can be increased. In addition, particularly by the configuration of Paragraph (2), the storage resources can be saved.

BRIEF DESCRIPTION OF THE DRAWINGS

FIG. 7 is an explanatory diagram for illustrating an LU and control information to be processing targets at the time of creating a plurality of replicas in the storage system according to a first embodiment of the present invention.

FIG. 8 is a table indicating updating states of copy-source saving information and copy-destination updating information which are control information for creating a plurality of replicas in a storage system according to a first embodiment of the present invention.

FIG. 10A is a table indicating correspondence of control information to an execution processing, about an updating/reference processing of a multiple-replica creation processing in a storage system according to a first embodiment of the present invention.

FIG. 10B is a table indicating correspondence of control information to an execution processing, about an updating/reference processing of a multiple-replica creation processing in a storage system according to a first embodiment of the present invention.

FIG. 10C is a table indicating correspondence of control information to an execution processing, about an updating/reference processing of a multiple-replica creation processing in a storage system according to a first embodiment of the present invention.

FIG. 10D is a table indicating correspondence of control information to an execution processing, about an updating/reference processing of a multiple-replica creation processing in a storage system according to a first embodiment of the present invention.

FIG. 22A is a table showing correspondence of control information to an execution processing about an updating/reference processing of a multiple-replica creation processing in a storage system according to a second embodiment of the present invention.

FIG. 22B is a table showing correspondence of control information to an execution processing about an updating/ reference processing of a multiple-replica creation processing in a storage system according to a second embodiment of the present invention.

FIG. 22C is a table showing correspondence of control information to an execution processing about an updating/reference processing of a multiple-replica creation processing in a storage system according to a second embodiment of the present invention.

FIG. 22D is a table showing correspondence of control information to an execution processing about an updating/reference processing of a multiple-replica creation processing in a storage system according to a second embodiment of the present invention.

Figure 23:
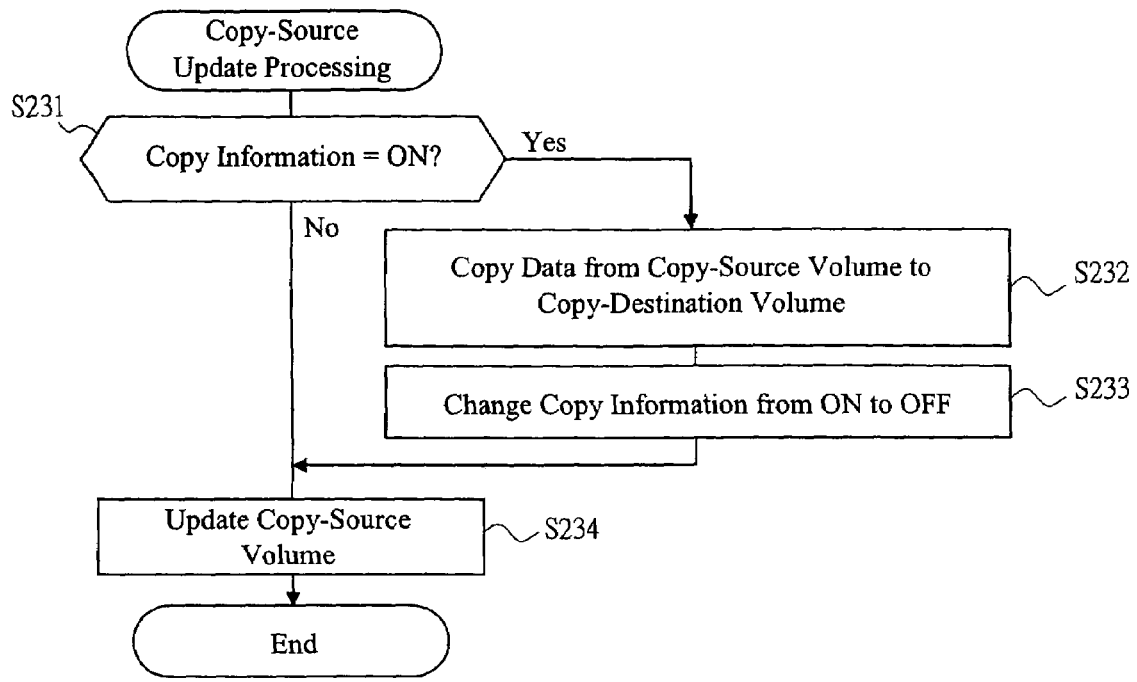

FIG. 23 is a flow chart illustrating an copy-source updating processing of an updating/reference processing in a storage system according to a second embodiment of the present invention.

Figure 24:
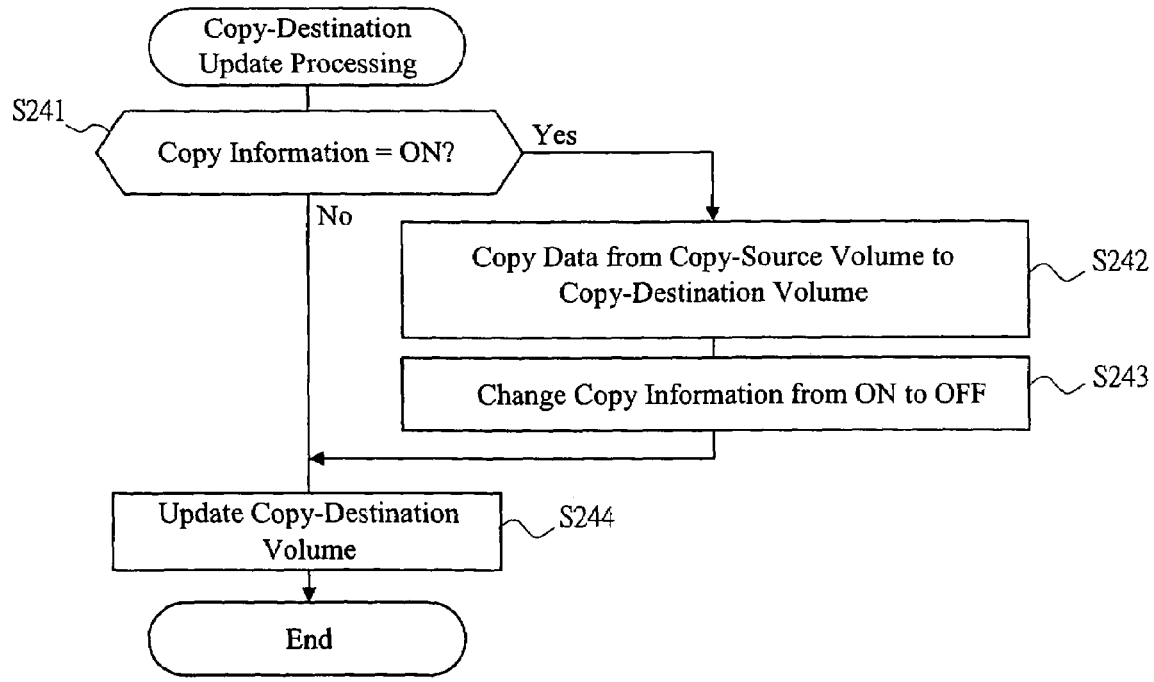

FIG. 24 is a flow chart illustrating a copy-destination updating processing of an updating/reference processing in a storage system according to a second embodiment of the present invention.

Figure 25:
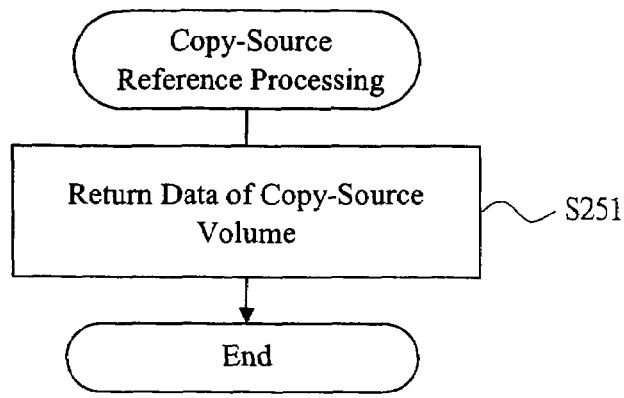

FIG. 25 is a flow chart illustrating a copy-source referring processing of an updating/reference processing in a storage system according to a second embodiment of the present invention.

Figure 26:
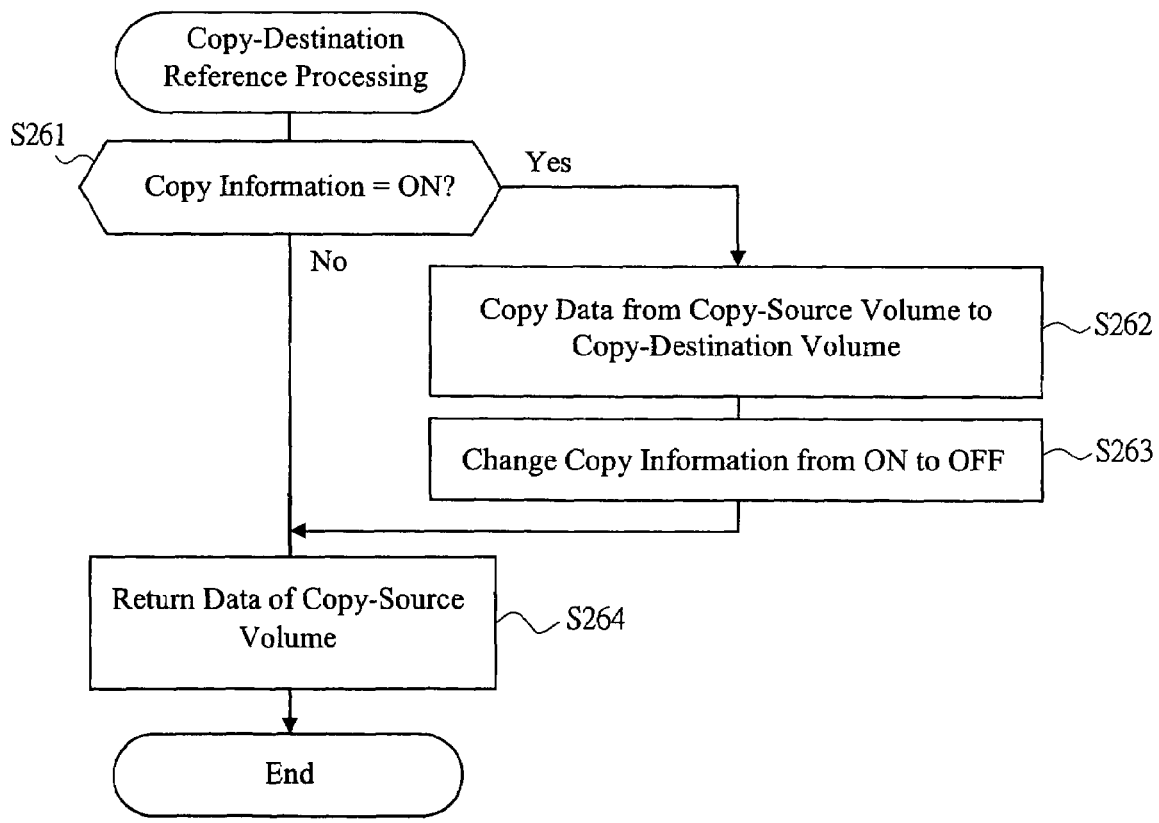

FIG. 26 is a flow chart illustrating a copy-destination referring processing of an updating/reference processing in a storage system according to a second embodiment of the present invention.

Figure 27:
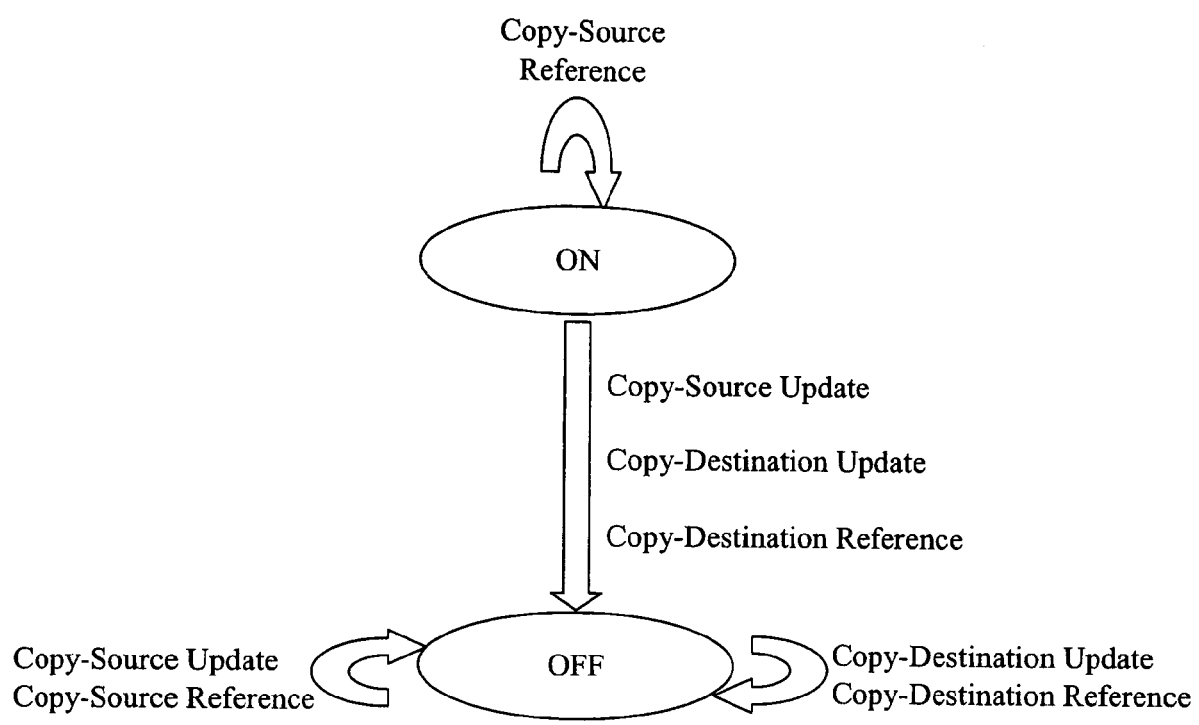

FIG. 27 is a state transition diagram for copy information when an updating/reference processing is conducted in a multiple-replica creation processing in a storage system according to a second embodiment of the present invention.

FIG. 28A is a table showing an LU arrangement pattern related to a multiple-replica creation processing according to each embodiment of the present invention.

FIG. 28B is a table showing an LU arrangement pattern related to a multiple-replica creation processing according to each embodiment of the present invention.

Figure 29:
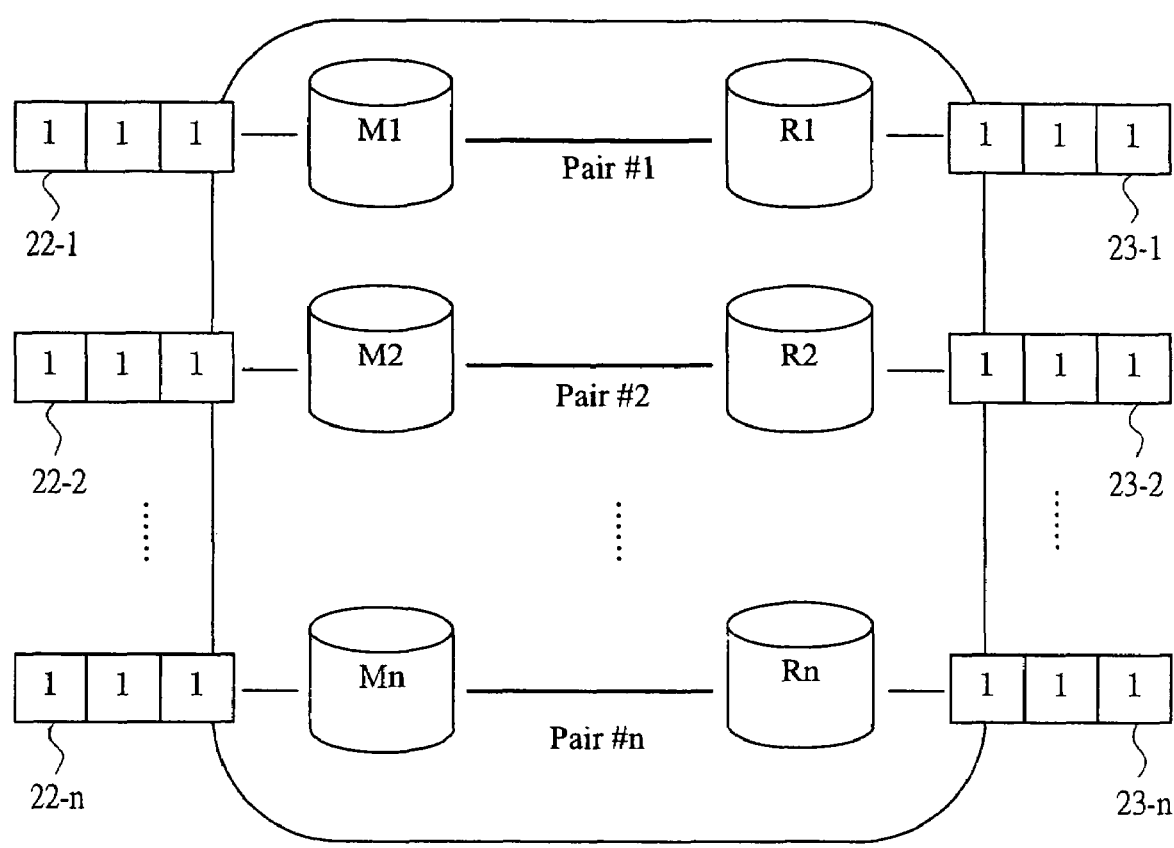

FIG. 29 is an explanatory diagram illustrating other relation of a pair of copy-source volume and copy-destination volume in a multiple-replica creation processing related to each embodiment of the present invention.

Figures 30A, 30B:
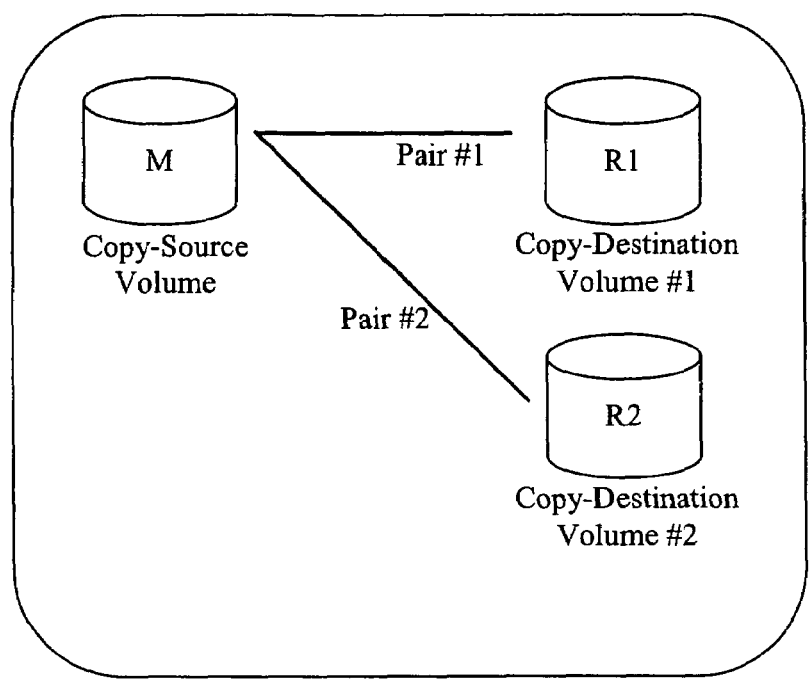

FIG. 30A is a diagram illustrating the outline of a replication function that is a prerequisite technique.

FIG. 30B is a diagram illustrating the outline of a replication function that is a prerequisite technique.

DESCRIPTION OF THE PREFERRED EMBODIMENTS

Referring now to the drawings attached, embodiments of the present invention will be detailed below.

First Embodiment

Figure 1:
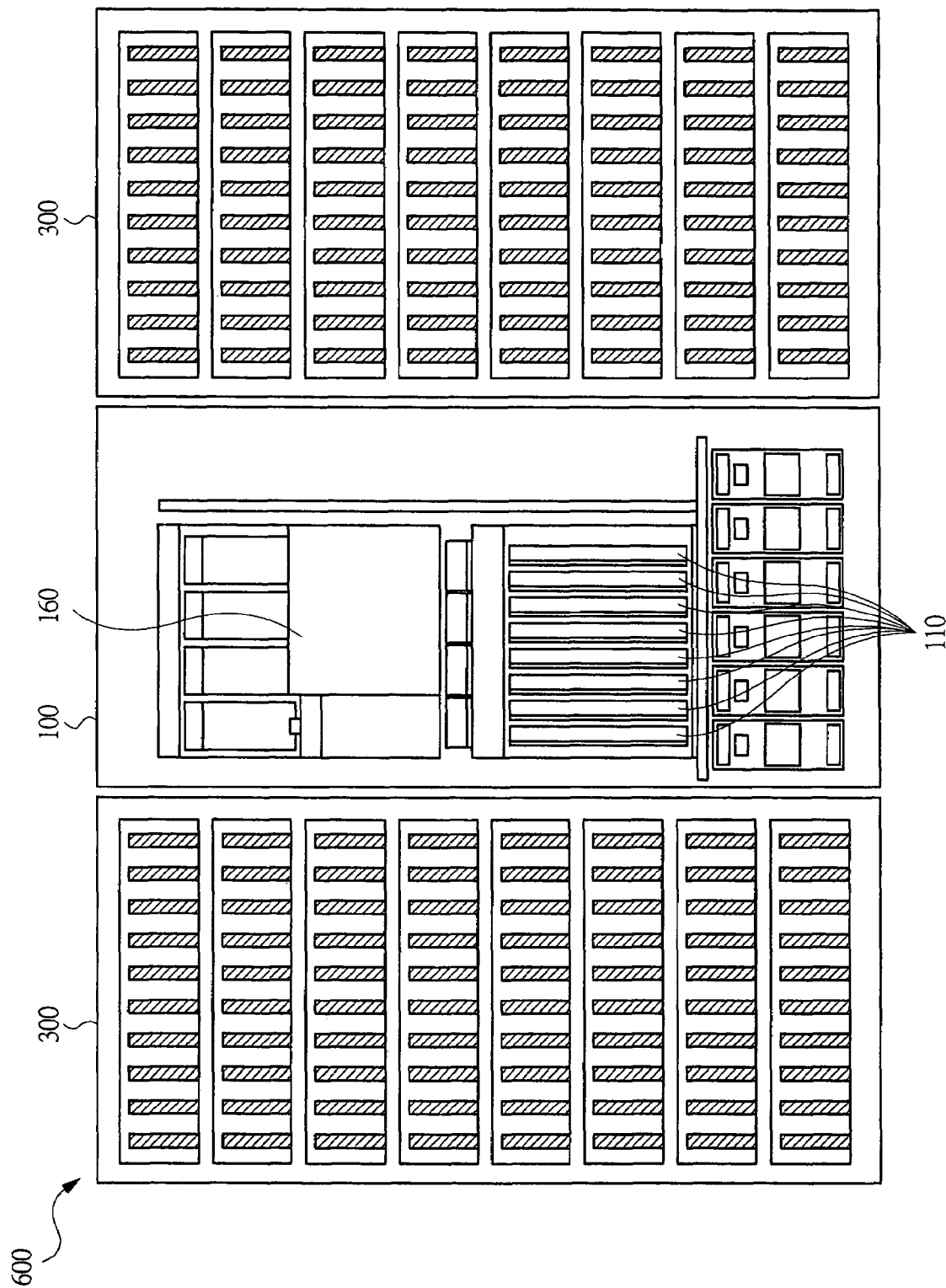
FIG. 1 is a diagram illustrating a hardware appearance configuration of the entirety of a storage system according to each embodiment of the present invention.
Figure 2:
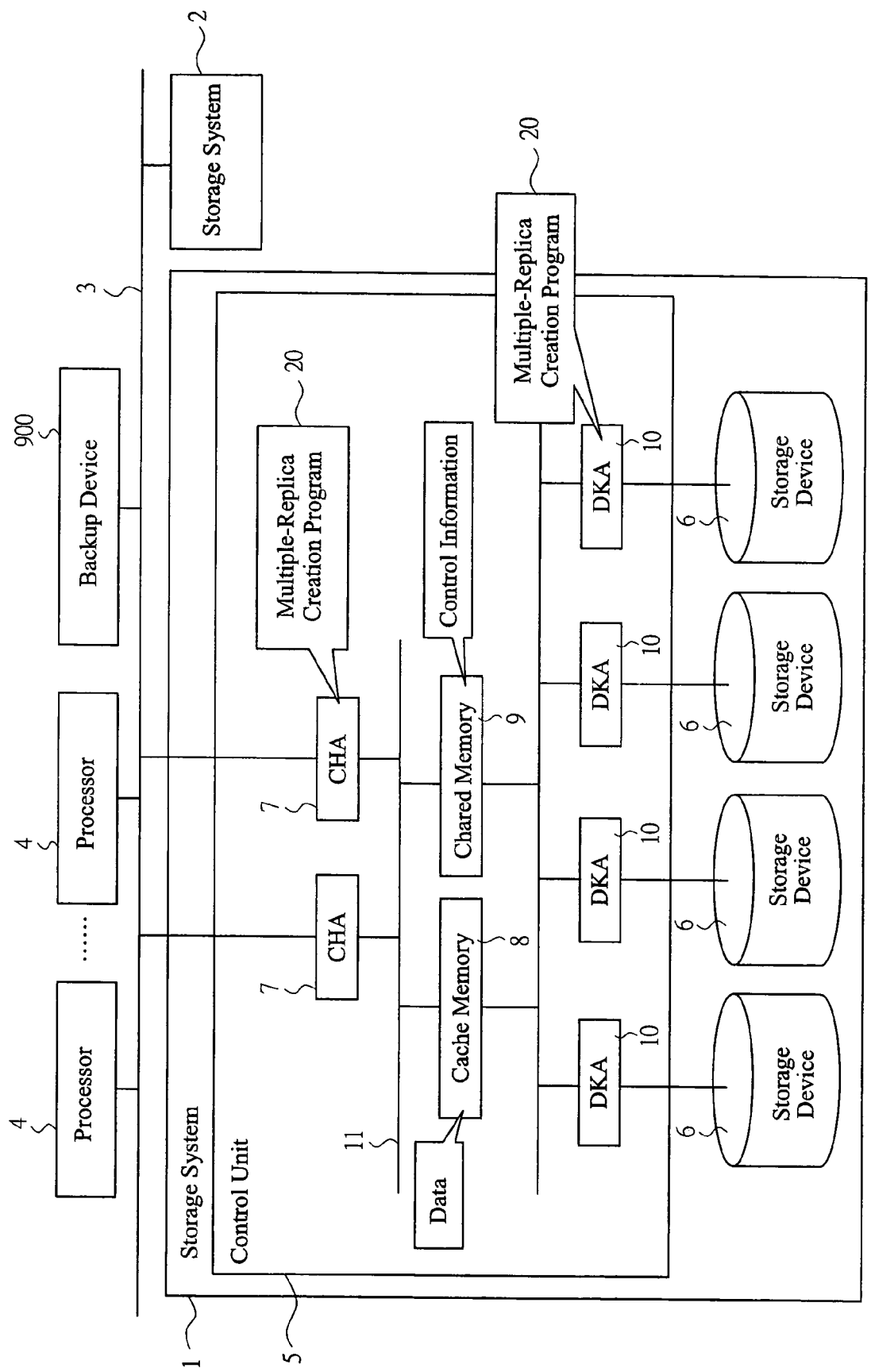
FIG. 2 is a diagram illustrating a functional block configuration of the entirety of a computer system to be configured including a storage system according to a first embodiment of the present invention.

FIGS. 1 through 16 are diagrams for describing a storage system according to a first embodiment of the present invention. FIG. 1 shows a hardware appearance configuration of the entirety of a storage system according to each embodiment of the present invention. FIG. 2 is a diagram illustrating a functional block configuration of a computer system included in a storage system 1 according to the first embodiment of the present invention. The storage system 1 of the first embodiment is equipped with a multiple-replica creation function for creating replicas of data of a storage volume into a plurality of different storage volumes within a storage area of the storage system, and, especially at this time, provides a processing form that corresponds to the case where a saving processing is conducted with a save volume provided for data of a primary volume particularly.

<Storage System>

First, the overall configuration of the storage system according to each embodiment will be described. In FIG. 1, a storage system 600 is in the form of a structure in which a control unit housing 100 and two storage device housings 300 are connected. The storage system 600 is a computer primarily comprising a control unit housing 100 and a plurality of storage device housings 300. The control unit housing 110 of the storage system 600 can achieve RAID control that supports the specified RAID level to a storage area provided by the storage device housing 300.

The control unit housing 100 is equipped with a control terminal 160 which maintenance personnel uses. The control terminal 160 is a computer that carries out a processing for various kinds of maintenance and control of the storage system 600, and may be in the form of a notebook type PC by way of an example. The control terminal 160 is covered with a cover, and opening of the cover makes it possible to use the control terminal 160. Below the control terminal 160, slots for mounting circuit boards such as channel control sections 110 are provided. To each slot, one circuit board is detachable. The storage system 600 is connected to a processor which serves as a host via a later-discussed communication means.

The storage device housing 300 is configured with a disk drive (physical disk), which becomes a large number of storage devices, and provides a storage area to the processor, which serves as a host. A storage volume to be a processing target includes: a physical volume that is a physical storage area provided by the storage device; and a logical unit (LU) that is a storage area logically set on the physical volume. In the storage volume, it is assumed that the storage volume that is directly I/O accessed by the processor serving as the host and stores original data is called a primary volume, and a storage volume which stores a copy of data of the primary volume is called a secondary volume. As the disk drive, for example, various units such as a hard-disk unit, a flexible disk unit, and a semiconductor storage unit can be used. The storage device housing 300 may have a disk array configured by, for example, a plurality of disk drives. In this case, the storage area provided to the processor may be provided by a plurality of disk drives (RAID group) controlled by the RAID. The control unit housing 100 also carries out control related to RAID.

The control unit housing 100 may be directly connected with the storage device housings 300 or may be connected via a network. Furthermore, the storage device housing 300 may be configured integrally with the control unit housing 100.

A control terminal 160 is connected to each circuit board which composes a control unit in the control unit housing 100 through an internal LAN. The maintenance personnel operates the control terminal 160 to carry out various kinds of maintenance and control services. By operating the control terminal 160, it becomes possible to set the physical disk configuration and LU in the storage device housing 300, or install, etc. the programs to be executed at the circuit board such as the channel control section 110. As the setting of the physical disk configuration, for example, extension or reduction of the physical disk, and change of the RAID configuration, etc. can be performed. In addition, the control terminal 160 is connected to an external maintenance center via a LAN or telephone line, etc., and if any troubles occur, actions can be quickly taken. These setting and control are implemented by the maintenance personnel, by using, as a user interface, a Web page provided by the Web server that operates at the control terminal 160. The control terminal 160 may be incorporated in the control unit housing 100 or be externally mounted. In addition, the control terminal 160 may be made in the form of a computer which is dedicated to maintenance and control of the control unit housing 100 and storage device housing 300 or in the form of a general-purpose computer provided with maintenance and control functions. The control terminal 160 may be of a type to be incorporated in the control unit housing 100 or be a separate apparatus to be connected to the control unit housing 100 by a communication line. In addition, the control terminal 160 may be in the form of an apparatus which is dedicated to maintenance and control of the storage system 600 or in the form of a general-purpose information processor such as PC etc. provided with the maintenance and control functions.

<Computer System>

In FIG. 2, a computer system composed of the storage system 1 of the first embodiment has a configuration in which one or more storage systems 1 and one or more processors 4 are connected by a network 3. In FIG. 2, as an example, to the network 3, two storage systems 1 and 2 are connected. Since the configuration of the storage system 2 is the same as the storage system 1, description will be primarily made of the storage system 1. The processor 4 is a computer used on a user side (individual and company, etc.) and serves as a host to the storage system 1. For example, the processor 4 allows the data to be stored in the storage area by the use of a function of data-storage control with which the storage system 1 is equipped, and carries out an on-line service using the above-mentioned data. In addition, using the other storage system 2, replication etc. of the data is carried out. The storage system 1 and storage system 2 may be arranged in a near distance and at the same time may be arranged in a remote site for disaster control etc. and a remote-copy processing etc. of the data of the storage volume therebetween are can be performed. In the case of FIG. 2, the storage system 1 is located at a primary site while the storage system 2 is located at a secondary site distant from the primary site. The storage system 2 is particularly utilized as a copy destination/replicate destination in a remote-copy function and a multiple-replicate creation function. The processor 4 and control unit 5 of the storage system 1 are connected by a specified path via a port and network 3 and can communicate with each other. Control units 5 of the storage systems 1 and 2 are connected by a specified path via a port and network 3, too, and can communicate with each other.

Examples of the network 3 include a LAN (Local Area Network.) and a SAN (Storage Area Network), etc. It can be connected not only via a single type of the network 3 or processor 4 but also different and mixed platforms. In this case, the control unit 5 has a plurality of channel control units (CHA 7) that correspond to various kinds of platforms, respectively. Each of the processor 4 and the storage system 1 has a communication interface compatible with the protocol on the network 3.

For the network 3, for example, via the LAN, the control unit 5 and the processor 4 are connected. The LAN may be Internet or s special-purpose network. Communication via the LAN is conducted in compliance with, for example, a TCP/IP protocol. On the LAN, from the processor 4 to the storage system 1, a data-access request (file-access request) with file-name designation is transmitted.

Furthermore, to the network 3, a backup device 900 is connected. The backup device 900 is specifically a disk-based device such as a MO, CD-R, or DVD-RAM, and a tape-based device such as a DAT tape, cassette tape, open tape, or cartridge tape. In the backup device 900, backup data of the data stored in the storage device 6 inside the storage system 1 is stored by communication via the network 3. The backup processing will be discussed later.

In addition, as the network 3, for example, the control unit 5 and the processor 4 are connected via a SAN. The SAN is a network for exchanging data between the processor 4 and the storage device 6 in units of a block which is a data control unit in the storage area provided by the storage device 6. Communication between the processor 4 and the control unit 5 via the SAN are generally carried out in compliance with a fiber channel protocol. From the processor 4, the data-access request in block units (block-access request) is transmitted to the storage system 1.

In the case where the network 3 is the SAN, a SAN-supported backup device is connected as a backup device 900. In the SAN-supported backup device, backup data of the data stored in storage device 6 is stored by communicating with the control unit 5 via the SAN.

<Control Unit>

As shown in FIG. 2, the control unit 5 (corresponding to the above-mentioned reference numeral "100") comprises CHAs (channel control sections) 7 (corresponding to the above-mentioned reference numeral "110"), a cache memory 8, a shared memory 9, DKAs (disk control sections) 10, and a connection section 11, etc. The CHAs 7, cache memory 8, shared memory 9, and DKAs 10, etc. that configure the control unit 5 are mounted, for example, as a single circuit board, respectively. These one or more circuit boards are mounted to slots of the storage system 1, respectively.

The control unit 5 controls the entirely of the storage system 1, and controls the data I/O primarily between the processor 4 and the storage unit 6. The control unit 5 is equipped with a processor and memory for executing its control program, and each processing as later discussed is achieved by allowing the processor to execute the control program. In the control program which the control unit 5 executes, a multiple-replica creation program 20 is included. The multiple-replica creation program 20 is a program for achieving a multiple-replica creation function, and makes the storage system 1 carry out the multiple-replica creation processing on the basis of reception of a multiple-replica creation instruction from the processor 4.

The control unit 5 controls the individual storage units 6 in compliance with the instruction received from the processor 4 connected by a communication means via the network 3. For example, the control unit 5 receives a data-I/O instruction from the processor 4 and carries out a processing for the data I/O stored in a storage area of the storage unit 6. In the storage system 1, a plurality of control processings are possible using the LU and sub data used as units. In addition, the control unit 5 exchanges various instructions for controlling the storage system 1 between the control unit 5 and the processor 4.

The CHA 7 is equipped with a communication interface for communicating with the processor 4 and other storage system 2 via the network 3, and is equipped with a function to exchange the data I/O instructions such as read and write between the processor 4 and other storage system. The CHA 7 is equipped with a processor, a memory, and a port (communication control section), etc. not illustrated, and controls communication by setting a logical port and a path between the processor 4 and other storage system 2. In addition, the CHA 7 controls the data I/O between DKAs 10 and the CHA via the connection section 11. The CHA 7 carries out a processing for receiving instructions and data from a replica-control program 46 of the processor 4 or carries out a processing for returning responses to the instructions or data from the processor 4.

The CHA 7 is achieved by: hardware formed on an integrally-unitized circuit board; an OS executed by this hardware; and software such as an application program that operates on the OS. Each CHA 7 is connected to an internal LAN together with the control terminal 160 and can communicate with one another. By this, it becomes possible to transmit the program to be executed by the CHA 7 from the control terminal 160 and install the transmitted program.

The CHA 7 may have a configuration (CHN) that provides a function as, for example, a NAS (Network Attached Storage). The control unit 5 communicates with the processor 4 or backup device 900 via the LAN as the network 3 by the above-mentioned CHN. For example, the CHA 7 accepts the file-access request from the processor 4. Also, by finding a storage address, and a data length, etc. of the file and outputting an I/O request corresponding to a final access request, an access to the storage device 6 is executed. Note that the I/O request includes access classifications such as a head address, a data length, and reading or writing of data. In addition, in the case of writing the data, the I/O request may include the write data.

In addition, the CHA 7 may be configured (CHF) in such a manner as to provide, for example, a function corresponding to the SAN. The control unit 5 establishes communication between the processor 4 and the SAN-supported backup device (900) via the SNA by the CHF. From the processor unit 4, a block-access request is transmitted to the storage system 1 in conformity to the fiber channel protocol. For example, the CHA 7 receives the block-access request from the processor 4. By this, the storage system 1 can provide high-speed accessible data-storage services to the processor 4.

In addition, the CHA 7 may be configured to provide a function corresponding to the configuration in which the processor 4 is connected to the control unit 5 without interposing, for example, the LAN, and SAN, etc. In this case, communication between the processor 4 and the control unit 5 is conducted in conformity to a communication protocol such as a FICON (Fibre Connection) (registered trademark). From the processor 4, the block-access request is transmitted to the storage system 1 in compliance with a protocol such as the FICON. For example, the CHA 7 receives a block-access request from the processor 4. By this, the storage system 1 can provide data storage services to the processor 4 serving as a mainframe computer.

By using as the CHA 7 the mixed CHN, and CHF, etc., the storage system 1 can be connected to different networks. Specifically, the storage system 1 can have an SAN-NAS integration storage system in which the storage system 1 is connected to the LAN by using the CHN and to the SAN by using the CHF.

The connection section 11 connects the CHAs 7, the shared memory 9, the cache memory 8, and the DKAs 10 to one another. Data and commands are exchanged among the CHAs 7, the shared memory 9, the cache memory 8, and the DKAs 6 via the connection section 11. The connection section 11 is configured with a high-speed bus such as a cross bar switch which carries out data transmission by, for example, high-speed switching. By being connected between the CHAs 7, high-speed failover etc. become possible.

The cache memory 8 is accessible from the CHAs 7 and the DKAs 10, and is primarily used for storing the data (user data). For example, I/O data to be a transfer target between the CHA 7 and the DKA 10, that is, write data from the processor 4, and read data from the storage device 6, etc. are temporarily stored.

The shared memory 9 is accessible from the CHAs 7 and the DKAs 10, and is primarily used for storing control information, and an instruction, etc. For example, control information such as LU information, and pair control information are stored. In the case of the first embodiment, to the shared memory 9, the control information including copy-source save information 22 and copy-destination update information 23 as later discussed are stored and controlled based on a processing by a mutual-replica creation program 20. Note that a processing form of storing the control information in a memory other than the shared memory 9, for example, in the cache memory 8, the system device on the storage device 6, or the like may be adopted.

The DKA 10 controls the storage device 6. The DKA 10 is equipped with a processor, memory, and port (communication control section), etc. as not illustrated, and is carried out control of data read/write, etc. into a storage area of the storage device 6 based on the instructions from the CHAs 7. In addition, the DKA 10 can carry out RAID control to the plurality of storage devices 6. In the storage systems 1 and 2 or between the storage systems 1 and 2, data copying processing is possible by using the specific sub data in the LU, for example, by using a block, track, and file, etc. as a unit.

The DKA 10 writes the data to the storage device 6 in compliance with, for example, the write instruction which the CHA 7 receives from the processor 4. In addition, the DKA 10 converts a data-access request to the LU by a logic address designation transmitted by the CHA 7, into a data access request to a physical disk by the physical address designation. In the case where the physical disk in the storage device 6 is controlled by the RAID, the DKA 10 carries out the data access in conformity to the RAID configuration. It is possible to configure a RAID group that corresponds to the specified RAID level by the plurality of storage devices 6. The RAID group comprises a plurality of storage devices in accordance with a RAID level such as RAID 1+0 or RAID 5. In the storage system 1, the DKA 10 processes the data storage for the storage device 6 by using as a unit the logic device (LDEV) that corresponds to the RAID group. In the control device 5, in particular, by the DKA 10, the LU is associated with the LDEV.

The LU installed set on the storage device 6 is accessible from the processor 4 and includes: a user LU (also called a data device) used for storing the user data; a system LU (also called a system device) used for storing the control information for system control by the CHA 7 etc.

In addition, to each LU, the CHA 7 etc. are associated as a control unit (CU). The CU is identified through a CU number. By this, the accessible LU is assigned to each CHA 7. In addition, it is also possible to associate the CHA 7 in such a manner that a plurality of CHAs 7 share one LU. It is possible to designate and identify the CU by the CU number from a replica-control program 46 of the processor 4.

In addition, the DKA 10 also carries out the replica-control of the data stored in the storage device 6, and the backup control, etc. Furthermore, the DKA 10 carries out control (remote copy function) for storing a replica for the data of the storage system 1 on the primary site into the storage system 2 of the secondary site, as the purpose of preventing data loss (disaster recovery) when any trouble occurs. The respective DKAs 10 are connected to one another by the an internal LAN together with the control terminal 160 and can communicate with one another. By this, a program to be executed by the DKA 10 is transmitted from the control terminal 160 and can be installed. To the DKA 10, the storage device 6 is directly connected by a communication cable inside the storage system 1. In addition, the storage device 6 may be connected to the control unit 5 via the network. In addition, the storage device 6 may be configured integrally with the control unit 5.

Note that, in the present embodiment, description has been made of the configuration in which the shared memory 9 and the cache memory 8 are installed independently from the CHA 7 and the DKA 10, but the present invention is not limited to this embodiment and may adopt a configuration in which the shared memory 9 and the cache memory 8 are provided so as to be distributed in each of the CHAs 7 and the DKAs 10. In this case, the connection section 11 connects to one another the CHA and the DKA which have the distributed shared memory or cache memory.

A processor equipped to the control unit 5 corresponds to the processor which each of the CHA 7 and the DKA 10 has. That is, in the present embodiment, by allowing the control program including the multiple-replica creation program 20 to be executed by the processors which the CHA 7 and the DKA 10 have, the multiple-replica creation function is achieved.

The control unit 5 stores and controls LU-control information as the control information, that is, information such as a logic volume number, a logic address range, a capacity, a RAID level, main/sub state information, in the memory inside the storage system 1, for example, in the shared memory 9 etc. In addition, the control unit 5 controls a logic device number and correspondence information for controlling the logic device (LDEV) that corresponds to LU. In the storage system 1, various kinds of pieces of control information are automatically assigned and opened as occasion demands.

A processing of data I/O between the processor 4 and the storage device 6 is carried out, for example, as follows. For example, in the case where a data I/O instruction which a certain CHA 7 receives from a certain processor 4 is a write instruction, the above CHA 7 writes the write instruction in the shared memory 9 and at the same time writes the write data received from the processor 4 in the cache memory 8. On the other hand, the DKA 10 monitors the shared memory 9, and when detecting that the write instruction is written in the shared memory 9, the DKA 10 reads the write data from the cache memory 8 in compliance with the above-mentioned instruction and writes it in the storage device 6.

In addition, in the case where a data I/O instruction, which a certain CHA 7 receives from a certain processor 4, is a read instruction, the above CHA 7 writes the read instruction in the shared memory 9 and at the same time examines whether data to be a read target exists in the cache memory 8. If the read-target data exists in the cache memory 8, the CHA 7 transmits the data to the processor 4. On the other hand, if the read-target data does not exist in the cache memory 8, the DKA 10, which has detected that the read instruction is written in the shared memory 9 by monitoring the shared memory 9, reads the read-target data from the storage device 6 and writes this in the cache memory 8 and, at the same time, writes that effect in the shared memory 9. And, if detecting that the read-target data has been written in the cache memory 8 by monitoring the shared memory 9, the CHA 7 transmits the data to the processor 4.

Note that, in addition to the configuration in which the instructions of the data writing and reading from the CHA 7 to the DKA 10 are given indirectly by interposing the shared memory 9, a configuration in which, for example, instructions of the data writing and reading from the CHA 7 to the DKA 10 are given directly without interposing the shared memory 9 may be adopted.

<Processor>

Figures 3, 4, 5:
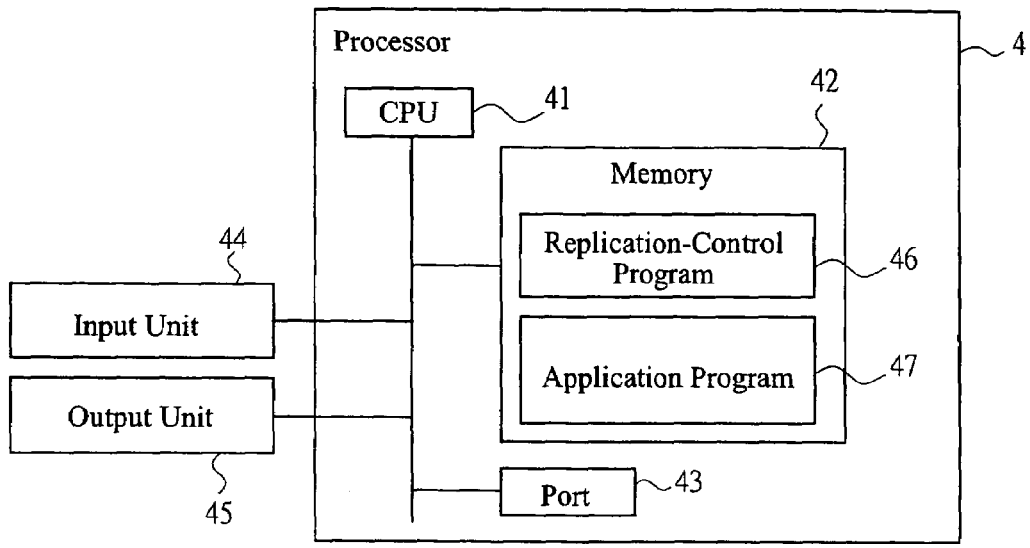
FIG. 3 is a diagram illustrating a functional block configuration of a processor according to each embodiment of the present invention.
FIG. 4 is a diagram illustrating a pair control table that a control unit controls in a storage system according to a first embodiment of the present invention.
FIG. 5 is a diagram illustrating a group control table that a control unit controls in a storage system according to a first embodiment of the present invention.

FIG. 3 is a diagram illustrating a functional block configuration of the processor 4. The processor 4 is a computer comprising a CPU 41, a memory 42, and a port 43, wherein an input unit 44 such as a keyboard or a mouse and an output unit 45 such as a display are connected thereto. The processor 4 may be, for example, a personal computer or workstation, or may be a mainframe computer, server-dedicated computer, or the like. In the memory 42, a replication control program 46 and an application program 47 are stored, and the CPU 41 achieves various functions by running these programs. The replication control program 46 is a program that conducts a processing for issuing an instruction to the storage system 1 to achieve various functions of the storage system 1 including a multiple-replica creation function for creating a plurality of replicas of the data in the storage system 1 and which offers a user interface for the purpose. The application program 47 is a program for executing a general service processing etc. in the processor 4. The service processing includes, for example, a processing of an automatic teller machine of bank. The port 43 is a communication interface connected to the network 3 to communicate with the storage system 1 or other processors 4, etc.

Under the regular conditions, the processor 4 reads the data stored on the storage device 6 or writes the data onto the storage device 6, by transmitting a data I/O instruction such as a read instruction or write instruction to the storage system 1. The replication control program 46 or application program 47 is read from a storage medium such as a CD-ROM as not illustrated or an external storage device or received from the outside through the network 3, and then stored in the memory 42.

The operator (user) of the processor 4 enters an instruction for the storage system 1 to carry out a processing of data storage or replication through the input unit 44, the output unit 45, and the user interface on the replication control program 46. For example, the operator enters the instruction to carry out the multiple-replica creation processing. The user interface on the replication control program 46 is in form of, for example, a GUI such as Web browse or in the form of a command user interface (CUI) etc. The replication control program 46 issues the corresponding instructions on the basis of the instruction entry by the operator. The processor 4 transmits the issued instructions to the control unit 5 of the storage system 1 to be a processing-request destination, via the port 43 and the network 3. The processing-request destination is identified by a control unit (CU) number, and a network address, etc. The CU number is information for identifying the CHAs 7 etc. which take charge of a processing corresponding to the instruction. The transmitted instruction is received by the port of the CHA 7 in the control unit 5. In the replication control program 46, the multiple replica creation can be requested with the LU as a unit. The operator (user) who uses the processor 4 can designate the processing in the LU unit through the user interface on the replication control program 46. For example, when a copy-source volume to be a replication target or a copy-destination volume to be a replication destination is designated, a logic volume number is designated. The replication control program 46 makes the processor 4 show a list of various kinds of pieces of information controlled by the storage system 1. For example, it is possible to show a list of the LU that is ensured in the storage system 1 and which the user can use, and the user can choose the replication target etc. from this list.

<Pair Control State>

Now, the pair control state in the storage system 1 will be described. In the storage system 1, in accordance with the instruction etc. issued from the replication control program 46 of the processor 4, the control state (pair control state) is changed and a processing and control depending on the above-mentioned control states and changes are implemented. By the internal processing in the storage system 1, a pair of storage volumes are established and created as per instructed by the operator of the processor 4. In the case of the present embodiment, in creating the multiple replicas, it is not necessary to carry out the processing by a pair-creation instruction for establishing a plurality of pairs. The storage system 1 has a "simplex" state, a "transition" state, and a "split" state, etc. for as the control states of the storage volumes and the storage volume pairs related to the multiple-replica creation.

First, the control of conventional pairs will briefly be described. The storage system 1 has a function to control the conventional pairs. In the conventional pair control, there are a "pair" state, a "copying" state, and a "split" state, etc as pair control states. The storage system 1 changes the pair control state between the "pair" state and the "split" state for a pair of primary volume and secondary volume in conformity to the instructions, etc. issued from the replication control program 46 of the processor 4. Note that the "pair" state referred to here is one of the above-mentioned pair control states. The condition of one storage volume which does not yet pair is called the "simplex" state. In the conventional pair control, in conformity to the instruction (pair-creation instruction) from the processor 4, the processing for establishing a pair of the primary volume and the secondary volume is conducted in the storage system 1. For example, on the storage area in the storage system 1, storage volumes that pair are newly ensured or designated from the existing established storage volumes. The storage system 1 carries out a initial copy processing for copying the data from the copy-source storage volume to the copy-destination storage volume. And, the storage volumes of the above-mentioned pair are correlated in the "primary" and "secondary" states, and the pair-control state is associated as the "pair" state. The "pair" state is the control state in which the relation between two storage volumes are associated in such a manner as to reflect the above-mentioned update to the data content of the secondary volume as the data content of the primary volume is updated. In the storage volume in the "pair" state, the data content of the secondary volume is brought close to the data content of the primary volume by an update-reflect-processing implemented in the timing based on conditions such as an updated data volume and an update elapsed time. In the "pair" state, an updating access from the processor 4 to the secondary volume is prohibited.

The "pair" state is cancelled, for example, when the storage system 1 receives the instruction for dividing the pair (pair-dividing instruction) from the processor 4, and therefore the pair control state is changed from the "pair" state to the "split" state via the "copying" state which is the transition state. In this transition, the pair-dividing processing is carried out for synchronizing the data content of the primary volume to that of the secondary volume. In a response to the receipt of the above-mention pair-dividing instruction, a data-copy processing is conducted for differential data between the primary and secondary storage volumes as required in order to establish the data content in such a manner that the data content of the secondary volume completely coincides with the data content of the primary volume. Right after the "split" state is achieved, the data content of the secondary volume becomes identical with the content of the primary volume. The "split" state is the control state in which the relation is associated in such a manner that updating of the data content of the primary volume is carried out independently from the updating of the data of the secondary volume in the pair of storage volumes. In the "split" state, an access to the secondary volume which has been inhibited in the "pair" state is permitted. In the "split" state, the updating of the primary volume is controlled in such a manner as to prevent it from being reflected to the secondary volume. In the "split" state, the secondary volume can be utilized for a processing such as a data backup in addition to the primary volume. In the case where the data contents of the primary and secondary storage volumes are kept close to each other by the control in the "pair" state in this way and the condition is changed to the "split" state, only the reflection processing for the differential data between the primary and secondary storage volumes is required and creation of replicas can be completed quickly.

Since, in the "split" state, updating to the primary volume is not reflected to the secondary volume, for example, control to store in the storage system 1 the data not reflected to the secondary volume generated by the updating to the primary volume during the "split" state as the differential data is practiced. And, when the volumes are changed from the "split" state to the "pair" state again, a re-synchronizing processing is carried out on the basis of the instruction (pair-re-synch instruction) for bringing the data content of the secondary volume into line with the primary volume by the above-mentioned differential data. By this, the pair control state is changed to the "pair" state via the "copying (re-synching)" state which is a transition state from the "split" state.

Next, the pair control state of the present embodiment will be described. In the case of the storage system 1 of the present embodiment, in creating a plurality of replicas, there is not always necessity to pass the "pair" state but control is carried out to change the storage volume to be a processing target directly from the "simplex" state to the "split" state. Through the multiple-replica creation processing based on the receipt of a single multiple-replica creation instruction, consequently a plurality of pairs is established as a whole, and the pair control state of each pair enters the "split" state.

FIG. 4 shows a pair-control table 31 which the control unit 5 controls with respect to the pair control state. The pair-control table 31 holds the pair-control information for controlling pairs of storage volumes. As the pair-control information, the table holds the information on a pair number, a primary volume number, a secondary volume number, a pair-control state, and a group number, etc. Note that the reference symbol "#" denotes number. The pair number is information for identifying pairs, and it is possible to designate a logical volume to be a processing target by the use of this pair number from a side of the processor 4. The primary volume number and the secondary volume number are two pieces of information for identifying the primary volume and the secondary volume, respectively, and correspond to a copy-source volume and a copy-destination volume designated by the multiple-replica creation instruction. The pair-control state is information for indicating the control of the pair in the storage system 1. For the pair-control state, values of "transit," and "split," etc. are available. The group number is information for identifying the consistency group to which the above-mentioned pairs belong.

In the example shown in FIG. 4, the pair in pair #1 comprises storage volumes of primary volume #1 and secondary volume #1 and the pair-control state is the "split" state and belongs to the consistency group of group #1. In the storage system 1, n pairs of pairs #1 through #n form the same consistency group on the basis of designation by the multiple-replica creation instruction. For example, with respect to the group #1, a multiple-replica creation is processed, the pair #1 only has the replication processing (as later discussed) completed, and is in the "split" state, and with respect to pairs #2 through #n, no replication processing has been completed and they are in the "transition" state.

For the pair-control state, the "transition" state is the midway condition of a processing for changing the storage volume from the "simplex" state etc. to the "split" state. After the start of multiple-replica creation processing, each pair in the consistency group is changed to the "transition" state. The "split" state is a condition after the replication processing is completed. Right after the completion of the replication processing, the identical data content is obtained between the primary volume and the secondary volume. Under the "split" state, the updating access to the secondary volume is permitted, and control for independently handling the updating of the primary volume and the secondary volume is carried out. Because the access to the secondary volume is allowed during the "split" state, for example, while the processor 4 is allowed to continue on-line services by the use of the data of the primary volume, the data of the secondary volume can separately be utilized to carry out a processing such as a backup. The backup processing examples, utilizing the secondary volume, will be discussed later. For the pair-control state, there is the "re-synching" state etc. It is the state of the midway processing when the pair-control state is changed from the "split" state to the "pair" state. In accordance with the receipt of the instruction for changing from the "split" state to the "pair" state (pair-re-synch instruction), a re-synchronization processing is carried out to: reflect, to the secondary volume, the differential data that corresponds to the updating that has occurred with respect to the primary volume during the "split" state in the storage system 1; and bring the data content in line.

The change of the pair-control state can be executable by the operator of the processor 4, who enters the instructions and issues a corresponding command through the replication-control program 46. The control unit 4 updates the pair-control state of the pair-control table 31 as the pair-control state is changed. Note that the change of the pair-control state can be set through the replication control program 46 in such a manner as to be automatically started at the specified time, in addition to the start on the basis of the instruction entry from the operator of the processor 4. In addition, it is also possible to allow the replication control program 46 of the processor 4 to receive the instructions from other processors 4 connected through the network 3 and start the pair-control state.

In the storage system 1, the pair-control state is changed to the "split" state as a replication processing is completed for one pair of "copy-source volume and copy-destination volume" in the multiple-replicate creation processing.

<Consistency Group>

Description will be made of the consistency group that is one of the control information in the storage system 1. When the multiple replicas are created, one consistency group is formed in accordance with the designation of a copy-source volume and its plurality of copy-destination volumes given by the processor 4. This consistency group is an assemblage of a plurality of pairs to be a security target of the data consistency at the time of the multiple-replica creation processing. At the multiple-replica creation processing, the replication processing is carried out on each of the multiple pairs in this consistency group, but in this case, the control is carried out to secure the data consistency among the related multiple-storage volumes in the change to the "split" state of each pair. The storage system 1 executes an updating/reference processing as later discussed in such a manner as to secure the data consistency of the related storage volume even when an updating/reference access occurs from the processor 4 to the copy-source or copy-destination data during the multiple-replica creation processing in the timing close to this processing time.

It is assumed that when a data updating or reference, that is, a read or write access occurs for the data of the storage volume in the consistency group from the processor 4 during the multiple-replica creation processing. For example, it is assumed that no data-consistency security mechanism is equipped. At this time, in the case where any data write occurs to the copy-source volume, this updated data is not reflected to the pair of copy-destination volumes which have already undergone the replication processing and which are in the "split" state, but is reflected to the copy-destination volume of the pair which has not yet undergone the replication processing by the replication processing, and the data inconsistency occurs in the copy-destination volumes. Occurrence of this kind of data inconsistency must be avoided. On the other hand, in the case of the present embodiment, when a data-consistency security mechanism is present in the multiple-replica creation function and any update or reference access occurs to the copy-source volume or copy-destination volume during the replication processing, the update/reference processing that ensures the data consistency in accord with the current conditions, that is with the data state of the related storage volume is carried out. In order to grasp the data state of the related storage volume, control information such as copy-source save information 22 and copy-destination update information 23 as later discussed is used.

FIG. 5 shows a group control table 32 which the control unit 5 controls. The group control table 32 holds the group control information for controlling the consistency group. As the group control information, a group number, and an instruction-reception flag information, etc. are held. Note that the reference symbol "#" denotes a number. The group number is information for identifying the consistency group. The instruction-reception flag is information established as soon as the consistency group is formed to the copy-source volume and the copy-destination volume designated from a side of the processor 4 when a multiple-replica creation instruction is received from the processor 4. Or, the instruction-reception flag may be established when the consistency group to become a multiple-replica creation processing is designated from the side of the processor 4. In the multiple-replica creation processing, the instruction-reception flag is turned ON when the multiple-replica creation processing is started for the consistency group including the copy source and the copy destination and is turned OFF when the multiple-replica creation processing is completed. The control unit 5 can identify whether the storage volume is under a multiple-replica creation processing by referring to the instruction-reception flag of the group control table 32. The control unit 5 refers to the instruction-reception flag and makes a judgment when an update/reference access is received for the storage volume during the multiple-replica creation processing, and carries out the update/reference processing in accordance with each state.

The pair control table 31 and the group control table 32 are stored into a memory, for example, the shared memory 9, in the storage system 1 by the control unit 5 and are controlled.

<Multiple-Replica Creation Function>

Figure 6:
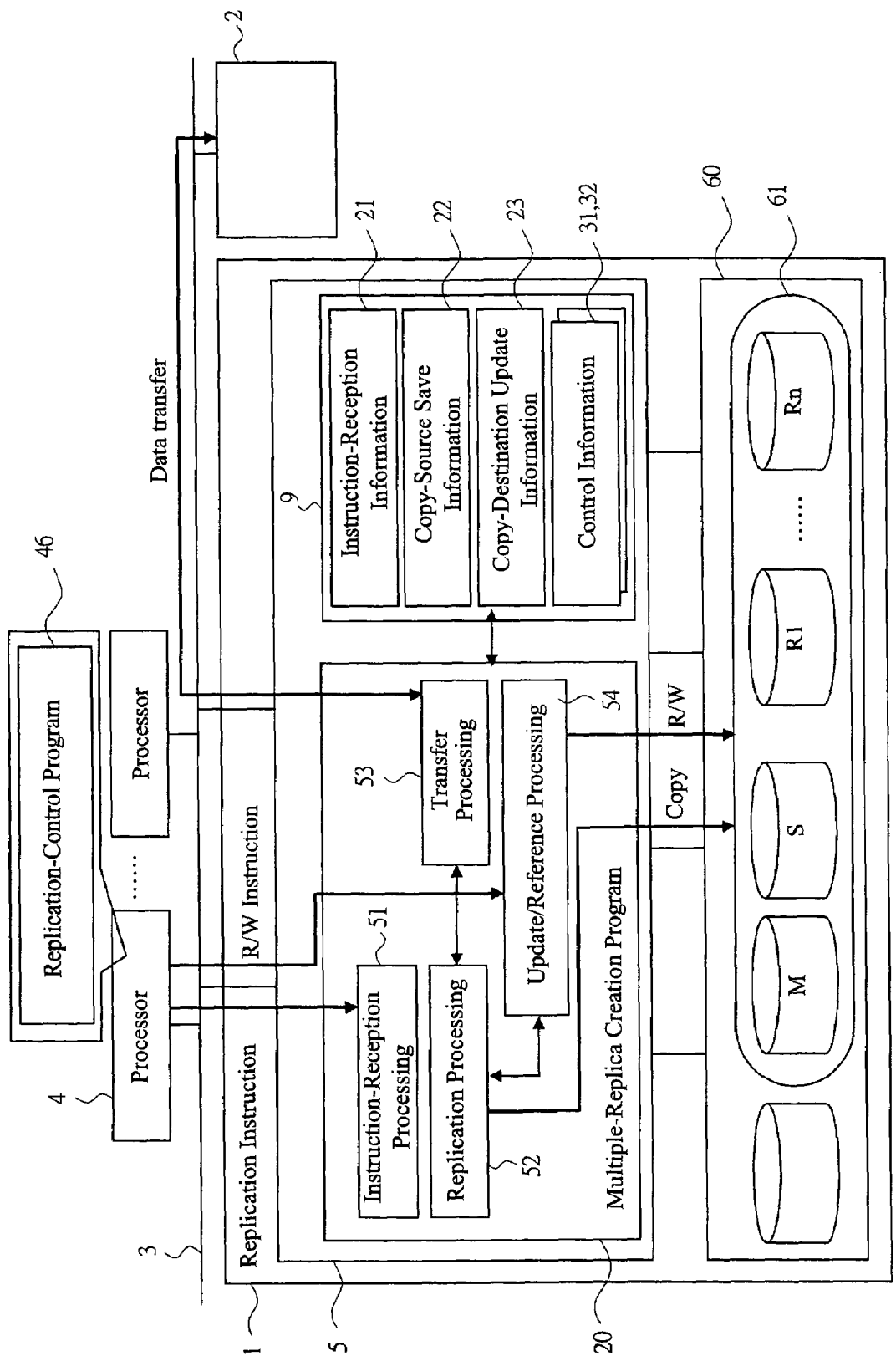
FIG. 6 is a diagram illustrating a functional block configuration related to a multiple-replica creation function in a storage system according to a first embodiment of the present invention and a computer system including the storage system.

The multiple-replica creation processing will be described by a multiple-replica creation function which the storage system 1 possesses. FIG. 6 is a diagram showing a functional block configuration related to the multiple-replica creation function in the storage system 1 and a computer system including the storage system. The storage system 1 possesses a multiple-replica creation program 20 in the CHA 7 and the DKA 10 of the control unit 5, and the multiple-replica creation program 20 executes a processing including an instruction-reception processing 51, a replication processing 52, a transfer processing 53, and an updating/reference processing 54. In the shared memory 9 as the memory in the storage system 1, for example, an instruction-reception information 21, pair control information 31, and group control information 32, other control information, copy-source save information 22, and copy-destination update information 23, etc. are stored, as the information which the multiple-replica creation program 20 handles. In addition, in the storage area 60 offered by the storage device 6, a group 61 that is a processing target in the multiple-replica creation processing and is composed of a plurality of related LUs is included. In the group 61, a copy-source volume M, a save volume S, a copy-destination volume R {R1 to Rn} are included. That is, the group 61 includes the consistency group and the save volume S. The processor 4 issues read/write instructions (R/W instructions) to the storage system 1, as well as issues the multiple-replica creation instructions (replication instruction) from the replica control program 46.

The control unit 5 of the storage system 1, in particular, the CHA 7 receives a single replication instruction issued from the replica control program 46 of the processor 4 via the network 3. In the replication instruction, designations of one copy-source volume M and a plurality of copy-destination volumes R by the operator of the processor 4 are included. First, the multiple-replica creation program 20 which operates on the control unit 5 carries out the instruction, reception processing 51. For the instruction reception processing 51, the CH 7 on the basis of the replication instruction received stores the instruction reception information 21 including: the information that indicates that the replication instruction is received (or reception instruction itself); and the designation information of the copy-source volume M and the copy-destination volume R included in the instruction in the memory of the storage system 1, for example, the shared memory 9. In the instruction reception information 21, an instruction reception time etc. may be included.

Then, the multiple-replica creation program 20 on the control unit 5 establishes the consistency group with a plurality of LUs included in conformity to the designation of the copy-source volume M and the copy-destination volume R. The multiple-replica creation program 20 establishes the group-control information 32 in the group-control table. In addition, to respond to the group-control information, the program sets pair-control information 31 in the pair-control table. For example, as shown in FIG. 5, the consistency group of the group #1 is newly set. And, for example, as shown in FIG. 4, to the consistency group of the group #1, n pairs of the pairs #1 through #n are set, and the primary volume of each pair is set to the primary volume #1 and the secondary volume is set to the secondary volumes #1 though #n. In addition, because the replication instruction has been received, the program turns ON the instruction-reception flag of the group #1 in the group-control information 32. And, the control sets the pair-control state of the pairs #1 through #n included in the group #1 of the pair-control information 31 all to the "transition" state.

Since the instruction-reception flag of the group #1 is turned ON, it is identified for the pairs included in the group #1 that they are in the condition in which the multiple-replica creation processing is started. Thereafter, when the updating or reference access to the LU to be a replica processing target occurs from the processor 4 during this multiple-replica creation processing, an updating/reference processing 54 is executed for ensuring the data consistency and thereby a plurality of replicas are created at the designated copy destination while the data consistency in the data of the related LU is ensured.

After the instruction-reception flag is turned ON, the multiple-replica creation program 20 conducts the processing for returning a response indicating that the multiple-replica creation process is normally carried out to the processor 4 at the instruction source. The CHA 7 transmits the relevant response to the processor 4 at the instruction source.

As one processing example, the multiple-replica creation program 20 starts the replication processing 52 to each designated pair after the receipt of the replication instruction at the time of receiving the updating/reference access to the LU of the above-mentioned pair. That is, the processing for creating the substance (replicated data) of the replicated volume may be started when the access to the replicated volume (no substance) occurs from the side of the processor 4. The processing for creating the substance of the replicated volume means a processing for creating the data of the secondary volume whose data content coincides with that of the primary volume by carrying out the data-copying processing necessary for changing from the copy-source volume M (primary volume) to the copy-destination volume R (secondary volume).

In addition, the processing for creating the substance of the replicated volume is done, too, by conducting the replication processing 52 sequentially one by one for a plurality of pairs included in the above-mentioned consistency group on the basis of the instruction reception information 21. The multiple-replica creation processing for performing the replication processing 52 sequentially to the plurality of pairs will be discussed later.

<Storage Volume in Creating Multiple Replicas>

FIG. 7 is an explanatory diagram for showing a LU to be a processing target and control information in creating a plurality of replicas in the storage system 1 of the first embodiment. In each embodiment, as the LU related to the multiple-replica creation processing, there are a copy-source volume M, a plurality of copy-destination volumes R {R1, R2, ..., Rn}, and a save volume S. The multiple-replica creation program 20 conducts a processing in which replicas to be replication target data stored in the designated copy-source volume M are created to a plurality of different copy-destination volumes R {R1, R2, ..., Rn}, that is, in which a plurality of replication processings 52 is performed, with respect to a plurality of pairs (pairs #1 through #n) to be processing targets at one multiple-replica creation processing. In each embodiment, as an example, the reference symbol "LU" denotes a replication unit when the plurality of replicas are created. That is, all the data stored in the LU which becomes the designated copy-source volume M is designated as the replication target data, and the same data as the replication target data is stored in the LU which becomes n copy-destination volumes R, respectively. Note that reference symbol "R" denotes the case where a plurality of copy-destination volumes are not distinguished. The copy-source volume M and the copy-destination volume R correspond to the primary volume and the secondary volume in the respective pairs. Further, in each embodiment, the relationship between the copy-source volume M and the copy-destination volume R in the pair is in the form of a tree, that is, the relationship in which a plurality of copy-destination volumes R are associated with one copy-source volume M as a pair. One consistency group is formed by one copy-source volume M and a plurality of copy-destination volumes R.

The copy-source volume M is an LU in which the copy-source data is stored at the time of the multiple-replica creation. The copy-destination volume R is an LU in which the copy-destination data is stored at the time of the multiple-replica creation. The save volume S is an LU secured and used for conducting a save processing for the data consistency security as later discussed with respect to the copy-source data at the time of receiving a replication instruction at the control unit 5 during the multiple-replica creation. The copy-source volume M or copy-source data included therein and the copy-destination volume R are designated in the replication instruction from the processor 4. The save volume S is secured in the storage area on the storage device 6 on the basis of the setting as to whether the save processing is carried out in the storage system 1. For example, the save volume S is automatically secured and used in the storage system 1 when execution of save processing is necessary.

A plurality of pairs {pairs #1, #2, . . . , #n} (n pairs) are formed by the copy-source volume M and a plurality of copy-destination volumes R. The plurality of pairs are not necessarily established when the multiple-replica creation is started. What is required is that the copy source and the copy destination corresponding to the plurality of pairs are solely designated in the single replication instruction from the processor 4, and the plurality of pairs are established by the processing performed on the side of the storage system 1. By the replication processing 52 for each pair of copy-source volume M and copy-destination volume R in the multiple-replica creation processing, the pair-control state is changed from each "simplex" state of two storage volumes to the "split" state via the "transition" state. The replication processing 52 for one pair in the multiple-replica creation processing corresponds to a pair-split processing in terms of conventional replication function. However, the present embodiment differs from it in that the pair-control state changes to the "split" state without interposing the "pair" state.

The copy-destination volume R may be arranged in the same storage system 1 as the copy-source volume M or may be arranged in other storage system 2. Or, it may be arranged across a plurality of storage systems. Or, the copy-destination volume R may be the LU which have already been established or the LU which is newly established for the multiple-replica creation. In addition, the save volume S for the copy-source volume M is secured in the storage system 1 or other storage system 2. As an example, the case where the copy-source volume M, the plurality of copy-destination volumes R, and the save volume S are all secured in the same storage system 1 will be described below. However, the plurality of storage volumes may be arranged across a plurality of storage systems. In the case where the plurality of storage volumes are arranged across the plurality of storage systems, for example, the data is transferred through the control of the CHA 7 by the transfer processing 53 between the storage systems.

In the storage system 1 according to the first embodiment, based on a policy related to the data storage in the computer system including the storage system 1, the data save processing is carried out for the primary volume, that is, the copy-source volume M. This data save processing is a processing related to the security of the data consistency in the related plurality of LUs in the multiple-replica creation processing. The data save processing is a processing for saving the pre-updating data by copying it to the save volume S when an update access such as a write instruction to the data of the copy-source volume M occurs primarily. After the data is saved, the post-updated data is written on the copy-source volume M. Whether the data save processing is carried out can be chosen by the user who uses the processor 4. If the save processing is carried out, the save volume S which is a storage volume for saving is established for the data of copy-source volume M in the storage system 1.

<Control Information in Multiple-Replica Creation>

In FIG. 7, the storage system 1 creates and holds the copy-source save information 22 in the shared memory 9 of the control unit 5 in correspondence to the copy-source volume M, as the control information used for the multiple-replica creation. In addition, the storage system 1 creates and holds the copy-destination update information 23 {23-1, 23-2, . . . , 23-n} in the shared memory 9 of the control unit 5 in correspondence to a plurality of copy-destination volumes R. When the instruction reception information 21 is stored in the shared memory 9 after the receipt of the replication instruction in the control unit 5, the copy-source save information 22 and the copy-destination update information 23 are newly created in correspondence to the LUs to be the designated copy source and copy destination, respectively. The control unit 5 judges the data save state and the data update state in the storage volume related to the multiple-replica creation, respectively, by referring to the control information (22 and 23).

The copy-source save information 22 is control information used for controlling and identifying the save state of the data stored in the copy-source volume M in the bitmap form. The copy-source save information 22 is created and held one per one copy-source volume M. In this bitmap, one bit of ON ("1")/OFF ("0") corresponds to each piece of sub data in the copy-source volume M. The sub data adopts, for example, block, track, and file, etc. as units.

The copy-destination update information 23 is control information used for controlling and identifying the update state of the data stored in the copy-destination volume R in the bitmap form. Note that updating of the data stored in the copy-destination volume R means updating of the data by the write instruction etc. from the processor 4. It must be noted that this is not the updating by copying the data from the side of the copy-source volume M in the replication processing 52. The copy-destination update information 23 is created and held one per one copy-destination volume R. In this bitmap, one bit of ON ("1")/OFF ("0") corresponds to each one piece of sub data in the copy-destination volume R.

Note that, in the present embodiment, the control information such as the copy-source save information 22, and the copy-destination update information 23 is expressed in the bitmap form, but other forms may be used if the data save and the data update state can be identified.

FIG. 8 is a table that indicates an updating state of the copy-source save information 22 and the copy-destination update information 23, which are control information for creating the multiple replicas. The control unit 5 creates the copy-source save information 22 in units of the copy-source volume M, and is stored in the shared memory 9. In addition, the control unit 5 creates the copy-destination update information 23 in units of the copy-destination volume R and is stored in the shared memory 9. The control unit 5 turns ON ("1") bits in the copy-source save information 22 when the replication instruction from the processor 4 is received. That is, when the copy-source save information 22 is newly created, all bits are turned ON. When saving to the save volume S occurs to certain sub data in the copy-source volume M, the control unit 5 updates the bits corresponding to the above-mentioned sub data in the copy-source save information 22, that is, turns OFF ("0"). When the update access to the data of the copy-source volume M occurs, the control unit 5 refers to the copy-source save information 22. Since that the corresponding bit is OFF indicates that the information has been saved, the control unit 5 does not carry out the data save processing any more and maintains the corresponding bits OFF.

Similarly, the control unit 5 turns ON ("1") bits in the copy-destination update information 23 when the replication instruction is received from the processor 4. That is, when the copy-destination update information 23 is newly created, bits are all turned ON. When any update occurs to certain sub data in the copy-destination volume R, the control unit 5 updates the bits corresponding to the above-mentioned sub data in the copy-destination update information 23, that is, turns OFF ("0") them. When the update access to the data of the copy-destination volume R occurs, the control unit 5 refers to the copy-destination update information 23. If the corresponding bit is OFF, the information becomes already updated, so that even if the update processing is further carried out, the corresponding bit remains OFF.

In FIG. 7, the initial condition when the replication instruction is received in the storage system 1 is shown. As an example, the data "a" is stored as the sub data in the copy-source volume M. Since the replication processing 52 is not yet started, a plurality of copy-destination volumes R are in the initial condition and no data are in the sub data that corresponds to the data "a" of the copy-source volume M. The save volume S is also in the initial condition and no data are in the corresponding sub data. In addition, as the control information, respective bits of the copy-source save information 22 are all in the ON ("1") state, and respective bits of the copy-destination update information 23 are all in the ON ("1") state.

<Multiple-Replica Creation Instruction>

In the replication instruction issued from the replication control program 46 on the processor 4, a plurality of information designating copy-source volume M and copy-destination volume R are included in addition to information on an instruction name, an instruction source, and an instruction destination. For example, in the designated copy-source and copy-destination information, identification information on {M, R1, . . . , Rn} of the LUs to be processing targets, for example, an LU number are included and thereby a plurality of pairs (pairs #1 through #n) are designated. Or, the designated copy-source and copy-destination information may be of the form in which the established consistency group is designated. In addition, it may be of the form for designating the designation information of the copy-source volume M and a replica number n, or the form for designating a range of a storage area to be a target for creating a plurality of copy-destination volumes R. The multiple-replica creation program 20 of the storage system 1 runs under the form in which the copy-destination volume R is not directly designated by an LU number etc. as is the case of designation of the replica number n. The multiple-replica creation program 20 runs under the form as mentioned above and conducts a processing etc. for appropriately selecting or newly securing the LU to be a replication volume.

In the case of the multiple-replica creation, the operator of the processor 4 displays on a screen the information (LU information) on the usable LUs which are secured in the storage system 1 through the user interface on the replication control program 46, and confirms the displayed information. The replication control program 46 acquires and can display various kinds of pieces of information related to the pair-control information 31, and the group control information 32, etc. in addition to the LU information as mentioned above from the storage system 1 in the computer system. The operator of the processor 4 enters the designated information for creating the plurality of replicas for the desired data on the basis of the confirmation of the control information. For example, when the user interface is a CUI, the instruction name in the replication instruction, the LU numbers to be a plurality of pieces of designated copy-source and copy-destination information, and the like are entered in the command line. In addition, when the user interface is a GUI, the operator chooses the replication instruction from the menu in Web browser etc. or chooses the LU number to the copy-source or copy-destination from the LU-control information, and then presses an execution button after confirming other related information. The operator of the processor 4 chooses LU items to be the copy-source volume M and copy-destination volume R from the LU information displayed on the screen or from the information related to the pair or consistency group. In response to these instruction entries, a single replication instruction is issued by the processing of the replication control program 20 and transmitted to the storage system 1 which has the copy-source volume M to be a processing-request destination through the network 3.

<Update/Reference Processing>

Description will be made of the update/reference processing 54 of the multiple-replica creation processing in the storage system 1. FIGS. 9 through 15 are diagrams for describing the update/reference processing 54. The multiple-replica creation program 20 conducts the update/reference processing 54 when the data update or reference access to the copy-source volume M or copy-destination volume R occurs from the processor 4 during the multiple-replica creation processing. In the update/reference processing 54, as a basic processing policy, the updating or reference access from the processor 4 is processed, based on the data state of the copy-source volume M at the time of receiving the replication instruction and of stating the multiple-replica creation processing, in the replication processing 52 in the consistency group. The multiple-replica creation program 20 carries out different processings depending on whether a pair (access target pair) of the LUs (data) to be access targets of update/reference has undergone the replication processing 52, as the updating/reference processing 54. For example, when the update/reference access occurs during the successive replication processing 52 of a plurality of pairs as described later, the replication processing 52 is first carried out the access target pairs and then control of the write processing/read processing etc. of the above-mentioned data is carried out.

When the update/reference access to the LU to be a processing target occurs, the multiple-replica creation program 20 refers to the control information (22, 23) on the LUs of the access target pair and judges the data save and update state of the data. The multiple-replica creation program 20 conducts: the data save processing and the read/write processing in the copy-source volume M; the data copy processing from the copy source to the copy destination; and the read/write processing in the copy-destination volume R; and the like in accordance with the access target, the access kind, and the data state of the related LU (group 61 as mentioned above), etc. In addition, based on these processings, the values of the control information (22 and 23) are updated. The multiple-replica creation program 20 appropriately selects the processing target pair in accordance with the occurrence of the update/reference processing 54 and completes the replication processing 52 of all the pairs in the consistency group during the replication processing 52.

The order of the replication instruction and the update/reference instruction of the related LU is judged by, for example, reference etc. of the ON/OFF of the instruction-reception flag. That is, when the read instruction or write instruction is received by the control unit 5, the order is judged by referring to the value of instruction-reception flag in the group-control information 32 of the shared memory 9. In addition, whether the replication processing 52 has been completed with respect to the pairs is judged by the reference etc. of the pair-control state of the pair-control information 31. If the pair-control state is in the "split" state, it is understood that the replication processing 52 of the pair has been completed.

Figure 9:
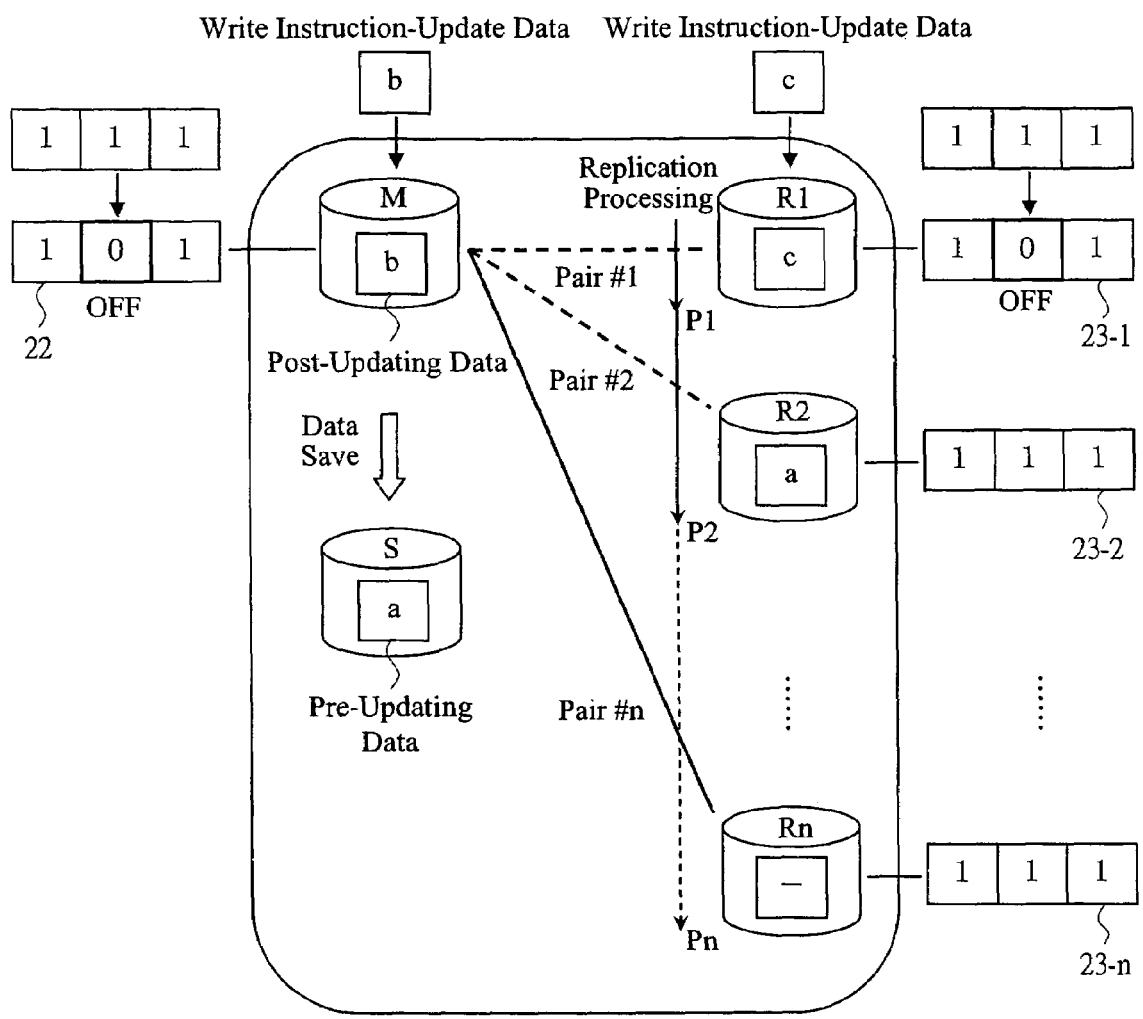
FIG. 9 is an explanatory diagram for illustrating an example of a multiple-replica creation processing related to an updating/reference processing in a storage system according to a first embodiment of the present invention.

FIG. 9 is an explanatory diagram for indicating an example of the multiple-replica creation processing related to the updating/reference processing 54 and shows one condition during the multiple-replica creation processing corresponding to that in FIG. 7. The multiple-replica creation program 20 carries out a plurality of replication processings 52 (P1 through Pn) for creating replicas to be replication target data stored in the designated copy-source volume M on a plurality of pairs (pairs #1 through #n) into n pieces of different copy-destination volumes R {R1 through Rn}. In this processing example, as the replication processing 52, there are carried out: a replication processing P1 for copying the replication target data in the copy-source volume M for the pair #1, to the corresponding area of the copy-destination volume R1; a replication processing P2 for copying the replication target data in the copy-source volume M for the pair #2, to the corresponding area of the copy-destination volume R2; and similarly a replication processing Pn for copying the replication target data in the copy-source volume M for the pair #n, to the corresponding area of the copy-destination volume Rn. The multiple-replica creation program 20 sequentially executes the replication processing 52 (P1 through Pn) while selecting, for example, one pair sequentially.

As shown in FIG. 7, in the copy-source save information 22 and the copy-destination update information 23 {23-1 through 23-n}, all the bits are turned ON ("1") at the time when the replication instruction is received. For example, as shown in FIG. 6, in such a state that the initial data "a" is stored in a certain sub data of the copy-source volume M, the replication instruction, which includes a designation for creating the replicas into a plurality of copy-destination volumes by using as the multiple target the data "a" in the copy-source volume M, is issued. After the instruction reception processing 51 at the control unit 5, for example, the replication processing 52 (P1 through Pn) is sequentially started for a plurality of designated pairs (pairs #1 through #n). By the replication processing 52, the data "a" in the copy-source volume M is copies to the corresponding area in the copy-destination volume R. For example, as shown in FIG. 9, in the replication processings P1 and P2, copying of the data "a" to the copy-destination volumes R1 and R2 is sequentially finished. Thereby, the pairs #1 and #2 are changed to the "split" state. That the pair-control state is the "split" state is illustrated using the dotted line. At this time, other copy-destination volume R is in a no-data state in the corresponding area.

For example, it is assumed that a write instruction for writing the update data "b" occurs as the update access to the data "a" in the copy-source volume M from the processor 4 after the replication processing 52 is finished from the processing P1 to P2. In this case, after reception of the above-mentioned write instruction, the multiple-replica creation program 20 first saves the pre-updating data "a" from the designated position of the copy-source volume M to the corresponding area of the save volume S, and turns OFF ("0") the corresponding bits in the copy-source save information 22, and thereafter rewrites the post-updating data "b" to the designated position of the copy-source volume M. Then, the replication processing 52 concerning the copy-source volume M is carried out using of the pre-updating data "a" in the save volume S. That is, for example in the pair #3 (not illustrated) next to the pair #2, if a copy processing has been carried out to the copy destination by using the post-updating data "b" in the copy-source volume M of the replication processing 52, data inconsistency occurs between the data "a" and the data "b" in the copy-destination volumes R. However, if the data by the use of the pre-updating data "a" in the save volume S is copied, no data inconsistency occurs.

In addition, for example, it is assumed that a write instruction for writing data "c" is generated as an update access to a portion of the data "a" in the copy-destination volume R1 from the processor 4, that is, a copied portion, during the replication processing 52 for the pair #3. In this case, since the multiple-replica creation program 20 has finished the replication processing 52 for the copy-destination volume R1 at that time, the program writes and updates the updated data "c" to the data "a" in the copy-destination volume R1 as it is, and turns OFF ("0") the corresponding bits in the copy-destination update information 23-1.

FIGS. 10A through 10D are tables showing correspondence of the control information (22 and 23.) to the execution processing, in the updating/reference processing 54 of the multiple-replica creation processing in the storage system 1 of the first embodiment. The execution processing differs in accordance with the data state (whether saved or not) of the copy-source volume M and the data state (whether updated or not) of the copy-destination volume R when the update or reference access occurs. The processings shown in FIG. 10 correspond to a flow chart shown in FIG. 11 through FIG. 14 and a state-transition diagram shown in FIG. 15, respectively. By carrying out the processing in conformity to each condition in the storage system 1, the data consistency in the consistency group can be secured.

FIG. 10A shows an update processing executed in the storage system 1 when an update access in the copy-source volume M occurs. When the control unit 5 receives the write instruction for updating the data of one copy-source volume M from the processor 4, the control unit 5 confirms the control information held in the shared memory 9. As shown in the table, in the case where the corresponding bit in the copy-source save information 22, that is, the bit which corresponds to the write designated position by the write instruction in the copy-source volume M is ON ("1"), the following processing is carried out. That the bit of the copy-source save information 22 is ON indicates the condition in which the corresponding data in the copy-source volume M is not saved, that is, the condition in which a save processing has never been carried out for the corresponding position in the copy-source volume M in the above-mentioned multiple-replica creation processing. In this time, first, the pre-updating data in the copy-source volume M is saved to the save volume S, that is, write-processed, and the corresponding bit of the copy-source save information 22 is updated from ON ("1") to OFF ("0"). After saving the pre-updating data, the corresponding data of the copy-source volume M is rewritten and updated by the post-updating data, that is, the write data from the processor 4. On the other hand, when the corresponding bit of the copy-source save information 22 is OFF ("0"), the following processing is carried out. That the corresponding bit of the copy-source save information 22 is OFF ("0") indicates the case where the corresponding data in the copy-source volume M is saved, that is, in the above-mentioned multiple-replica creation processing, the save processing has been executed at the corresponding position in the copy-source volume M. In this case, the pre-updating data in the copy-source volume M is not saved but updated and rewritten by the post-updating data. During the multiple-replica creation processing, after occurrence of the update access and execution of the corresponding processing, the replication processings 52 for the pairs are carried out using the saved data to the save volume S, that is, using the data of the copy-source volume M at the time of starting the multiple-replica creation processing. By this, the data consistency in the consistency group can be secured.

FIG. 10B shows an update processing executed in the storage system 1 when an update access occurs to the copy-destination volume R. When the control unit 5 receives a write instruction for updating the data of one copy-destination volume R from the processor 4, the control unit confirms the control information held in shared memory 9. When the corresponding bit of the copy-source save information 22 is ON and the corresponding bit of the copy-destination update information 23 is ON, the following processing is carried out. That the corresponding bit of the copy-destination update information 23 is ON indicates that the corresponding data in the copy-destination volume R is in an un-updating state, that is, that the data-update processing by the write instruction has never been executed for the corresponding position in the copy-destination volume R in the above-mentioned multiple-replica creation processing. In this case, first, the pre-updating data of the copy-source volume M is saved to the save volume S and the corresponding bit of the copy-source save information 22 is updated from ON to OFF. Further, the corresponding data of the designated copy-destination volume R is write-processed by the post-updating data, that is, by the write data from the processor 4, and the corresponding bit of the copy-destination update information 23 is updated from ON to OFF. In addition, when the corresponding bit of the copy-source save information 22 is OFF and the corresponding bit of the copy-destination update information 23 is ON, the corresponding data of the designated copy-destination volume R is write-processed and updated in the same manner, and the corresponding bit of the copy-destination update information 23 is updated from ON to OFF. In addition, when the corresponding bit of the copy-destination update information 23 is OFF, the corresponding data of the copy-destination volume R is write-processed and updated. The corresponding bit of the copy-destination update information 23 remains OFF.

FIG. 10C shows a reference processing executed in the storage system 1 when a reference access occurs to the copy-source volume M. When the control unit 5 receives the read instruction for referring to the data of one copy-source volume M from the processor 4, the control unit 5 reads the data of the designated copy-source volume M and returns it to the processor 4 at the instruction source irrespective of both states of the copy-source save information 22 and copy-destination update information 23 which are the control information. If the read target data has already been updated, the latest data updated is returned as the read data.

FIG. 10D shows a reference processing executed by the storage system 1 when a reference access occurs in the copy-destination volume R. When the control unit 5 receives a read instruction for referring to the data of one copy-destination volume R from the processor 4, the control unit 5 confirms the control information held in the shared memory 9. When the corresponding bit of the copy-source save information 22 is ON and the corresponding bit of the copy-destination update information 23 is ON, the pre-updating data of the copy-source volume M is saved to the save volume S and the corresponding bit of the copy-source save information 22 is updated from ON to OFF. Further, the control unit 5 reads the save data (pre-updating data) from the save volume S and returns it to the processor 4. In this case, as the copy-destination volume R, since it becomes an object to return the data (for example, the data "a") of the copy-source volume M at the time of starting the multiple-replica creation processing, this can be coped with by executing the above-mentioned processing. In addition, when the corresponding bit of the copy-source save information 22 is OFF and the corresponding bit of the copy-destination update information 23 is ON, both bits become saved and the corresponding saved data is read from the save volume S and returned to the processor 4. In addition, if the corresponding bit of the copy-destination update information 23 is OFF, the read target data of the specified copy-destination volume R is read and returned to the processor 4. Since the read target data has already been updated, the latest data updated is returned as read data. The corresponding bit of the copy-destination update information 23 remains OFF.

Next, referring to the flows of FIGS. 11 through 14, a processing procedure of the update/reference processing 54 in each case will be described.

Figure 11:
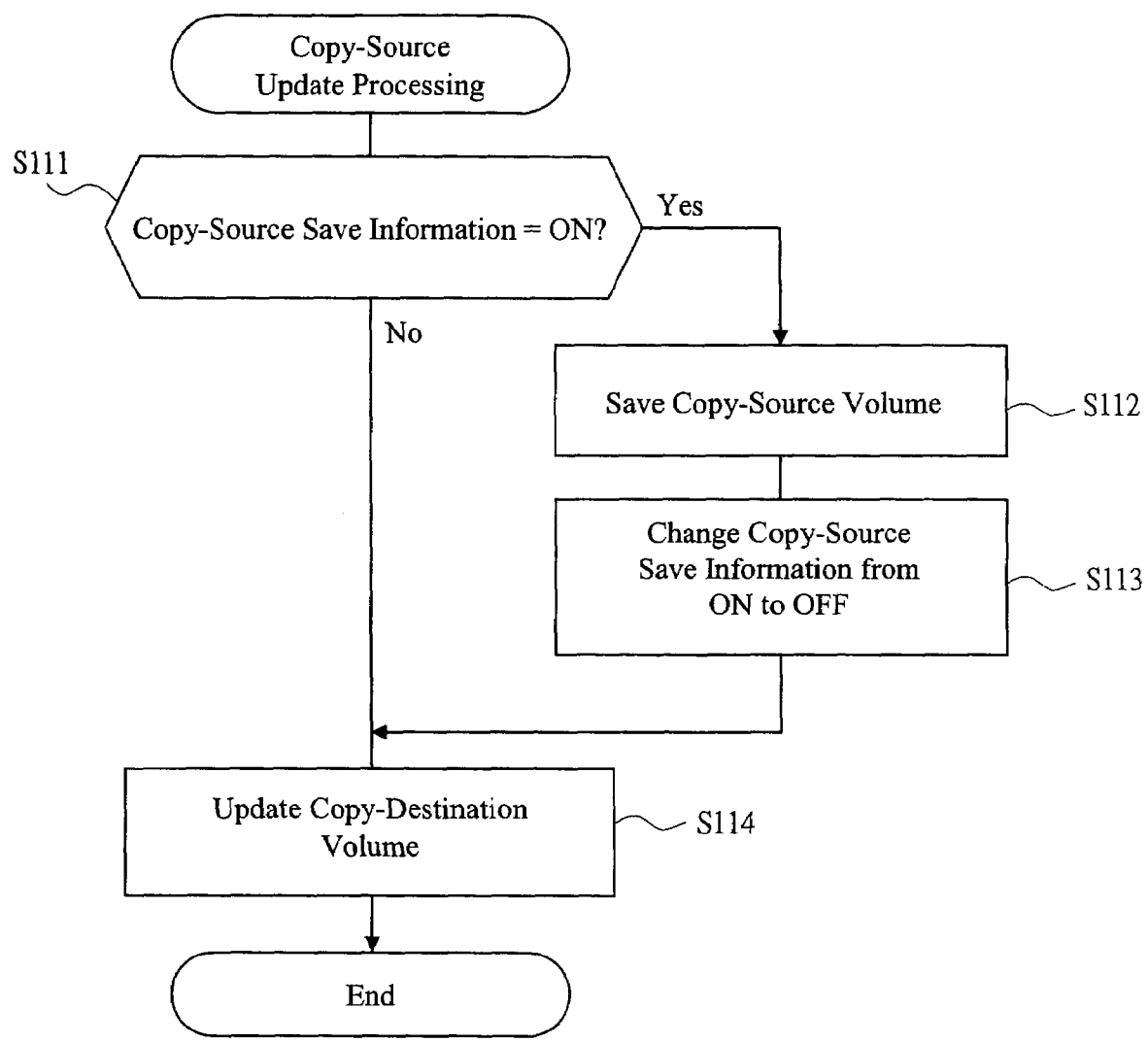
FIG. 11 is a flow chart showing a copy-source updating processing of an updating/reference processing in a storage system according to a first embodiment of the present invention.

FIG. 11 shows a flow chart of the copy-source update processing that corresponds to FIG. 10A. When the multiple-replica creation program 20 receives a write instruction for updating the data of the copy-source volume M from the processor 4 during the multiple replica creation processing, the program first confirms the bit that corresponds to the update target data in the copy-source save information 22 (S111). When the corresponding bit of the copy-source save information 22 is ON, that is, becomes unsaved, the program saves the pre-updating data of the copy-source volume M to the save volume S (S112), and updates the corresponding bit of the copy-source save information 22 from ON to OFF (S113). After the pre-updating data of the copy-source volume M is rewritten and updated by the post-updating data, that is, by the write data from the processor 4 (S114). If the copy-source save information 22 is OFF at the S111 as above described, that is, becomes saved, then saving of the corresponding data in the copy-source volume M is not carried out but updated by the post-updating data (S114).

Figure 12:
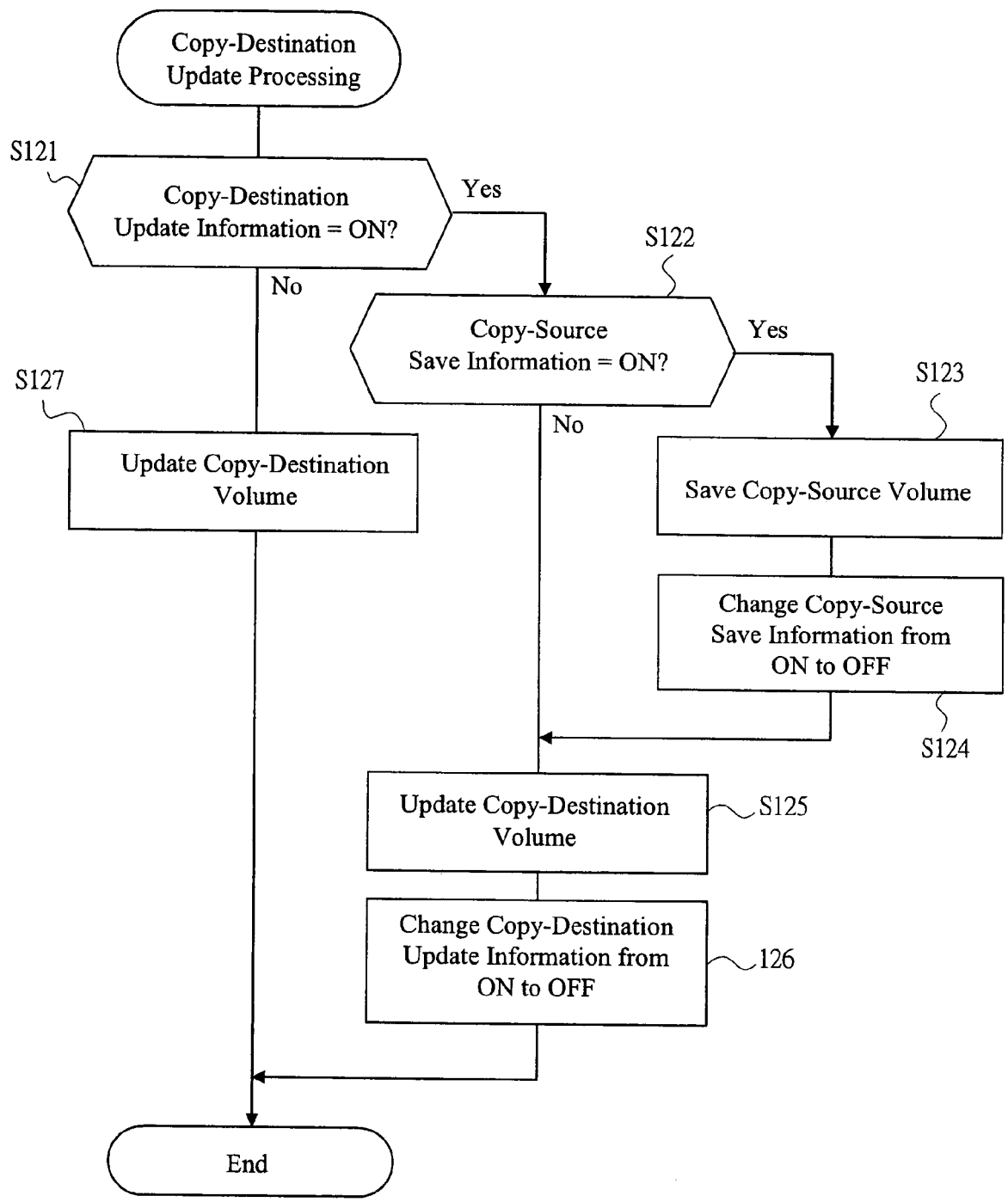
FIG. 12 is a flow chart showing a copy-destination updating processing of an updating/reference processing in a storage system according to a first embodiment of the present invention.

FIG. 12 shows a flow chart of the copy-destination updating processing that corresponds to FIG. 10B. The multiple-replica creation program 20 first confirms the bit that corresponds to the update target data in the copy-destination update information 23 when a write instruction to update the data of the copy-destination volume R is received from the processor 4 during the multiple-replica creation processing (S121). If the corresponding bit of the copy-destination update information 23 is ON, that is, becomes un-updated, the multiple-replica creation program further confirms the corresponding bit of the copy-source save information 22 (S122). Further, when the corresponding bit of the copy-source save information 22 is ON, that is, becomes unsaved, the multiple-replica creation program saves the corresponding data of the copy-source volume M to the save volume S (S123) and updates the corresponding bit of the copy-source save information 22 from ON to OFF (S124). The multiple-replica creation program rewrites and updates the update target data of the copy-destination volume R by the post-updating data, that is, by the write data from the processor 4 (S125), and updates the corresponding bit of the copy-destination update information 23 from ON to OFF (S126). If the copy-source save information 22 is OFF in S122, that is, becomes saved, the multiple-replica creation program does not save the corresponding data of the copy-source volume M but updates the update target data of the copy-destination volume R and the copy-destination update information 23 (S125, S126). When the corresponding bit of the copy-destination update information 23 is OFF in S121, that is, becomes updated, the multiple-replica creation program rewrites and updates the update target data of the copy-destination volume R by the post-updating data (S127).

Figure 13:
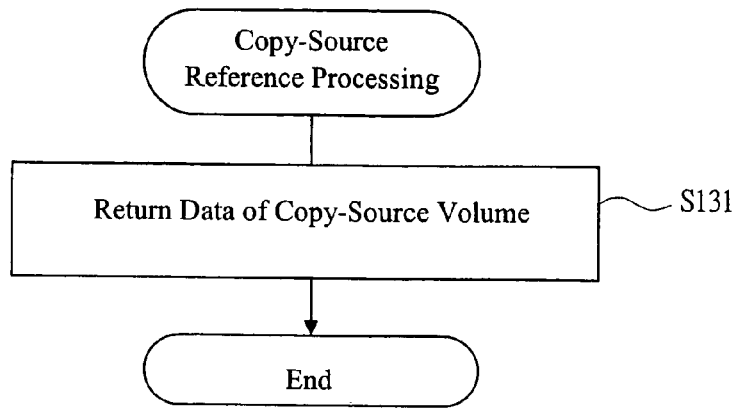
FIG. 13 is a flow chart showing a copy-source referring processing of an updating/reference processing in a storage system according to a first embodiment of the present invention.

FIG. 13 shows a flow chart of the copy-source reference procedure that corresponds to FIG. 10C. When a read instruction to refer to the data of the copy-source volume M is received from the processor 4 during the multiple-replica creation processing, the multiple-replica creation program 20 reads the data to be a read target from the designated copy-source volume M and returns it to the processor 4 as an instruction source, irrespective of the states of the copy-source save information 22 and the copy-destination update information 23 which are the control information (S131).

Figure 14:
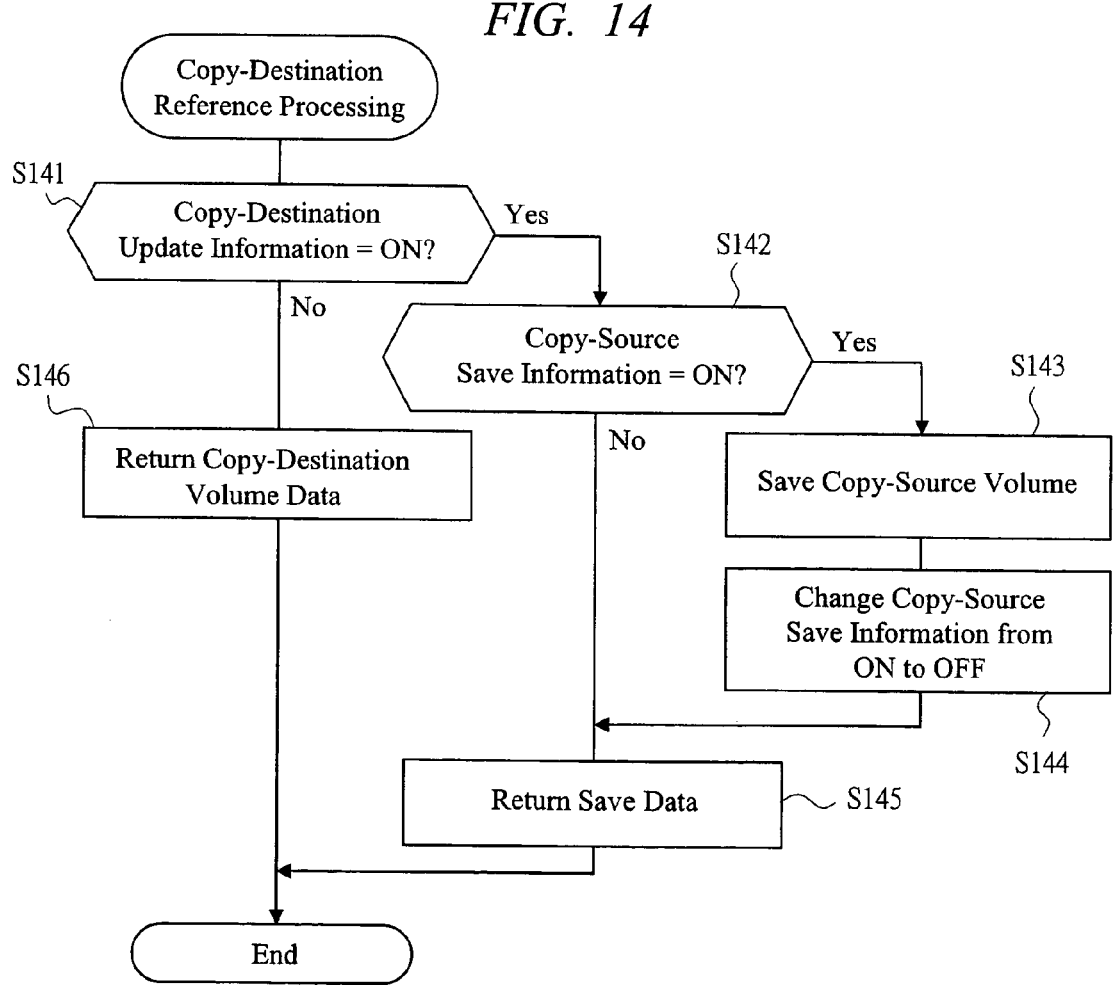
FIG. 14 is a flow chart showing a copy-destination referring processing of an updating/reference processing in a storage system according to a first embodiment of the present invention.

FIG. 14 shows a flow chart of the copy-destination reference procedure that corresponds to FIG. 10D. When a read instruction to refer to the data of the copy-destination volume R is received from the processor 4 during the multiple-replica creation processing, the multiple-replica creation program 20 confirms the bit that corresponds to the read target data in the copy-destination update information 23 (S141). When the corresponding bit of the copy-destination update information 23 is ON, that is, becomes un-updated, the multiple-replica creation program 20 further confirms the corresponding bit of the copy-source save information 22 (S142). If the corresponding bit of the copy-source save information 22 is ON, that is, becomes unsaved, the multiple-replica creation program 20 saves the corresponding data of the copy-source volume M to the save volume S (S143) and updates the corresponding bit of the copy-source save information 22 from ON to OFF (S144). Further, the multiple-replica creation program 20 reads the corresponding saved data (pre-updating data) from the save volume S and returns it to the processor 4 (S145). If the corresponding bit of the copy-source save information 22 is OFF at the S142 as described above, the multiple-replica creation program 20 does not carry out save the processing because the data has been saved, and reads and returns the saved data from the save volume S (S145). If the corresponding bit of the copy-destination update information 23 is OFF at the S141 as above described, that is, becomes updated, the multiple-replica creation program 20 reads the read target data of the designated copy-destination volume R and returns it to the processor 4 (S146).

Figure 15:
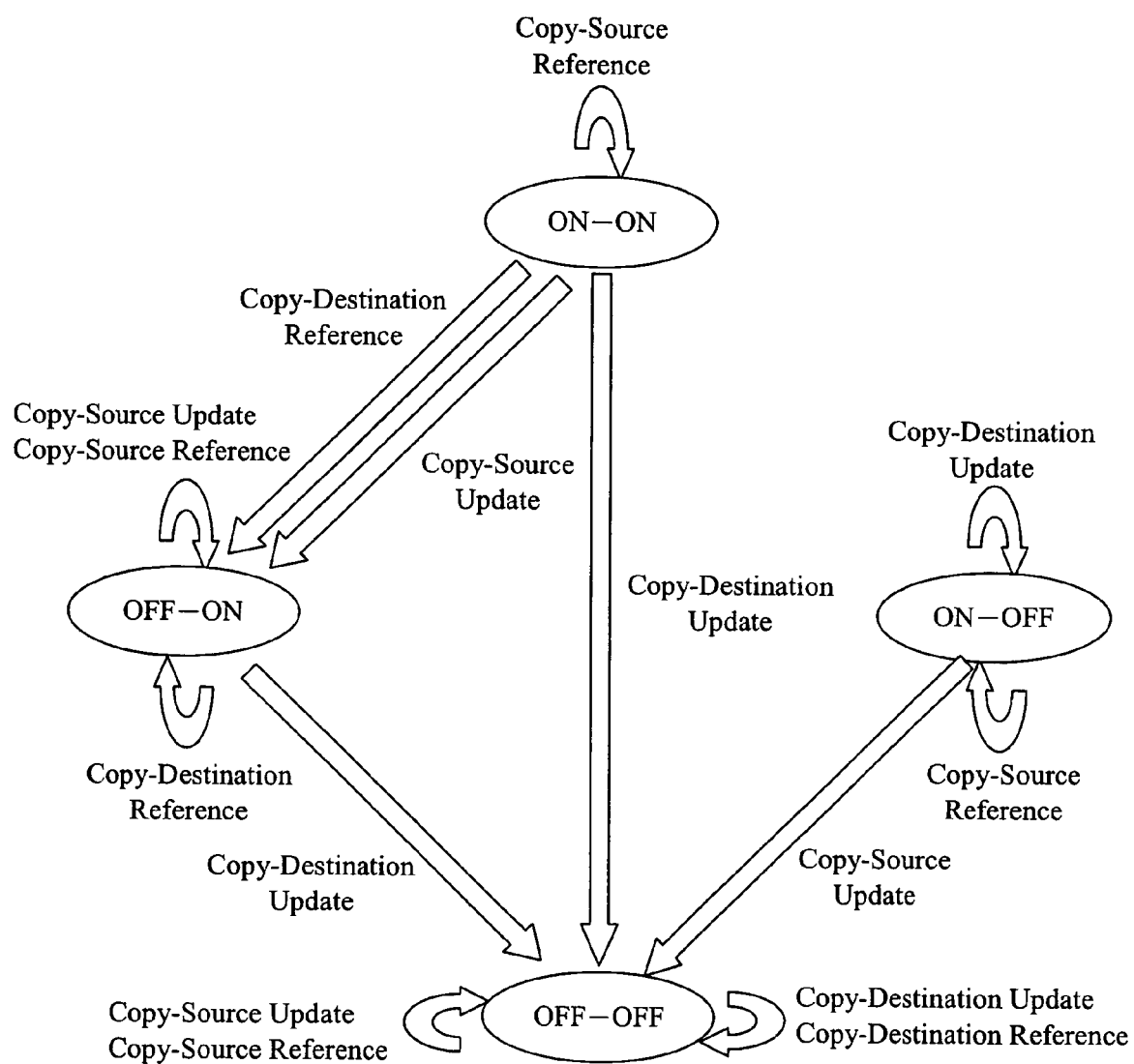
FIG. 15 is a state transition diagram showing a copy-source save information and a copy-destination update information when an updating/reference processing is conducted in a multiple-replica creation processing in a storage system according to a first embodiment of the present invention.

FIG. 15 is a state-transition diagram of the copy-source save information 22 and the copy-destination update information 23 when the updating/reference processing 52 is conducted in the multiple replica creation processing. The "ON-ON" state in the figure indicates that when the bit of the copy-source save information 22 on the left side is ON and at the same time the corresponding bit of the copy-destination update information 23 is OFF on the right side. Similarly, another state also indicates an "ON-OFF" combination of the bit of the copy-source save information 22 and that of the copy-destination update information 23. The arrow mark in the figure indicates the occurrence of access from the processor 4 and the transition of the states associated with the update/reference processing 54. For example, the reference access to the copy-source volume M in an "ON-ON" state remains unchanged, and the update access to the copy-source volume M and the reference access to the copy-destination volume R are changed to "OFF-ON" states, and the update access to the copy-destination volume R is changed to an "OFF-OFF" state. Other states are also changed as shown in the figure in accordance with the update/reference processing 54.

<Flow of Multiple-Replica Creation Processing>

Figure 16:
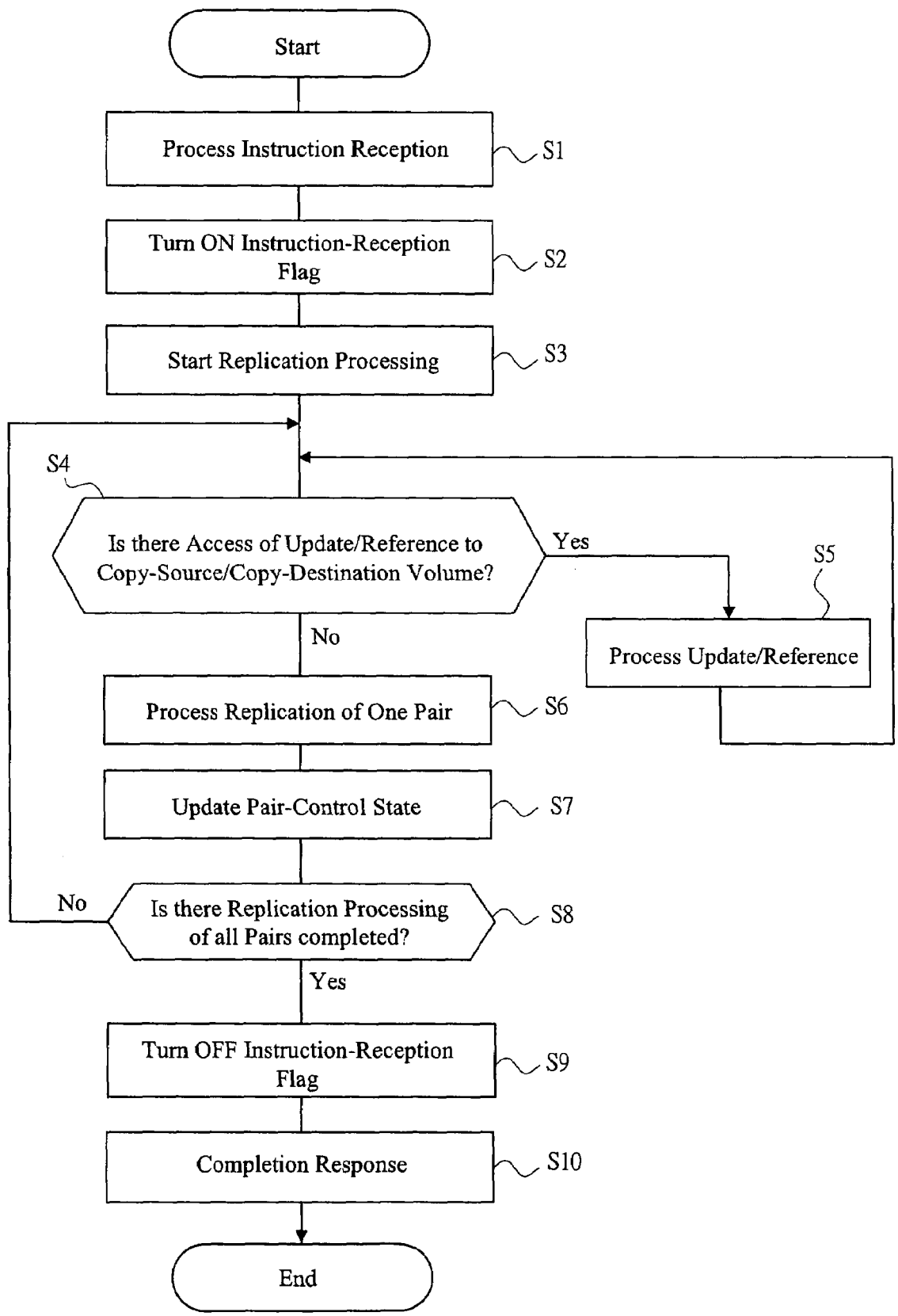
FIG. 16 is a flow chart showing a multiple-replica creation processing in a storage system according to a first embodiment of the present invention and, in particular, indicates a processing example when a replication processing is conducted sequentially for a plurality of pairs.

FIG. 16 is a flow chart of the multiple-replica creation processing in the storage system 1 in the first embodiment and, in particular, indicates a processing-procedure example when the replication processing 52 is executed sequentially for a plurality of designated pairs. In this processing procedure, based on the instruction-reception information 21, the replication processing 52 is carried out sequentially per pair for a plurality of pairs which belong to the consistency group. By carrying out the necessary data-copy processing from the copy source to the copy destination and conducting the replication processing 52 for creating the replication volumes, each pair is changed sequentially to a "split" state. The multiple-replica creation program 20 refers to the control information such as the copy-destination save information 22, the copy-destination update information 23, the pair-control information 31, and the group-control information 32, and judges the save or update state of the data in the copy-source volume M or copy-destination volume R, and sequentially executes the replication processing 52 for the plurality of pairs during the judgment thereof. The pair processing order of the successive replication processing 52 can be appropriately selected in accordance with the occurrence etc. of the update/reference processing 52.

First, the multiple-replica creation program 20 on the control unit 5 receives the replication instruction from the processor 4 and conducts the instruction reception processing for storing the instruction reception information 21 in the storage system 1 (S1). For example, the CHA 7, which has received the replication instruction from the processor 4, conducts the processing for storing, in the shared memory 9, the instruction reception information 21 including the designated copy-source and copy-destination information etc. Then, the multiple-replica creation program 20 establishes a consistency group including the copy-source volume M and a plurality of copy-destination volumes R, in the group control information 32 on the basis of the instruction reception information 21. Further, the multiple-replica creation program 20 turns ON the instruction-reception flag of the group. In addition, as occasion demands, the multiple-replica creation program 20 creates the control information such as the copy-source save information 22 and the copy-destination update information 23 that correspond to the group, and stores it in the shared memory 9 (S2).

The multiple-replica creation program 20 begins the multiple-replica creation processing when the instruction-reception flag is turned ON (S3). For example, the DKA 10 begins the multiple-replica creation processing by referring to the instruction reception information 21 when new instruction reception information 21 is stored in the shared memory 9. In steps (S4 through S8) subsequently thereto, the multiple-replica creation program 20 executes sequentially the replication processing 52 per pair of the plurality of pairs included in the consistency group.

The multiple-replica creation program 20 checks whether any update/reference access occurs to the copy-source volume M or copy-destination volume R after the receipt of the replication instruction and before the multiple-replica creation program 20 executes the replication processing 52 for one pair (S4). If any update/reference access occurs (S4-Yes), the multiple-replica creation program 20 executes the update/reference processing 54 in accordance with the data states of the LUs related at the time of occurrence of various accesses in order to secure the data consistency in the consistency group (S5). For example, when the write instruction or read instruction is received from the processor 4 by the CHA 7 and the above-mentioned instruction is stored in the shared memory 9, the DKA 10 executes the update/reference processing 54.

When no update/reference access occurs (S4-No), the multiple-replica creation program 20 executes the replication processing 52 for the optionally chosen one pair (S6). In the replication processing 52, the storage system 1 which possesses the copy-source volume M carries out a processing for copying the replication target data in the copy-source volume M to the corresponding position in the copy-destination volume R, sequentially in a predetermined data unit, for example, in a track unit etc., on the basis of a pointer that indicates a copy-processing position. For example, the DKA 10 first reads, on the cache memory 8, the replication target data from the LDEV that corresponds to the copy-source volume M on the storage device 6, and then writes the read data into the LDEV that corresponds to the copy-destination volume R on the storage device 6. If the copy-destination volume R is located at any areas different from the copy source in the storage system 2, the replication target data is transferred by a transferring processing 53 through the CHA 7 and the network 3 and, after the CHA 7 temporarily cashes the data at the storage system 2 on the transferred site, the data is written into the copy-destination volume R in the storage system 2.

In the replication processing 52, when the data-copying processing is completed for one pair and a replicated volume is created, the multiple-replica creation program 20 changes the pair-control state of the corresponding pair from the "transition" state to the "split" state in the pair-control information 31 (S7).

After the replication processing 52, the multiple-replica creation program 20 checks whether the replication processing 52 has been completed for all the pairs which belong to the consistency group by reference etc. to the pair-control state (S8), and repeats the replication processing 52 until the processing is finished for all the pairs. After the completion of the replication processing 52 for all the pairs (S8-Yes), the multiple-replica creation program 20 turns OFF the instruction-reception flag in the group-control information 32 (S9). By turning OFF the instruction-reception flag, the completion of the multiple-replica creation processing in the corresponding consistency group is identified. And, the multiple-replica creation program 20 returns a response for reporting that the creation of the designated number of replications has been completed, to the processor 4 as an instruction source by, for example, the CHA 7 (S10).

Note that, with respect to the update/reference processing 54 (S5), even when any update/reference access occurs during the replication processing 52, an update/reference processing of the pertinent data may be controlled after the replication processing 52 has been completed for all the pairs without the update/reference processing for the pertinent data. In the case of this control, the response of the update/reference of the data to the processor 4 is delayed for the control.

By the foregoing processing, in the storage system 1 of the first embodiment, the plurality of pair-creation instructions for establishing pairs of a plurality of LUs are no longer necessary, at the time of issuing the instruction for creating the plurality of replicas from the replication control program 46 of the processor 4. Only by designating the plurality of copy sources and copy destinations by a single replication instruction, the plurality of pairs are established in the storage system 1 and the "split" state, that is, the secondary volume which becomes the plurality of replicated volumes to the primary volume, is created to become accessible independently from the primary volume. In addition, even if any update/reference access is made to the LU related at the same timing during the multiple-replica creation processing, the update/reference of the data is processed with the data consistency being secured. Further, it is possible to achieve a useful processing such as a backup processing by using the plurality of replicas created by the multiple-replica creation function.

<Processing Example using Multiple Replicas>

Figure 17:
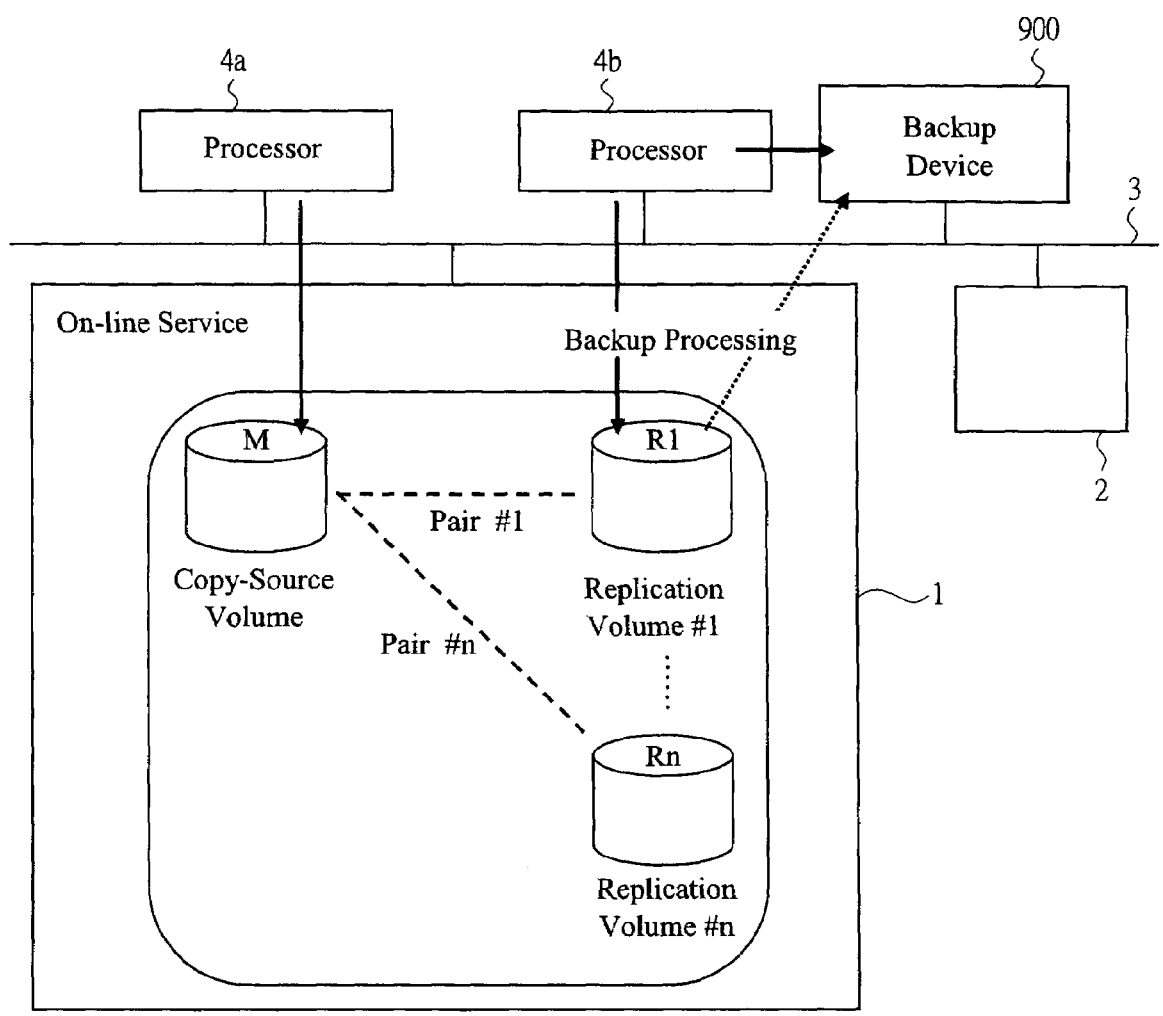
FIG. 17 is a diagram illustrating a backup processing as a processing example using a plurality of replicated volumes created by a multiple-replica creation function in a storage system according to each embodiment of the present invention.

FIG. 17 is an explanatory diagram for illustrating a backup processing as an example of processing the data of the storage volume, by using a plurality of replicated volumes created by the multiple-replica creation function. For example, there are processors 4a and 4b connected to the storage system 1 via the network 3. The processor 4a carries out around-the-clock, continuous online services using the copy-source volume M in the storage system 1. That is, the processor 4a accesses the data, for example, executes the data read/write to the copy-source volume M before and after creating the plurality of replicas. When the plurality of replicas in the copy-source volume M are hoped to be created into the copy-on volume R, a replication instruction is issued from either processor 4, for example, the processor 4b to the storage system 1 which possesses the copy-source volume M. And, by the multiple-replica creation processing which covers the storage system 1 or storage system 1 and other storage system 2, a plurality of replicated volumes #1 through #n are created for the copy-source volume M. For example, a plurality of replicated volumes #1 through #n are created in the storage area in the storage system 1. During this multiple-replica creation processing, the processors 4a and 4b can have an update/reference access to the copy-source volume M. For the processor 4b, each one of a plurality of replicated volumes #1 through #n created by the multiple-replica creation processing is made available independently from the copy-source volume M. For example, the processor 4b can carry out the data backup processing to a backup device 900 using the replicated volume #1. In addition, other replicated volumes #2 through #n may be properly used for other processing such as a testing or batch processing.

As the backup processing, for example, a backup processing can be conducted on a periphery of the processor 4b by connecting the backup device 900 to the processor 4b. In this case, the backup data of replicated volume #1 stored in the storage system 1 is acquired via the processor 4b, and the backup data is stored from the processor 4b to the backup device 900. In addition, for example, it is also possible to transfer and store the data from the storage system 1 to the backup device 900 directly via the network 3 without interposing the processor 4b. Moreover, for example, the processor 4a which utilizes the storage system 1 or copy-source volume M notifies the LU number of the processor 4b which caries out the backup processing, and enables the processor 4b to conduct the backup processing.

As applications of the multiple-replica creation function, in addition to the case where various processings such as the above-mentioned backup processing are desired to be executed, the multiple-replica creation function is effective for the case where the write data is stored across the plurality of storage volumes because the write data has a size which cannot be stored in one single storage volume, or the case of the control for automatically storing one piece of file data in the plurality of storage volumes.

Second Embodiment

Next, description will be made of a storage system in a second embodiment according to the present invention. FIGS. 18 through 27 are diagrams for describing a storage system 1B of the second embodiment. The storage system 1B of the second embodiment is the processing form that supports the case where no save processing is carried out and no save volume S is provided to the data of the copy-source volume M during the multiple-replica creation processing. In the storage system 1B of the second embodiment, no data save processing is carried out for the data of the copy-source volume M and updating and reference are processed even when any updating and reference accesses occur to the data of the copy-source volume M or copy-destination volume R. The hardware configurations of the storage system 1B and the computer system including the storage system 1B of the second embodiment are the same as that of the first embodiment shown in FIG. 2.

Figure 18:
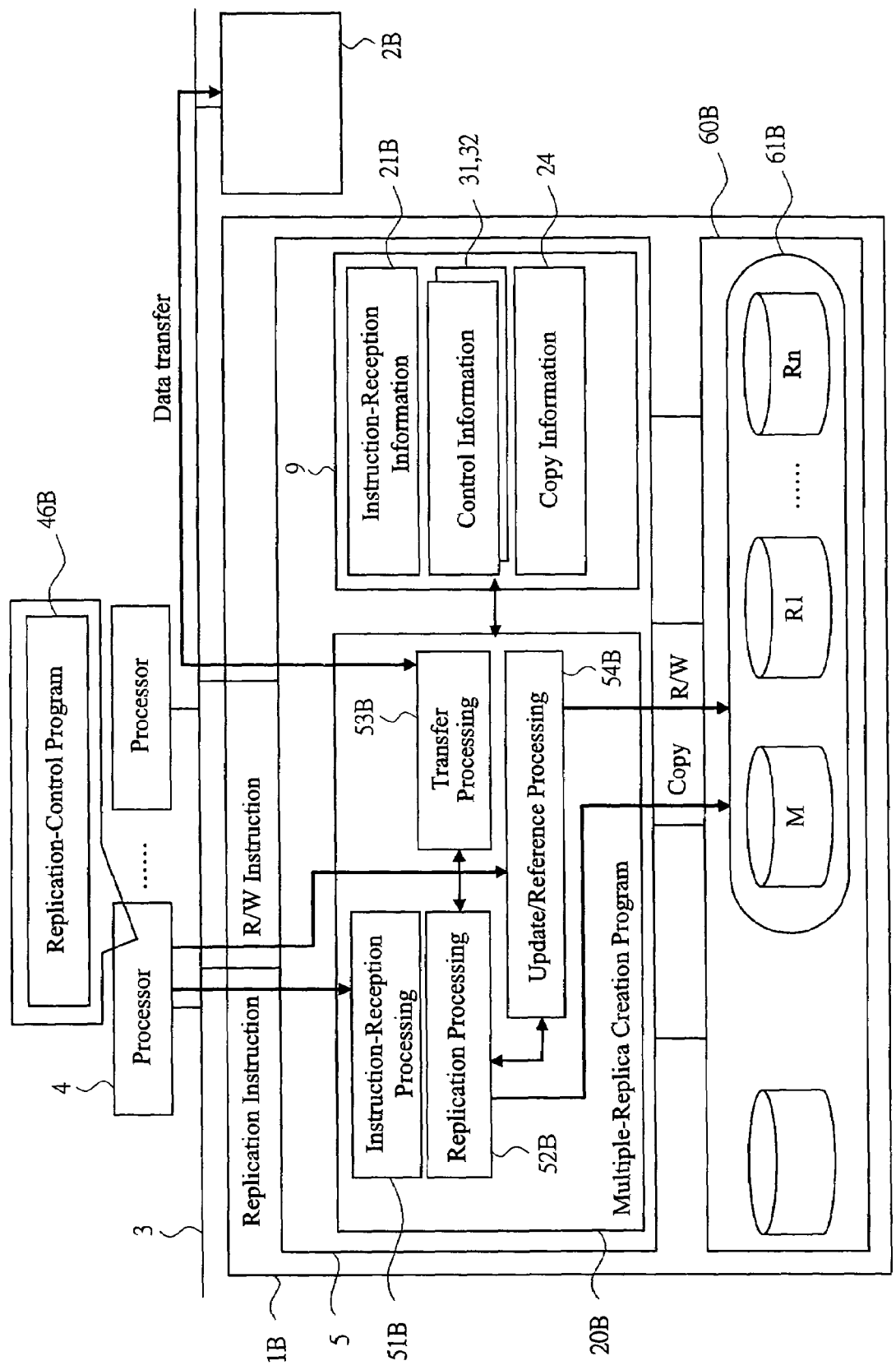
FIG. 18 is a diagram illustrating a functional block configuration related to the multiple replica creation function in a storage system according to a second embodiment of the present invention and in a computer system including the storage system.

FIG. 18 is a diagram illustrating a functional block configuration related to the multiple-replica creation function in the storage system 1B and in the computer system including the storage system 1B of the second embodiment. In the computer system which includes the processor 4 and the network 3, the storage system 1B is located at the primary site and the storage system 2B is located at the secondary site. The storage system 1B executes a multiple-replica creation program 20B by the control unit 5. The multiple-replica creation program 20B runs a processing including: an instruction reception processing 51B; a replication processing 52B; a transfer processing 53B; and an update/reference processing 54B. In the shared memory 9 in the storage system 1B, instruction-reception information 21B, pair-control information 31, and group-control information 32, other control information, and copy information 24, etc. are stored as the information which the multiple-replica creation program 20B handles. In addition, in the storage area 60B offered by the storage device 6, a group 61B which becomes a processing target in the multiple-replica creation processing and is composed of a plurality of related LUs is included. In the group 61B, the copy-source volume M and the copy-destination volume R {R1-Rn} are included. That is, the group 61 includes the consistency group. The processor 4 issues read/write instructions (R/W instructions) to the storage system 1, as well as issues multiple-replica creation instructions (replication instruction) from the replica-control program 46B. What differs from the first embodiment is primarily that: the copy information 24 is stored in the shared memory 9; no save volume S is provided in the storage area on the storage device 6; and the like. The multiple-replica creation program 20B carries out the multiple-replica creation processing without using the save volume S. The copy information 24 is the control information for identifying the data-copy state from the copy-source volume M to copy-destination volume R related to the replication processing 52B.

The outline of the processing executed by the multiple-replica creation program 20B is the same as that in the first embodiment. That is, the multiple-replica creation program 20B receives a single replication instruction from the replication-control program 46B of the processor 4, carries out the instruction-reception processing 51B, and stores the instruction-reception information 21B including the information designating the copy-source volume M and the copy-destination volume R in the shared memory 9. In addition, based on the designation of the above-mentioned copy source and copy destination, the multiple-replica creation program 20B establishes a consistency group including the plurality of LUs in the group-control information 32 and the pair-control information 31. Further, the multiple-replica creation program 20B turns ON the instruction-reception flag in the group-control information 32. And, the multiple-replica creation program 20B sets the pair-control states of the plurality of pairs in the pair-control information 31 all to the "transition" states. When the instruction-reception flag is turned ON, the multiple-replica creation program 20B begins the multiple-replica creation processing and carries out the processing for creating the replicated volumes to the plurality of pairs by the replication processing 52B and the transfer processing 53B. Thereafter, if any updating or reference access occurs to the LU to be a replication processing target from the processor 4 during the multiple-replica creation processing, the plurality of replicas are created at the designated copy destination while the data consistency is secured in the data of the related LU by executing the update/reference processing 54B for securing the data consistency. The multiple-replica creation program 20B begins the replication processing 52 for each pair after completion of replication instruction reception at the time of receiving the updating/reference access to the LUs of the relevant pair. In addition, a processing for creating the substance of the replicated volume is carried out also by conducting the replication processing 52B for the plurality of pairs included in the relevant consistency group sequentially per pair on the basis of the instruction-reception information 21B.

Figures 19, 20:
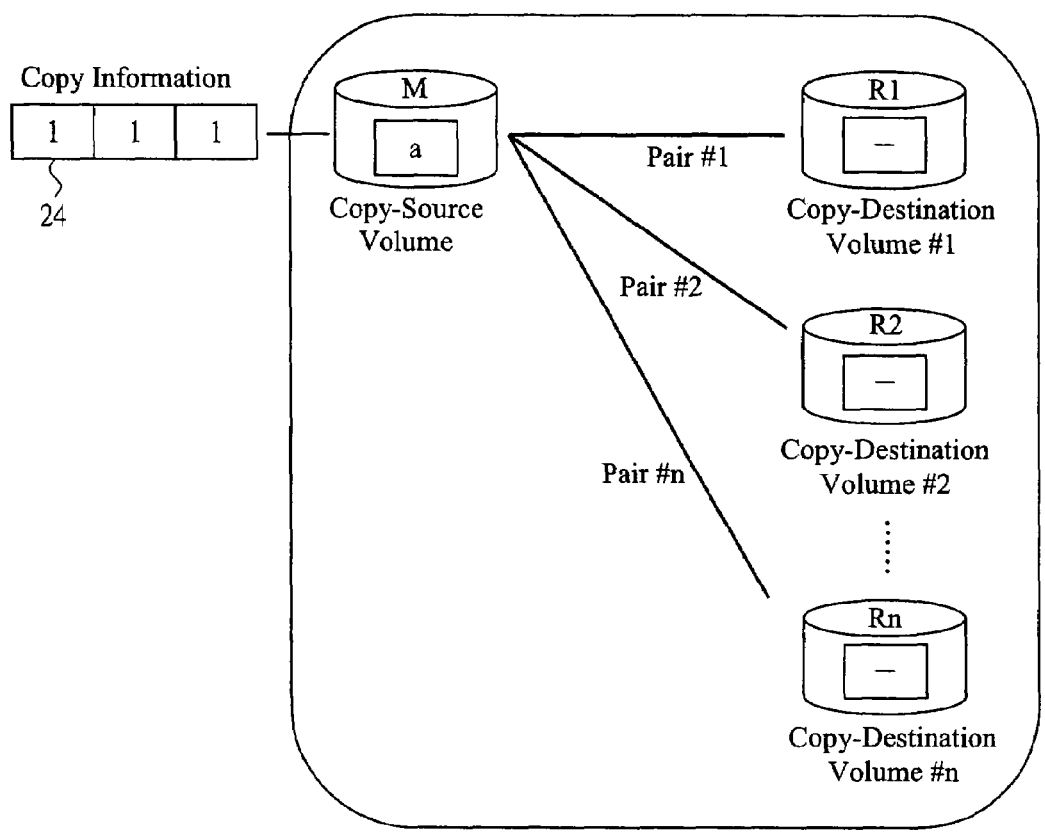
FIG. 19 is a diagram illustrating an LU and control information to be processing targets in the case of creating a plurality of replicas in a storage system according to a second embodiment of the present invention.
FIG. 20 is a table indicating an updating state of copy information that is control information for creating a plurality of replicas in a storage system according to a second embodiment of the present invention.

FIG. 19 is an explanatory diagram for showing both of a LU to be a processing target and control information during the multiple-replica creation processing by the storage system 1B of the second embodiment. As the LU related to the multiple-replica creation processing, there are the copy-source volume M and the plurality of copy-destination volumes R {R1, R2, . . . , Rn}. The multiple-replica creation program 20B conducts a processing for creating replicas of replication target data stored in the designated copy-source volume M, to the plurality of different copy-destination volumes R {R1, R2, . . . , Rn}, in the plurality of pairs (pairs #1 through #n) to be processing targets in one multiple-replica creation processing. One consistency group is formed with one copy-source volume M and the plurality of copy-destination volumes R. Based on the setting of whether a save processing in the storage system 1 is conducted, no save volume S is secured in the storage area on the storage device 6. The plurality of pairs (n pairs) {pairs #1, #2, #n} are formed by the copy-source volume M and the plurality of copy-destination volumes R. By the replication processing 52B for each pair of the copy-source volume M and the copy-destination volume R, the pair-control state is changed from each "simplex" state of two storage volumes to the "split" state via the "transition" state.

In FIG. 19, the storage system 1B creates and holds the copy information 24 in the shared memory 9 in correspondence to the copy-destination volume M, as the control information used for creating the plurality of replicas. The copy information 24 is the control information used for controlling and identifying the save state of the data stored in the copy-source volume M in bitmap form. The copy information 24 is created and held one piece per copy-source volume M. In this bitmap, one bit of ON ("1")/OFF ("0") corresponds to each one piece of sub data in the copy-source volume M. The sub data has a block, a track, and a file, etc. as units. When the instruction-reception information 21B is stored in the shared memory 9 after the receipt of the replication instruction in the control unit 5, the copy information 24 is newly created in correspondence to the LU which serves as a designated copy source. The control unit 5 judges the data-copy state transferred from the copy source to the copy destination in the storage volume related to the multiple-replica creation by referring to the control information (24).

FIG. 20 is a table showing the updating states of the copy information 24. The multiple-replica creation program 20B turns ON ("1") bits in the copy information 24 at the time of receiving the replication instruction from the processor 4. That is, when the copy information 24 is newly created, all the bits are turned ON. The multiple-replica creation program 20B updates, that is, turns OFF ("0") bits corresponding to the corresponding sub data in the copy information 24 when data copies to a plurality of copy-destination volumes R {R1 to Rn} occur for certain sub data in the copy-source volume M. Namely, when the data copies of the plurality of copy-destination volumes R {R1 to Rn} to the corresponding areas are completed about the sub data in the copy-source volume M, the corresponding bits in the copy information 24 are turned OFF.

In FIG. 19, the initial condition when the replication instruction is received in the storage system 1B is shown. As an example, the data "a" is stored as the sub data in the copy-source volume M. If the replication processing 52B is not yet started, the plurality of copy-destination volumes R are in the initial condition and there is in an no-data state in the sub data that corresponds to the data "a" of the copy-source volume M. In addition, respective bits of the copy information 24 are all in the ON ("1") states.

Then, description will be made of the update/reference processing 54B. FIGS. 21 through 27 are diagrams for describing the update/reference processing 54B. The multiple-replica creation program 20B conducts the update/reference processing 54B when the data update or reference access occurs from the processor 4 to the copy-source volume M or copy-destination volume R during the multiple-replica creation processing. In the update/reference processing 54B, as a basic processing policy, at the replication processing 52B in the consistency group, based on the data state of the copy-source volume M at the time of receiving the replication instruction and starting the multiple-replica creation processing, the updating or reference access from the processor 4 is processed. The multiple-replica creation program 20B carries out, as the updating/reference processing 54B, different processings depending on whether a pair (access target pair) of LUs (data) to be access targets of update/reference has undergone the replication processing 52B. For example, when the update/reference access occurs during the successive data-copying processing for the plurality of pairs, there is conducted control for: finishing the data-copying processing in advance for the access target pairs; and then write/read processing for the relevant data.

The multiple-replica creation program 20B refers to the control information (24) and judges the data-copying states of the LUs in the access target pairs when the update/reference access to the LU to be a processing target occurs. And, the multiple-replica creation program 20B conducts a read/write processing in copy-source volume M, a data-copy processing from the copy source to the copy destination, and a read/write processing in copy-destination volume R, etc., depending on the data state etc. of an access target, access kind, related LU (group 61B as mentioned above), or the like. In addition, based on these processings, the values of the control information (24) are updated. The multiple-replica creation program 20B appropriately selects the processing target pair in accordance with the occurrence of the update/reference processing 54B, and completes the replication processing 52B for all the pairs in the consistency group while carrying out the replication processing 52B.

Figure 21:
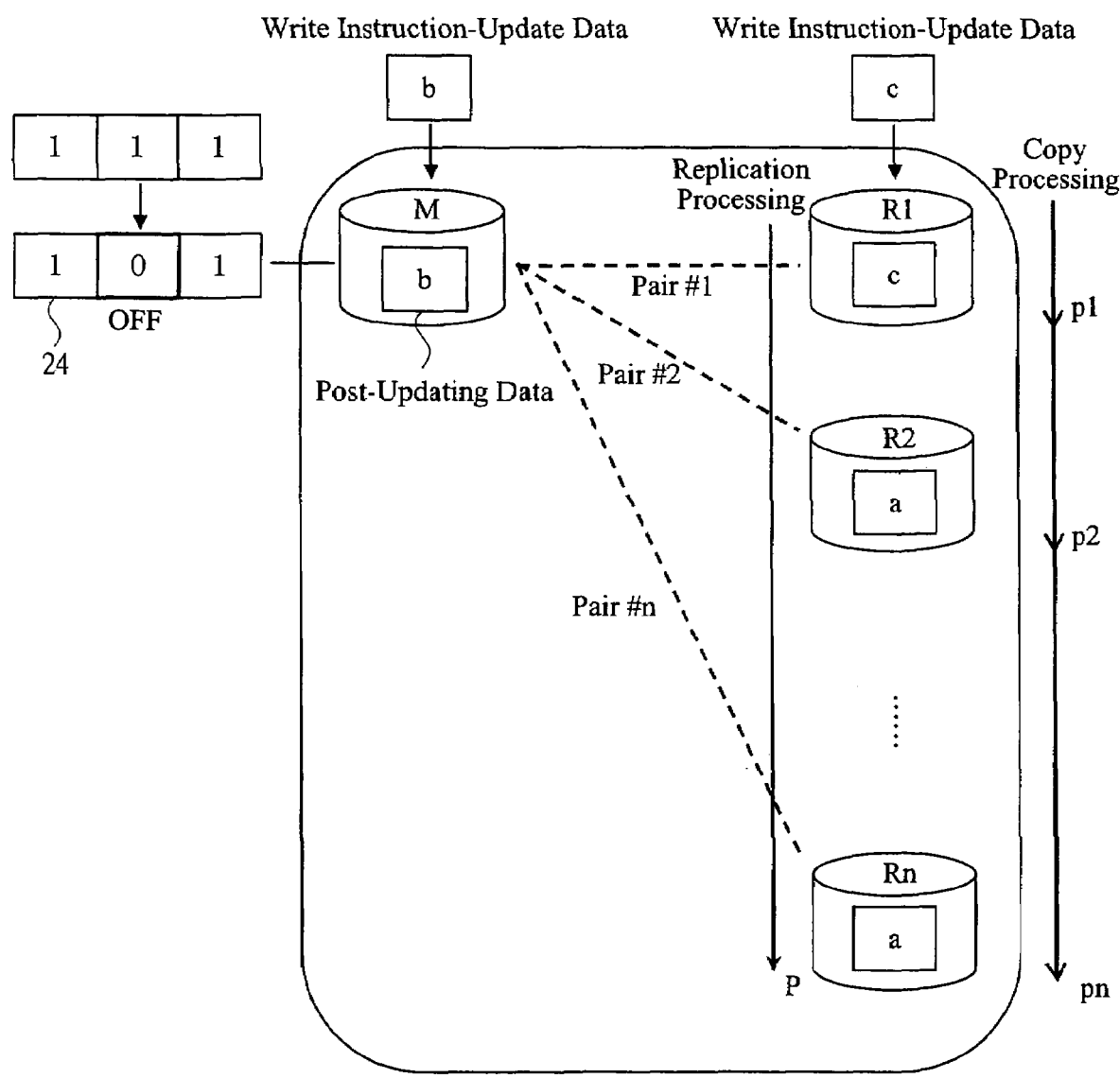
FIG. 21 is an explanatory view for illustrating an example of a multiple-replica creation processing related to an updating/reference processing in a storage system according to a second embodiment of the present invention.

FIG. 21 is an explanatory diagram for showing an example of the multiple-replica creation processing related to the updating/reference processing 54B, and indicates one state during the multiple-replica creation processing corresponding to FIG. 19. The multiple-replica creation program 20B carries out the replication processing 52B (P) for creating replicas of the replication target data stored in the designated copy-source volume M on a plurality of pairs (pairs #1 through #n), into n pieces of different copy-destination volume R {R1 through Rn}. The multiple-replica creation program 20B carries out a plurality of copy processings (p1 through pn) for copying the sub data in the designated copy-source volume M, into n pieces of copy-destination volume R {R1 through Rn} in replication processing 52B (P). In this processing example, there are carried out: a replication processing p1 for copying the sub data in the copy-source volume M for the pair #1, into the corresponding region of the copy-destination volume R1; a replication processing p2 for copying the sub data in the copy-source volume M for the pair #2, into the corresponding area of the copy-destination volume R2; and similarly a replication processing pn for copying the sub data in the copy-source volume M for the pair #n, into the corresponding area of the copy-destination volume Rn. The multiple-replica creation program 20B sequentially executes the replication processings (p1 through pn) while selecting, for example, one pair at a time.

For example, as shown in FIG. 19, it is assumed that when the initial data "a" is stored in a certain sub data of the copy-source volume M, a replication instruction including the designation for creating replicas to the plurality of copy-destination volumes R is issued with the data "a" in the copy-source volume M being set as a replication target. After the instruction reception processing 51B at the control unit 5, as the replication processing 52B, the data-copy processing (p1 through pn) is sequentially started for the plurality of designated pairs (pairs #1 through #n). By the data-copy processing 52B, the data "a" in the copy-source volume M is copies to the corresponding area in the copy-destination volume R. For example, as shown in FIG. 21, in the data-copying processings p1 through pn, copying of the data "a" to the copy-destination volumes R1 through Rn is sequentially finished. By this, the pairs #1 through #n are moved to the "split" state. The pair-control state being changed to the "split" state is indicated with dotted lines.

In addition, for example, it is assumed that a write instruction for writing the update data "b" occurs as the update access from the processor 4 to the data "a" in the copy-source volume M during the data copy processing (p1 through pn). In this case, the multiple-replica creation program 20B waits until the data copy processing (p1 through pn) is completed after it receives the write instruction. After the data copy processing is completed, the multiple-replica creation program 20B turns OFF ("0") the corresponding bits in the copy information 24 and rewrites the post-updating data "b" at the designated position of the copy-source volume M. For example, it is assumed that during the data copy processing (p1 through pn) for the plurality of pairs and during the data copy processing p2 for the pair #2, an access for updating the data "a" of the copy-source volume M occurs. At this time, if the pre-updating data "a" is immediately updated with the post-updating data "b," a copy processing to the copy-destination volume R is carried out using the post-updating data "b", whereby the data inconsistency with the data "a" and the data "b" occurs between the copy-destination volumes R. Consequently, after waiting to completing the data copy processing (p1 through pn), no data inconsistency occurs if the post-updating data "b" is updated at the designated position of the copy-source volume M.

In addition, for example, it is assumed that there occurs a write instruction for writing updated data "c" as an update access to the corresponding data (data at the position corresponding to the replication target data "a") in the copy-destination volume R, for example, the copy-destination volume R2 from the processor 4. In such a case, the multiple-replica creation program 20B waits until the data copy processing (p1 though pn) is completed after it receives the write instruction. Or, the multiple-replica creation program 20B waits until the data copy processing for the copy-destination volume R (R2) of an access target is finished. Or, the multiple-replica creation program 20B preferentially executes the data copy processing for the copy-destination volume R (R2) of the access target. And, after the data copy processing is completed, the multiple-replica creation program 20B writes the updated data "c" and updates the corresponding data (data "a") of the copy-destination volume R (R2) that is the access target because the data copy processing (p2) has already been finished at that point.

FIGS. 22A through 22D are tables showing correspondence of the control information (24) to the execution processing, in the updating/reference processing 54B of the multiple-replica creation processing in the storage system 1B of the second embodiment. The execution processing differs, depending on the data copying state (copied or not) from the copy-source volume M to the copy-destination volume R when the update or reference access occurs. A processing shown in FIG. 22 corresponds to the flow charts shown in FIGS. 23 through 26 and to the state transition diagram shown in FIG. 27, respectively. By carrying out the processing in conformity to each condition in the storage system 1B, the data consistency in the consistency group can be secured.

FIG. 22A shows an update processing executed in the storage system 1 when the update access to the copy-source volume M occurs. When the control unit 5 receives the write instruction for updating the data of one copy-source volume M from the processor 4, the control unit 5 confirms the control information held in the shared memory 9. As shown in the table, if the corresponding bit in the copy information 24, that is, the bit which corresponds to the write designated position by the write instruction in the copy-source volume M, is ON ("1"), the following processing is carried out. That the bit of the copy-source save information 24 is ON indicates a state in which the corresponding data (update target data) in the copy-source volume M becomes non-copied, that is, which the data copy processing has not been executed or has not yet been completed at the corresponding position of the plurality of copy-destination volumes R with respect to the corresponding data of the copy-source volume M in the relevant multiple-replica creation processing. In this case, first, the corresponding data in the copy-source volume M is copied to the plurality of copy-destination volumes R, and the corresponding bit of the copy information 24 is updated from ON ("1") to OFF ("0"). And, after the data copy processing for the update target data, the corresponding data of the copy-source volume M is updated and rewritten by the post-updating data, that is, by the write data from the processor 4. On the other hand, when the corresponding bit of the copy information 24 is OFF ("0"), the following processing is carried out. That the corresponding bit of the copy information 24 is OFF ("0") indicates a stat in which the corresponding data in the copy-source volume M becomes copied, that is, which the relevant multiple-replica creation processing has already executed the data copy processing at the corresponding position in the plurality of copy-destination volumes R. In this case, the update target data in the copy-source volume M is rewritten and updated by the post-updating data as it is. The corresponding bit of the copy information 24 remains OFF. Thus, updating of the copy-source volume M to the target data is processed after all the data are copied to the plurality of copy-destination volumes R.

FIG. 22B shows an update processing executed in the storage system 1 when an update access occurs for the copy-destination volume R. When the control unit 5 receives a write instruction for updating the data of one copy-destination volume R from the processor 4, the control unit 5 confirms the control information held in shared memory 9. When the corresponding bit of the copy information 24 is ON, the following processing is carried out. In this case, first, the corresponding data of the copy-source volume M is copied to a plurality of copy-destination volumes R and the corresponding bit of the copy information 24 is updated from ON to OFF. After the data copy processing for the corresponding data, the corresponding data (update target data) of the designated copy-destination volume R is rewritten and updated by the post-updating data, that is, by the write data from the processor 4. On the other hand, if the corresponding bit of the copy information 24 is OFF, the update target data in the copy-destination volume R is rewritten and updated with the post-updating data as it is. The corresponding bit of the copy information 24 remains OFF. Thus, updating of the copy-destination volume R to the target data is processed after all the data are copied to the plurality of copy-destination volumes R. Or, updating to the target data is processed after the data copying processing to the designated copy-destination volume R is completed.

FIG. 22C shows a reference processing executed in the storage system 1 when a reference access occurs for the copy-source volume M. When the control unit 5 receives the read instruction for referring to the data of one copy-source volume M from the processor 4, the control unit 5 reads the data of the designated copy-source volume M and returns it to the processor 4 at the instruction source irrespective of the state of the copy information 24.

FIG. 22D shows a reference processing executed by the storage system 1 when a reference access occurs in the copy-destination volume R. When the control unit 5 receives a read instruction for referring to the data of one copy-destination volume R from the processor 4, the control unit 5 confirms the control information held in the shared memory 9. When the corresponding bit of the copy information 24 is ON, the following processing is carried out. In this case, first, the corresponding data in the copy-source volume M is copied to the plurality of copy-destination volumes R and the corresponding bit of the copy information 24 is updated from ON to OFF. And after the data copy processing for the corresponding data, the corresponding data (read target data) of the designated copy-destination volume R is read and returned to the processor 4 at the instruction source. On the other hand, when the corresponding bit of the copy information 24 is OFF, the corresponding data in the designated copy-destination volume R is read as it is and returned it to the processor 4 at the instruction source.

Referring now to the flow charts of FIGS. 23 through 26, the procedure of an update/reference processing 54B will be described in each case.

FIG. 23 indicates the flow chart of the copy-source update processing flow, which corresponds to FIG. 22A. When the multiple-replica creation program 20B receives a write instruction for updating the data of the copy-source volume M from the processor 4 during the multiple-replica creation processing, the program first confirms the bit that corresponds to the update target data in the copy information 24 (S231). When the corresponding bit of the copy information 24 is ON, that is, becomes non-copied, the program executes the data copy processing of the corresponding data of the copy-source volume M at the corresponding position of the copy-destination volume (S232) and updates the corresponding bit of the copy information 24 from ON to OFF (S233). And, the corresponding data of the copy-source volume M is rewritten by the post-updating data, that is, by the write data from the processor 4 (S234). At the above-mentioned S231, the copy information 24 is OFF, that is, becomes copied, the corresponding data of the copy-source volume M is updated by the post-updating data as it is (S234).

FIG. 24 shows a flow chart of the copy-source update processing, which corresponds to FIG. 22B. When the multiple-replica creation program 20B receives a write instruction for updating the data of the copy-destination volume R from the processor 4 during the multiple-replica creation processing, the program first confirms the bit that corresponds to the update target data in the copy information 24 (S241). When the corresponding bit of the copy information 24 is ON, that is, becomes non-copied, the program executes the data copy processing of the corresponding data of the copy-source volume M to a plurality of copy-destination volumes R (S242) and updates the corresponding bit of the copy information 24 from ON to OFF (S243). And the corresponding data of the copy-destination volume R is rewritten and updated by the post-updating data, that is, by the write data from the processor 4 (S244). At the above-mentioned S241, if the copy information 24 is OFF, that is, becomes copied, the corresponding data of the copy-destination volume R is updated by the post-updating data as it is (S244).

FIG. 25 shows a flow chart of the copy-source reference, which corresponds to FIG. 22C. The multiple-replica creation program 20B reads the data to be a read target from the designated copy-source volume M and returns it to the processor 4 of an instruction source irrespective of the state of the copy information 24 when a read instruction to refer to the data of the copy-source volume M is received from the processor 4 during the multiple-replica creation processing (S251).

FIG. 26 is a flow chart of a copy-destination reference processing, which corresponds to FIG. 22D. The multiple-replica creation program 20B confirms the bit that corresponds to the read target data in the copy information 24 when a read instruction to refer to the data of the copy-destination volume R is received from the processor 4 during the multiple-replicas creation processing (S261). When the corresponding bit of the copy information 24 is ON, that is, becomes non-copied, the corresponding data of the copy-source volume M executes the data copy processing of to the plurality of copy-destination volumes R (S262) and the corresponding bit of the copy information 24 is updated from ON to OFF (S263). And, the corresponding data (read target data) from the copy-source volume M is read and returned to the processor 4 of the instruction source (S264). If the corresponding bit of the copy information 24 is OFF at the above-mentioned S261, the multiple-replica creation program 20B reads the corresponding data in the copy-source volume M and returns it to the processor 4 (S265).

FIG. 27 is a state transition diagram of the copy information 24 when the updating/reference processing 52B is conducted in the multiple-replica creation processing. The "ON" state in the figure indicates that the bit of the copy information 24 is ON. The "OFF" state indicates that the bit of the copy information 24 is in the "OFF" state. The arrow mark in the figure indicates the occurrence of access from the processor 4 and the change of the state associated with the update/reference processing 54B. For example, the "ON" state remains unchanged in the case of the reference access to the copy-source volume M while is changed to the "OFF" state in the case of: the update access to the copy-source volume M; the update access to the copy-destination volume R; and the reference access to the copy-destination volume. The above-mentioned "OFF" state is also changed as shown in the figure in accordance with the update/reference processing 54B.

By the foregoing processing, even in the storage system 1B of the second embodiment similarly to the first embodiment, the issue of a plurality of pair-creation instructions becomes unnecessary. In addition, at the time of the multiple-replica creation processing, the data update/reference is processed while the data consistency is secured. Further, a useful processing such as a backup processing by using the plurality of replicas created by the multiple-replica creation function can be achieved.

<Layout Pattern of Storage Volume>

Next, FIGS. 28A and 28B are tables showing LU layout patterns related to the multiple-replica creation processing in each embodiment. FIG. 28A corresponds to the case of the first embodiment and indicates the LU layout patterns under the condition that a saving processing is conducted by providing the save volume S to the storage system 1. Pattern A and pattern B indicate the case where the copy-destination volume R is formed in the same storage system 1 ("housing 1") as the copy-source volume M. Pattern C and pattern D indicate the case where the copy-destination volume R is formed in the storage system 2 ("housing 2") other than the storage system in which the copy-source volume M is formed. In addition, the pattern A and pattern C indicate the case where the save volume S is formed in the same storage system 1 ("housing 1") as the copy-source volume M. The pattern B and pattern D indicate the case where the save volume S is formed in the storage system 2 ("housing 2") other than the storage system in which the copy-source volume M is formed. During the multiple-replica creation processing, if the layouts of the copy-source volume M and the copy-destination volume R cover an area between the plurality of storage systems, data transfer between storage systems is controlled by the transfer processing 52 etc.

In the case of the processing form (the first embodiment) in which the save volume S is provided, the storage resource is consumed due to such processing form. However, alternatively, the pre-updating data is generously protected when the updating occurs in the data of the copy-source volume M, so that a responding time becomes quick in the multiple-replica creation. That is, a processing time is shortened. In the case of the processing form (the second embodiment) in which no save volume S is provided, the storage resource can be saved due to such processing form. However, alternatively, the pre-updating data is not saved when the updating occurs in the data of the copy-source volume M, so that a responding time becomes slow in the multiple-replica creation. That is, a processing time is elongated.

When the copy-source volume M and the copy-destination volume R are formed in the same storage system, the data copy between the LUs during the multiple-replica creation can be completed in the storage system, whereby the advantage is that a time taken to conduct such a processing can be shortened. When the copy-source volume M and the copy-destination volume R are formed in the different storage systems, it takes more time to copy the data of LUs due to such formation. However, instead, even if the data of LU is lost in one of the storage systems by occurrence of a trouble such as disaster, there is the advantage of the fact that recovery of the data can be executed by using the LU in the other of the storage systems. The layout of the save volume S is also the same and when the copy-source volume M and the save volume S are formed in the same storage system, the data saving processing is completed in the storage system during the multiple-replica creation, so that a time required for the processing can be shortened. When the copy-source volume M and the save volume S are formed in different storage systems, a longer time is required for the saving processing due to such arrangement. However, instead, even if any failure occurs in one of the storage systems and thereby the data related to the saving is lost, it is possible to recover the data by using the data of LU in the other of the storage systems.

FIG. 28B corresponds to the second embodiment and indicates layout patterns of the storage volume when no save volume S is provided in the storage system 1B and no saving processing is carried out. Pattern E indicates the case where the copy-destination volume R is formed in the same storage system 1B ("housing 1") as the copy-source volume M. Pattern F indicates the case where the copy-destination volume R is formed in the storage system 2B ("housing 2") other than the storage system in which the copy-source volume M is formed. Similarly to FIG. 28A, each pattern has its own advantages.

<Processing-Verified Examples>

Description will be made of processing-verified examples related to each embodiment. First, in the storage system, it is possible to mixedly carry out the multiple-replica creation processing equipped with the save volume S (first embodiment) and the multiple-replica creation processing equipped with no save volume S (second embodiment). For example, based on information for identifying the multiple-replica creation processing equipped with the save volume S and the multiple-replica creation processing equipped with no save volume S, the multiple-replica creation processing is selected by the storage system. For example, the user of the processor 4 enters directions as to whether the multiple-replica creation is carried out using the save volume S in the user interface on the replication-control program 46, and instructions corresponding to these are issued to the storage system 1 by the replication-control program 46.

FIG. 29 is an explanatory diagram for showing another relation of the pair of copy-source volume and copy-destination volume in the multiple replica creation processing. In the multiple-replica creation processing in each embodiment as mentioned above, the relation of the pair of copy-source volume M and copy-destination volume R is not limited to the tree-shaped relation as described above and may be such a shape relation that a plurality of pairs of one copy-source volume M and one copy-destination volume R are arranged in parallel. The copy-destination volumes R {R1, R2, ..., Rn} correspond to each of the plurality of copy-source volumes M {M1, M2, ..., Mn} and become a plurality of pairs {pair #1, pair #2, ..., pair #n}. When the save processing is conducted for each copy-source volume M, one copy-source save information 22 is created to one copy-source volume M and one copy-destination save information 23 is created to one copy-destination volume R, whereby the data save and update states are controlled similarly to the first embodiment. Similarly, when no save processing is conducted for the copy-source volume M, the information corresponding to the copy information 24 is created for each copy-source volume M, whereby the data copy state from the copy source to the copy destination is controlled similarly to the second embodiment.

In addition, the LU to be a target which receives the replication instruction from the side of the processor 4 is not necessarily limited to the primary volume and even if the target which receives the replication instruction is the secondary volume, the storage system can be operated. in the replication instruction, since the information for designating the copy-source volume M and the copy-destination volume R is included, the plurality of storage systems interpret the replication instruction and execute the appropriate processing even if the replication instruction is issued from the processor 4 by using the secondary volume as the processing-request destination.

Furthermore, as the user interface in the replication-control program 46 on the processor 4, there may be adopted a structure for showing the substance of the copy-source volume M or copy-destination volume R regarding the data to be a target of the multiple-replica creation processing, or there may not be adopted a structure for not showing the substance. The structure for showing the substance means to present the LU layout in the storage system, control information, or the like to the operator to be operable. In addition, the structure for not showing the substance means not to show the actual data arrangement, control information, or the like in the storage system but to present only information such as the data number and name, and the replica number and name to the operator to be operable.

In addition, for the capacity of the LU to be a target of the multiple-replica creation processing, the equivalent capacity is not necessarily provided to the copy-source volume M and the copy-destination volume R. For example, in the copy-source volume of certain capacity, when a plurality of replicas are created with the partial dataset included therein, that is, with the data having a capacity smaller than the capacity of the copy-source volume M used as a replication target, the replicas may not be created to the copy-destination volume R having the same capacity as that of the copy-source volume M but the replicas may be created to the copy-destination volume R having different capacity.

<Comparison with Prerequisite Techniques>

Referring to FIGS. 30A and 30B, replication functions which the inventors of the present invention has examined as the prerequisite techniques of the invention will be described for comparison to the embodiments according to the present invention. FIGS. 30A and 30B are explanatory diagrams for showing the outline of the replication functions which serve as the prerequisite techniques. FIG. 30A illustrates the relation of the storage volumes when a plurality of replicas are created for the data of the storage volume. FIG. 30B illustrates an example of processing order when there is no mechanism for ensuring the data consistency in creating the plurality of replicas. As shown in FIG. 30A, as an example, the case where, for one copy-source volume M, two copy-destination volumes R1 and R2 as replicas of the one copy-source volume M are created will be described.

In creating the plurality of replicas, first, it is necessary to establish the pair #1 and pair #2, which are two pairs of "copy-source volume and copy-destination volume." As shown in FIG. 30B, through the control program for executing the relevant replication functions in the processor, which serves as a host, a pair-creation instruction C1, a pair-creation instruction C2, and a pair-split instruction C3 must be issued sequentially in time series to the storage system. The pair-creation instruction C1 is an instruction to establish the pair #1 of the copy-source volume M and the copy-destination volume R1. The pair-creation instruction C2 is an instruction to establish the pair #2 of the copy-source volume M and the copy-destination volume R2. The pair-split instruction C3 is an instruction to create the replication data by carrying out necessary data copying for the pairs #1 and #2 designated and established by the instructions C1 and C2. The operator of the processor enters directions for issuing these instructions C1 through C3 sequentially through the user interface on the control program. Based on the entry, the corresponding instructions are issued from the control program and transmitted to the storage system.

The storage system, which has received the pair-creation instructions C1 and C2 from the processor, carries out the processing for creating the designated pair #1 and pair #2. That is, in the storage system, the volumes are associated as the primary volume and the secondary volume in each pair, and the pair-control state becomes in a "pair" state. By this pair-creation processing, the pair #1 and the pair #2 of "copy-source volume and copy-destination volume" go into the established state. Sequentially, the storage system responds to the receipt of the instruction C3 and conducts the pair-split processing for creating the data replicas of the copy-source volume M to the two copy-destination volumes R1 and R2 by the copying processing in the storage system. That is, a processing 1 for copying the necessary data from the copy-source volume M to the copy-destination volume R1 and a processing 2 for copying the necessary data from the copy-source volume M to the copy-destination volume R2 are carried out sequentially. For example, the replication target data "a" stored in the copy-source volume M is copied sequentially to the corresponding area in the copy-destination volume R1 and the corresponding area in the copy-destination volume R2, respectively.

The two pairs #1 and #2 created through the above processings by the instructions C1 through C3 go into the "split" state via the "pair" state, and become individually available for updating/reference. Thereafter, if it is desired to carry out the processing for making the data contents coincide with one another by reflecting, to a plurality of copy-destination volumes R1 and R2, the update that has occurred in the data of the copy-source volume M, then the data re-synchronization processing is conducted based on the issuance of the instruction (pair-rethink instruction) for this. Note that, in this embodiment, although the case of creating a plurality of copy-destination volumes to one copy-source volume has been described, the same may be applied to the case of creating the relevant copy-destination volumes to a plurality of copy-source volumes.

In this case, from the start of the processing by the instruction C3, it is necessary to ensure the data consistency in the groups {M, R1, R2} which comprise a plurality of related storage volumes. For example, as shown in FIG. 30B, after the instruction C3 is issued, it is assumed that the updating for the data "a" of the copy-source volume M, for example, write of the data "b", occurs by the instruction C4 from the processor right after the data "a" of the copy-source volume M is copied to the copy-destination volume R1 by the processing 1 in the storage system. When there is no mechanism for ensuring the data consistency, the data "b" of the copy-source volume M is copied to the copy-destination volume R2 by the processing 3 after the data "b" is written for the data "a" of the copy-source volume M by the processing 2 in the storage system that responds to the instruction C4 for the updating. Consequently, inconsistency of the data content occurs between the data "a" of the copy-destination volume R1 and the data "b" of the copy-destination volume R2.

As compared to the above-mentioned prerequisite techniques, in the storage system of each embodiment of the present invention, when the plurality of replicas are desired to be created, it is not necessary to issue instructions for establishing the plurality of pairs such as the instructions C1 and C2 from the processor 4 in time series, and issuance of a single multiple-replica creation instruction is also available.

Consequently, burdens to the operator and the processor 4 are reduced. In addition, during the multiple-replica creation processing, the replicas can be created while the data consistency is ensured by the update/reference processing 54 etc.

As described above, the invention made by the inventors has been specifically described based on the embodiments. However, needless to say, the present invention is not limited to the above-mentioned embodiments and can be variously altered and modified without departing from the gist thereof.

The present invention can be used for the storage system and the computer system related to the data storage control.

What we claim is:

1. A storage system, comprising:
    a controller device coupled to a host computer and controlling to transfer data sent from said host computer to a storage region;
    a first logical volume related to said storage region;
    a plurality of second logical volumes each being used to store a copy of data stored in said first logical volume;
    a third logical volume being used to store a copy of data stored in said first logical volume; and
    a plurality of disk drive units having a plurality of disk drives which have said storage region;
    wherein said controller device processes the steps of:
        receiving a split command sent from said host computer, in accordance with said split command, said controller device starts to change to a first status in which a relationship between said first logical volume and said second logical volumes is split,
        receiving a read and/or write command sent from said host computer to said first logical volume after the step of receiving said split command,
        copying data related to said read and/or write command from said first logical volume to said third logical volume and then copying said data related to the read and/or write command saved in said third logical volume to said plurality of second logical volumes,
        processing said read and/or write command by using said first logical volume, said second logical volumes or said third logical volume, and
        replying a reply related to said read and/or write command to said host computer.

2. A storage system according to claim 1, wherein:
    in accordance with said split command,
    said controller device completes to change to said first status after the step of processing said read and/or write command.

3. A storage system according to claim 1, wherein: said controller device copies data stored in said third logical volume to said second logical volumes.

4. A storage system according to claim I, wherein:
    said second logical volumes comprise a consistency group.

5. A storage system according to claim 1, wherein:
    said first logical volume is in a simplex condition before the step of receiving said split command.

6. A storage system according to claim 1, wherein:
    said controller device creates a split condition between said second logical volumes and said first logical volume based on said split command, said split condition is recognized by said host computer after the step of creating said split condition.

7. A storage system according to clam 1, wherein:
    said split command has information of a plurality of logical volumes related to said first logical volume or said second logical volumes.

8. A storage system according to claim 1, wherein:
a display of said host computer displays information related to said first logical volume or said second logical volumes.

9. A storage system according to claim 1, comprising:
a plurality of first logical volumes having said first logical volume;
wherein one of said first logical volumes corresponds to one of second logical volumes as a split condition, and
wherein the other of said first logical volumes is corresponding to the other of said second logical volumes as a split condition.

10. A storage system according to claim 1, wherein: said controller device processes the steps of:
receiving a write command sent from said host computer to said first logical volume,
copying first data stored in said first logical volume to said third logical volume and then to said second logical volumes if the first data are not copied to said third logical volume and said second logical volumes, and
overwriting the first data stored in said first logical volume by second data related to said write command after the step of copying the first data.

11. A storage system according to claim 1, wherein the step of replying is done while maintaining consistency among data stored in said second logical volume.

12. A storage system, comprising:
a controller device coupled to a host computer and controlling to transfer data sent from said host computer to a plurality of storage regions;
a first storage region of said storage regions;
a plurality of second storage regions of said storage regions each being used to store a copy of data stored in said first storage region;
a third storage region of said storage regions being used to store a copy of data stored in said first storage region; and
a plurality of disk drive units having a plurality of disk drives which have said storage regions;
wherein said controller device processes the steps of
receiving a split command sent from said host computer, in accordance with said split command, said controller device starts to change to a first status in which a relationship between said first logical volume and said second logical volumes is split,
receiving a read and/or write command sent from said host computer to said first storage region after the step of receiving said split command, copying data related to said read and/or write command from said first storage region to said third storage region, and then copying said data related to the read and/or write command saved in said third storage region to said plurality of second storage regions,
processing said read and/or write command by using said first storage region or said third storage region, and
replying a reply related to said read and/or write command to said host computer.

13. A storage system according to claim 12, wherein the step of replying is done while maintaining consistency among data stored in said second logical volume.

14. A storage system, comprising:
a controller device coupled to a host computer and controlling to transfer data sent from said host computer to a plurality of storage regions;
a plurality of first logical volumes related to said storage regions;
a plurality of second logical volumes each corresponding to a copy of data stored in said first logical volumes;
a third logical volume being used to store a copy of at least some data stored in said first logical volumes; and
a plurality of disk drive units having a plurality of disk drives which have said storage regions; wherein said controller device processes the steps of:
receiving a command sent from said host computer, said command being used to change to a first status in which a relationship between said first logical volumes and said second logical volumes is split,
receiving a read and/or write command sent from said host computer to one of said first logical volumes after the step of receiving said command,
copying data related to said read and/or write command from said one of said first logical volumes to said third logical volume and then copying said data related to the read and/or write command saved in said third logical volume to said plurality of second logical volumes,
processing said read and/or write command by using said one of said first logical volumes or said third logical volume, and
replying a reply related to said read and/or write command to said host computer.

15. A storage system according to claim 14, wherein the step of replying is done while maintaining consistency among data stored in said second logical volume.

16. A storage system, comprising:
a controller device coupled to a host computer and controlling to transfer data sent from said host computer to a storage region;
a first logical volume related to said storage region;
a plurality of second logical volumes each being used to store a copy of data stored in said first logical volume;
a third logical volume being used to store a copy of data stored in said first logical volume; and
a plurality of disk drive units having a plurality of disk drives which have said storage region;
wherein said controller device processes the steps of:
receiving a command sent from said host computer, said command being used to change to a first status in which a relationship between said first logical volume and said second logical volumes is split,
receiving a read and/or write command sent from said host computer to said first logical volume or one of said second logical volumes after the step of receiving said command,
copying data related to said read and/or write command from said first logical volume to said third logical volume and then copying said data related to the read and/or write command saved in said third logical volume to said plurality of second logical volumes,
processing said read and/or write command by using said first logical volume or said third logical volume, and
replying a reply related to said read and/or write command to said host computer.

17. A storage system according to claim 16, wherein the step of replying is done while maintaining consistency among data stored in said second logical volume.

18. A storage system, comprising:
a controller device coupled to a host computer and controlling to transfer data sent from said host computer to a storage region;
a first logical volume related to said storage region;

a plurality of second logical volumes each being used to store a copy of data stored in said first logical volume, a size of said one of said second logical volume being different from a size of said first logical volume;

a third logical volume being used to store a copy of data stored in said first logical volume; and a plurality of disk drive units having a plurality of disk drives which have said storage region;

wherein said controller device processes the steps of:

receiving a command sent from said host computer, said command being used to change to a first status in which a relationship between said first logical volume and said second logical volumes is split, receiving a read and/or write command sent from said host computer to said first logical volume after the step of receiving said command, copying data related to said read and/or write-command from said first logical volume to said third logical volume and then copying said data related to the read and/or write command saved in said third logical volume to said plurality of second logical volumes, processing said read and/or write command by using said first logical volume or said third logical volume, and replying a reply related to said read and/or write command to said host computer.

19. A storage system according to claim 18, wherein the step of replying is done while maintaining consistency among data stored in said second logical volume.

20. A storage system comprising:

a plurality of storage units having a plurality of storage regions;

a copy-source volume which is a logical region of said plurality of storage regions;

a save area being used to store data of said copy-source volume; and a control device being coupled to an information processing device and controlling the transfer data sent from said information processing device to said storage regions;

wherein said control device processes the steps of:

receiving a replication instruction specifying said copy-source volume and being sent from said information processing device, creating a consistency group which includes said copy-source volume and a plurality of copy-destination volumes being used to store data of said copy-source volume;

receiving an access request from said information processing device to said copy-source volume, saving data corresponding to said access request from said copysource volume to said save area, performing a data-copy process of said data saved in said save area to said plurality of copy-destination volumes while data consistency among said copy-source volume and said plurality of copy-destination volumes of said consistency group is maintained, and executing a process related to said access request.

21. A storage system according to claim 20, wherein said step of executing a process related to said access request is carried out while data consistency among said copy-source volume and said plurality of copy-destination volumes of said consistency group is maintained.

22. A storage system comprising:

a plurality of storage units having a plurality of storage regions;

a plurality of copy-source volumes which are logical regions of said plurality of storage regions;

a save area being used to store data of said plurality of copy-source volumes; and a control device being coupled to an information processing device and controlling the transfer data sent from said information processing device to said storage regions;

wherein said control device processes the steps of:

receiving a replication instruction specifying said plurality of copy-source volumes and being sent from information processing performed by said information processing device, creating a consistency group which includes said plurality of copy-source volumes and a plurality of copy-destination volumes being used to store data of said plurality of copy-source volumes;

receiving an access request from said information processing device to one of said plurality of copy-source volumes, saving data corresponding to said access request from said one of said plurality of copy-source volumes to said save area, and performing a data-copy process of said data saved in said save area to said plurality of copy-destination volumes while data consistency among said copy-source volume and said plurality of copy-destination volumes of said consistency group is maintained, and executing a process related to said access request.

23. A storage system according to claim 22, wherein said step of executing a process related to said access request is carried out while data consistency among said copy-source volume and said plurality of copy-destination volumes of said consistency group is maintained.

* * * * *